United States Patent [19]

Ikeda

[11] Patent Number: 5,936,749
[45] Date of Patent: Aug. 10, 1999

[54] METHOD AND APPARATUS FOR PREPARING SPECIAL COLOR SEPARATION

[75] Inventor: Iwata Ikeda, Kyoto, Japan

[73] Assignee: Dainippon Screen Mfg. Co., Ltd., Kyoto, Japan

[21] Appl. No.: 08/712,706

[22] Filed: Sep. 12, 1996

[30] Foreign Application Priority Data

Sep. 13, 1995 [JP] Japan .................................. 7-262325
Feb. 28, 1996 [JP] Japan .................................. 8-069250
Feb. 28, 1996 [JP] Japan .................................. 8-069251
Mar. 14, 1996 [JP] Japan .................................. 8-087256

[51] Int. Cl.$^6$ ....................................................... H04N 1/54
[52] U.S. Cl. ........................... 358/515; 358/501; 358/518; 358/534
[58] Field of Search .................................. 358/501, 515, 358/518, 521, 534, 538, 452, 453, 454, 456

[56] References Cited

U.S. PATENT DOCUMENTS 4,613,897  9/1986  Stansfield .................................. 358/80
5,018,008  5/1991  Asada ........................................ 358/78
5,370,976  12/1994  Williamson et al. .
5,546,197  8/1996  Shibazaki et al. ....................... 358/534

FOREIGN PATENT DOCUMENTS 0 184 289  11/1986  European Pat. Off. .
2-205191   8/1990   Japan .
3-16376    1/1991   Japan .
6-268857   9/1994   Japan .

Primary Examiner—Kim Yen Vu
Assistant Examiner—Jimmy Nguyen
Attorney, Agent, or Firm—McDermott, Will & Emery

[57] ABSTRACT

The present invention readily produces an image of a special color separation, with respect to a color image which is to be reproduced by a plurality of color separations including Y, M, and C separations. The method first specifies a relationship between a predetermined density of a special color separation and densities of a plurality of other color separations corresponding to the predetermined density of the special color separation; then extracts each color element included in a color image as a target color element; and determines a density of the special color separation according to the specified relationship.

10 Claims, 42 Drawing Sheets

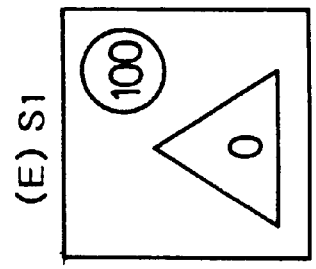
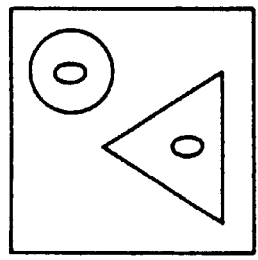
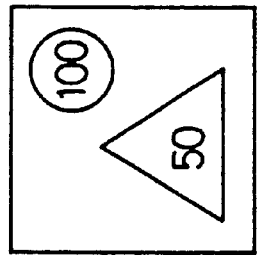
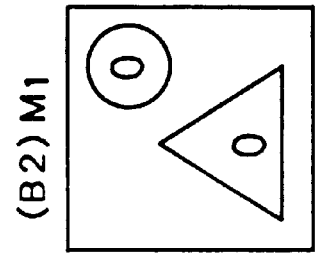
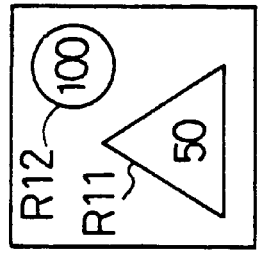
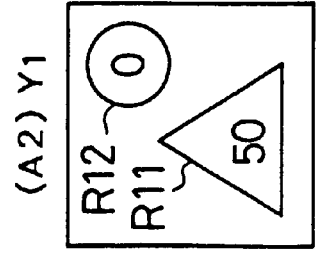
Fig. 4
CONCRETE PROCEDURE OF PROCESSING IN FIRST EMBODIMENT
PSEUDO COLOR VALUES CORRESPONDING TO $S_S=100\%$
$Y_S/M_S/C_S/K_S = 100/0/100/0$

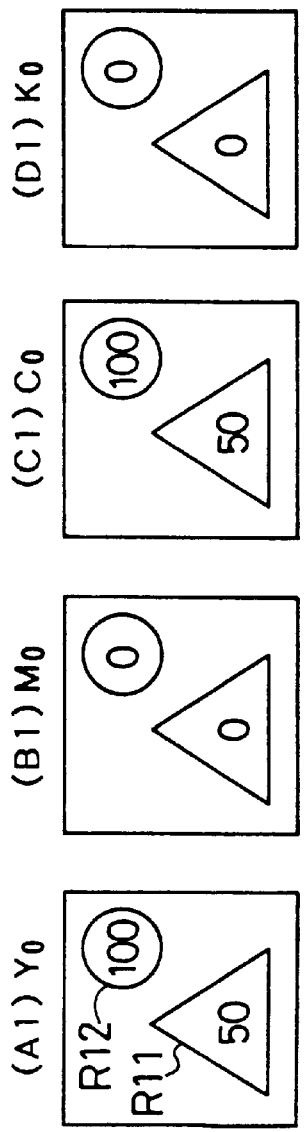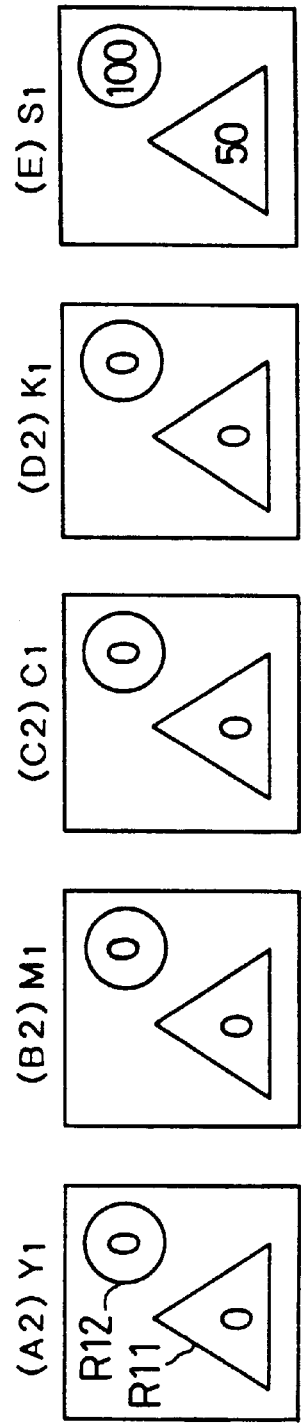
Fig. 6 CONCRETE PROCEDURE OF PROCESSING IN SECOND EMBODIMENT

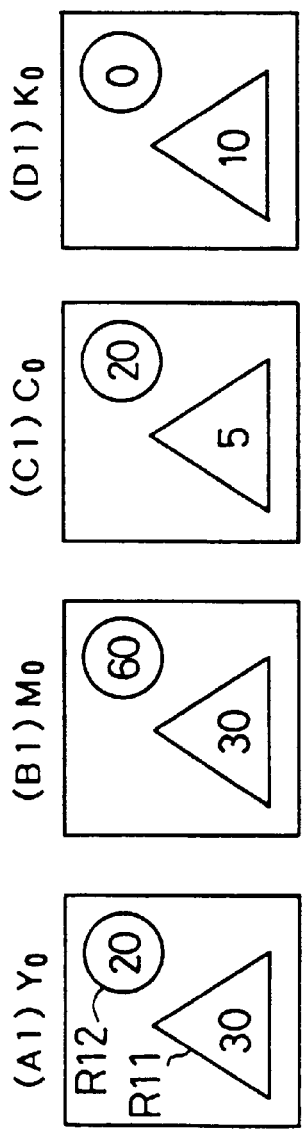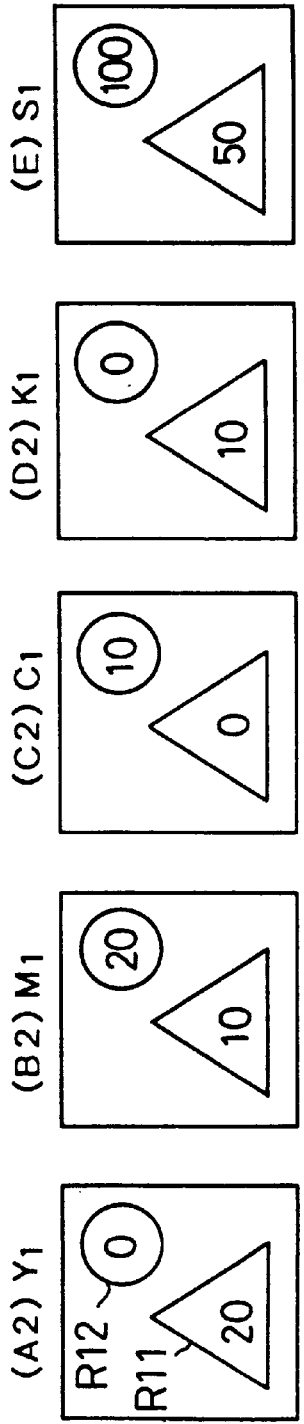
Fig. 8 CONCRETE PROCEDURE OF PROCESSING IN THIRD EMBODIMENT
PSEUDO COLOR VALUES CORRESPONDING TO $S_s = 100\%$
$Y_s/M_s/C_s/K_s = 20/40/10/0$

Fig. 10

SCREEN ALLOCATION TABLE

| NUMBER OF SEPARATIONS | SCREEN ANGLES | | | | |
|---|---|---|---|---|---|
| 1 | 45° | — | — | — | — |
| 2 | 45° | 0° | — | — | — |
| 3 | 45° | 15° | 75° | — | — |
| 4 | 45° | 15° | 75° | 0° | — |
| 5 | 45° | 15° | 75° | FM$_1$ | FM$_2$ |

Fig. 16
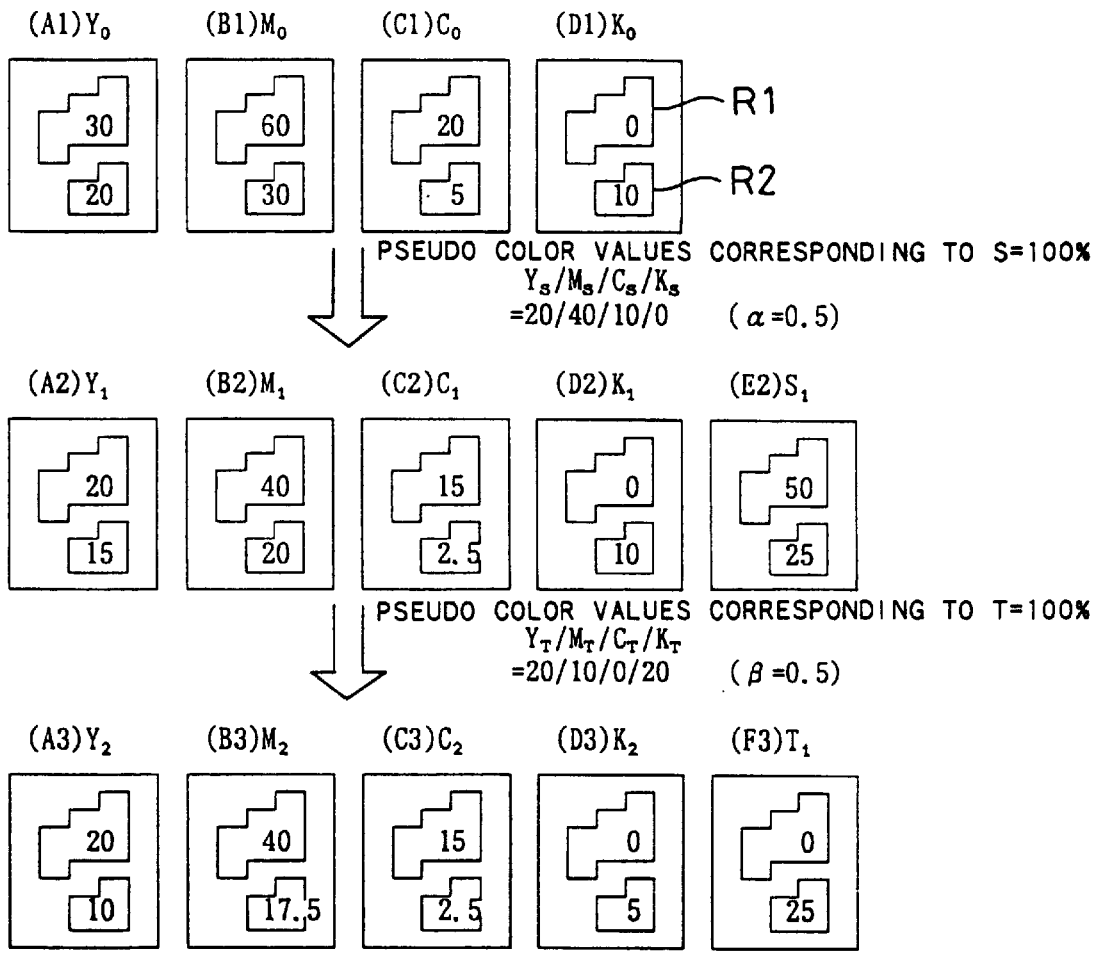
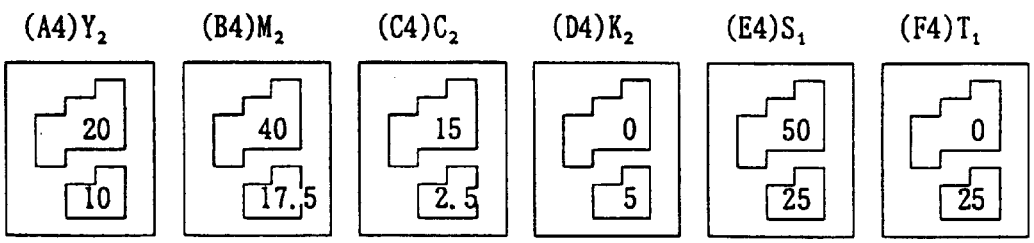

PROCESSING ROUTINE OF SEVENTH EMBODIMENT

PROCESSING ROUTINE OF EIGHTH EMBODIMENT

PROCESSING ROUTINE OF TENTH EMBODIMENT

PROCESSING ROUTINE OF THIRTEENTH EMBODIMENT

Fig. 36
CONCRETE PROCEDURE OF PROCESSING IN THIRTEENTH EMBODIMENT
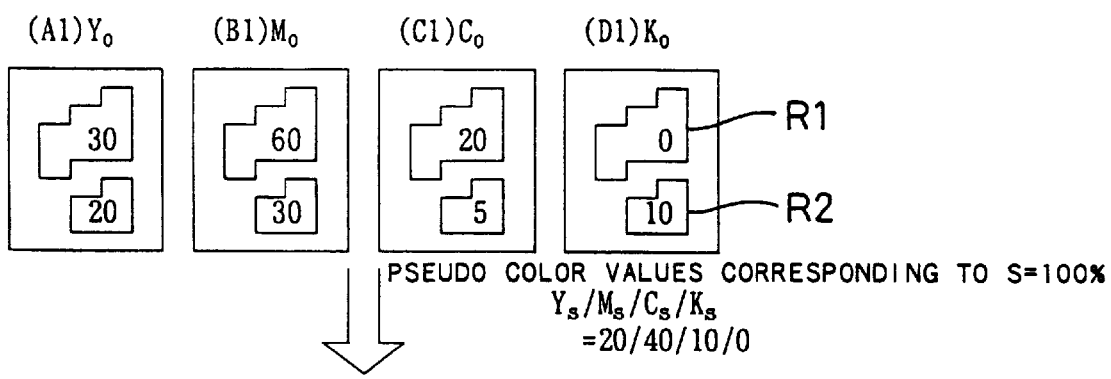
PSEUDO COLOR VALUES CORRESPONDING TO S=100%
$Y_s/M_s/C_s/K_s$
$=20/40/10/0$
SELECT AREA R1
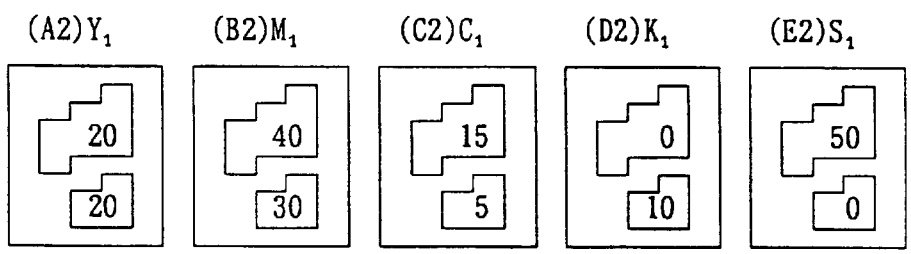

PROCESSING ROUTINE OF FOURTEENTH EMBODIMENT

CONCRETE PROCEDURE OF PROCESSING IN FOURTEENTH EMBODIMENT

COLOR MONITOR SCREEN

PROCESSING ROUTINE OF FIFTEENTH EMBODIMENT

CONCRETE PROCEDURE OF PROCESSING IN FIFTEENTH EMBODIMENT

CONCRETE PROCEDURE OF PROCESSING IN SIXTEENTH EMBODIMENT

COLOR MONITOR SCREEN

METHOD AND APPARATUS FOR PREPARING SPECIAL COLOR SEPARATION

BACKGROUND OF THE INVENTION

1. Field of the Invention

The present invention relates to a method of preparing an image of a special color separation other than Y, M, C, and K separations, with respect to a color image reproduced by a plurality of color separations including at least Y, M, and C separations, and also to an apparatus for the same.

2. Description of the Related Art

In ordinary color image printing, the four basic color inks of Y (yellow), M (magenta), C (cyan), and K (black) are used. Y, M, and C are three primary colors of additive mixture of color stimuli. In simplified printing, color images are occasionally printed with only the three primary colors of Y, M, and C. In order to enhance the color reproducibility, ink of a special color other than Y, M, C, and K is used for some printing. Such ink of a special color is generally referred to as 'special color ink', and a color separation of the special color ink is referred to as 'special color separation'. Typical examples of special color ink include green, orange, gold, silver, and other metallic colors. The special color separation is generally used for reproducing an image part for which a special color has been designated in advance, such as a logotype, or for enhancing the color reproducibility of a color image by printing in special color ink.

Color images have conventionally been expressed by image data of four color separations, Y, M, C, and K. In order to generate image data of a special color separation from the image data of Y, M, C, and K separations, the user is required to specify an image area of the special color separation and the densities of the respective color separations including the special color separation in the specified image area.

Further, the conventional method of generating a special color separation usually converts the densities of the color separations in a specific image area, such as a vignette image area (gradation image area), to the density of the special color separation even when the conversion to the special color separation is not desired in the specific area.

SUMMARY OF THE INVENTION

Accordingly, a first object of the present invention is thus to provide a technique of readily preparing an image of a special color separation with respect to a color image reproduced by a plurality of color separations including Y, M, and C separations.

A second object of the present invention is to provide a technique of readily preparing a special color separation image for a desired image area.

In order to attain at least a part of the above objects, the present invention is directed to a method of producing an image of a special color separation other than yellow, magenta, cyan, and back separations with respect to a color image which is to be reproduced by a plurality of basic color separations including at least the yellow, magenta and cyan color separations. The method comprises the steps of: (a) specifying a relationship between a predetermined density of the special color separation and densities of the plurality of basic color separations; (b) selecting each color element in the color image as a target color element, the target color element including initial densities of the plurality of basic color separations; and (c) determining a density of the special color separation for the target color element from the initial densities of the plurality of basic color separations for the target color element according to the relationship.

According to the present invention, an image of a special color separation is readily prepared from a plurality of basic color separations including at least Y, M, and C separations, according to the specified relationship between a predetermined density of the special color separation and densities of the plurality of basic color separations.

In a preferred embodiment, the step (a) comprises the step of: specifying specific densities of the plurality of basic color separations corresponding to the predetermined density of the special color separation; and wherein the step (c) comprises the step of: when the initial densities for the target color element respectively coincide with the specific densities, setting the density of the special color separation for the target color element equal to the predetermined density while changing the initial densities of the plurality of basic color separations to zero.

A color image to be reproduced by a plurality of basic color separations can be readily changed to be reproduced by a special color separation if the densities of a plurality of color separations in the color image are set to the specific densities in advance.

In another embodiment, the step (a) comprises the step of: setting an allowable error for judging whether the initial densities for the target color element respectively coincide with the specific densities or not.

Accordingly, the special color separation can be produced even when some error exists in the density value of each color separation.

In a preferred embodiment, the step (a) comprises the step of: specifying specific densities of the plurality of basic color separations corresponding to the predetermined density of the special color separation; and wherein the step (c) comprises the step of: when a ratio of the initial density to the specific density is common to the plurality of basic color separations, determining the density of the special color separation for the target color element according to the ratio of the initial density to the specific density while changing the initial densities of the plurality of basic color separations for the target color element equal to zero.

This enables the densities of the plurality of color separations to be converted to the density of the special color separation, in proportion to the initial densities of the respective color separations for the target color element.

In still another preferred embodiment, the step (a) comprises the step of: specifying specific densities of the plurality of basic color separations corresponding to the predetermined density of the special color separation; and wherein the step (c) comprises the step of: subtracting density values proportional to the specific densities of the plurality of basic color separations from the initial densities of the plurality of basic color separations for the target color element, and setting a density of the special color separation for the target color element corresponding to the subtracted density values.

Accordingly, the density values corresponding to the density of the special color separation from the initial densities of the basic color separations for the target color element.

Preferably, the method further comprises the step of: (d) setting screening types for the special color separation and the plurality of basic color separations to prevent moire with respect to each image area in the color image.

This method effectively prevents moires from being observed in the process of laying a plurality of color separations one upon another.

The step (d) comprises the step of: allocating different screening types to the respective color separations based on a number of color separations used for reproducing each image area and on densities of the respective color separations in each image area.

According to another aspect of the invention, the step (a) comprises the step of: specifying specific densities of the plurality of basic color separations corresponding to a predetermined density of each of a plurality of special color separations; and wherein the step (c) comprises the steps of: selecting one of the plurality of special color separations as a target special color separation; subtracting proportional density values of the plurality of basic color separations, which are proportional to the specific densities with respect to the target special color separation, from the initial densities of the plurality of basic color separations for the target color element to thereby determine post-subtraction densities of the plurality of basic color separations; and determining a density of the target special color separation, corresponding to the proportional density values, for the target color element; and the method further comprising the step of: (d) setting the post-subtraction densities of the plurality of basic color separations as new densities of the plurality of basic color separations for the target color element; and (e) successively carrying out the steps (c) and (d) for each of the plurality of special color separations.

This method enables images of a plurality of special color separations to be readily prepared from the images of the plurality of basic color separations including at least Y, M, and C separations.

In another embodiment, the step (c) further comprises the steps of: (1) computing ratios of the densities of the plurality of basic color separations for the target color element to the specific densities of the plurality of basic color separations for the target special color separation, and selecting a minimum value among the ratios for the plurality of basic color separations and 1.0; (2) determining a density of the target special color separation for the target color element by multiplying the minimum value by a predetermined coefficient; (3) determining the proportional density values of the plurality of basic color separations by multiplying the specific densities of the plurality of basic color separations by the density of the target special color separation determined in the step (2); and (4) subtracting the proportional density values of the plurality of basic color separations from the densities of the plurality of basic color separations for the target color element, to thereby obtain the post-subtraction densities of the plurality of basic color separations.

This method can readily determine the density of each special color separation and the post-subtraction densities of the plurality of basic color separations from the densities of the plurality of basic color separations for the target color element and the specific densities with respect to each target special color separation.

Preferably, the predetermined coefficient is 100% with respect to at least one special color separation.

In still another embodiment, the method further comprises the steps of: (f) repeating a plurality of cycles of the processing of the steps (c) through (e), each the cycle including the execution of the steps (c) through (e) for the plurality of special color separations; and (g) adding up the density of the target special color separation obtained in the step (c) in the repeated cycles with respect to each of the plurality of special color separation, to thereby obtain a final density of each of the plurality of special color separations.

Repeated execution of the steps (c) through (e) enables the densities of the plurality of special color separations to be set as high as possible.

According to still another aspect of the preset invention, the step (a) comprises the step of: specifying specific densities of the plurality of basic color separations corresponding to a predetermined density of each of N special color separations, where N is an integer greater than 1; and wherein the step (c) comprises the steps of: (i) distributing the initial density of each of the plurality of basic color separations for the target color element into N divisional densities according to a predetermined distribution ratio, and associating the N divisional densities with the N special color separations; and (ii) computing proportional density values of the plurality of basic color separations, which are proportional to the specific densities with respect to the each special color separation, the proportional density values being no more than the divisional densities, and determining a density of the each special color separation for the target color element corresponding to the proportional density values.

This method distributes an initial density of each of the plurality of basic color separations for the target color element into N divisional densities according to a predetermined distribution ratio and determines the density of each special color separation based on the divisional densities. Namely, this method determines the densities of the N special color separations according to the weighting operation corresponding to the distribution ratio, thereby enabling images of the plurality of special color separations to be readily prepared with respect to a color image to be reproduced by the plurality of basic color separations including Y, M, and C separations.

In a preferred embodiment, the step (ii) comprises the step of: selecting one of the N special color separations as a target special color separation; and executing the steps of: (1) computing ratios of the divisional densities of the plurality of basic color separations to the specific densities of the plurality of basic color separations with respect to the target special color separation, and selecting a minimum value among the ratios for the plurality of basic color separations and 1.0; (2) determining the proportional density values of the plurality of basic color separations by multiplying the specific densities of the plurality of basic color separations by the minimum value; and (3) subtracting the proportional density values of the plurality of basic color separations from the divisional densities of the plurality of basic color separations for the target color element, to thereby obtain post-subtraction densities of the plurality of basic color separations.

This enables the densities of the respective special color separations and the post-subtraction densities of the plurality of color separations to be readily computed from the initial densities of the plurality of color separations for the target color element and the specific densities with respect to the respective special color separations.

In another embodiment, the method further comprises the step of: (d) adding up the post-subtraction densities obtained with respect to the N special color separations for each of the plurality of basic color separations, to thereby obtain new densities of the plurality of basic color separations.

This embodiment enables the color of a color image to be reproduced more faithfully by the special color separations and the plurality of basic color separations.

Preferably, the color image comprises a plurality of image areas; and the method further comprises the step of: specifying the distribution ratio for each the image area.

This enables each special color separation to be prepared according to the weighting operation corresponding to the different distribution ratios set for the respective image areas.

According to another aspect of the present invention, the step (a) comprises the step of: specifying specific densities of the plurality of basic color separations corresponding to a predetermined density of the special color separation; and wherein the step (b) comprises the steps of: (i) specifying a target image area to be processed in the color image; and (ii) extracting each color element in the target image area as a target color element to be processed; and wherein the step (c) comprises the step of: subtracting proportional density values of the plurality of basic color separations, which are proportional to the specific densities with respect to the special color separation, from the initial densities of the plurality of basic color separations for the target color element, to thereby obtain post-subtraction densities of the plurality of basic color separations; and determining a density of the special color separation for the target color element corresponding to the proportional density values.

This method enables an image of a special color separation to be readily generated from a plurality of basic color separations only for a desired target image area.

In a preferred embodiment, the step (i) further comprises the steps of: (1) displaying the color image on a monitor; and (2) specifying an area of arbitrary shape in the color image displayed on the monitor as the target image area through interactive operation.

This enables the user to readily specify a desired image area for which an image of the special color separation is generated.

Alternatively, the step (i) further comprises the steps of: (1) detecting a tint area in the color image based on image data representing the color image; and (2) selecting the screen tint area as the target image area.

This method enables an image of the special color separation to be generated in a tint area without requiring the user to specify the contour of the tint area.

The step (i) may further comprise the steps of: (1) detecting a vignette area included in the color image based on image data representing the color image; and (2) selecting the vignette area as the target image area.

This method enables an image of the special color separation to be generated in a vignette area without requiring the user to specify the contour of the vignette area.

The present invention is also directed to an apparatus for producing an image of a special color separation other than yellow, magenta, cyan, and back separations with respect to a color image which is to be reproduced by a plurality of basic color separations including at least the yellow, magenta and cyan color separations. The apparatus comprising: density specifying means for specifying a relationship between a predetermined density of the special color separation and densities of the plurality of basic color separations; color element selection means for selecting each color element in the color image as a target color element, the target color element including initial densities of the plurality of basic color separations; and color element conversion means for determining a density of the special color separation for the target color element from the initial densities of the plurality of basic color separations for the target color element according to the relationship.

Each step of the above methods can be also implemented by a corresponding means.

The present invention is further directed to a computer readable medium having computer readable program code means embodied therein for producing an image of a special color separation other than yellow, magenta, cyan, and back separations with respect to a color image which is to be reproduced by a plurality of basic color separations including at least the yellow, magenta and cyan color separations. The computer readable program code means comprising: density specifying program code means for causing a computer to operate for specifying a relationship between a predetermined density of the special color separation and densities of the plurality of basic color separations; color element selection program code means for causing the computer to operate for selecting each color element in the color image as a target color element, the target color element including initial densities of the plurality of basic color separations; and color element conversion program code means for causing the computer to determine a density of the special color separation for the target color element from the initial densities of the plurality of basic color separations for the target color element according to the relationship.

Each step of the above methods and each means of the above apparatus can be also implemented by a corresponding program code means.

These and other objects, features, aspects, and advantages of the present invention will become more apparent from the following detailed description of the preferred embodiments with the accompanying drawings.

BRIEF DESCRIPTION OF THE DRAWINGS

FIG. 1 is a block diagram illustrating the structure of an image processing apparatus to which first through fourth embodiments of the present invention are applied; which an embodiment of the present invention is applied to;

FIG. 4 illustrates a concrete procedure of the processing executed in the first embodiment;

FIG. 6 illustrates a concrete procedure of the processing executed in the second embodiment;

FIG. 8 illustrates a concrete procedure of the processing executed in the third embodiment;

FIG. 10 illustrates an exemplified screen allocation table;

FIG. 16 illustrates a concrete procedure of the processing executed in the fifth embodiment;

FIG. 36 illustrates a concrete procedure of the processing executed in the thirteenth embodiment;

DESCRIPTION OF THE PREFERRED EMBODIMENT

A. First Embodiment

Figure 1:
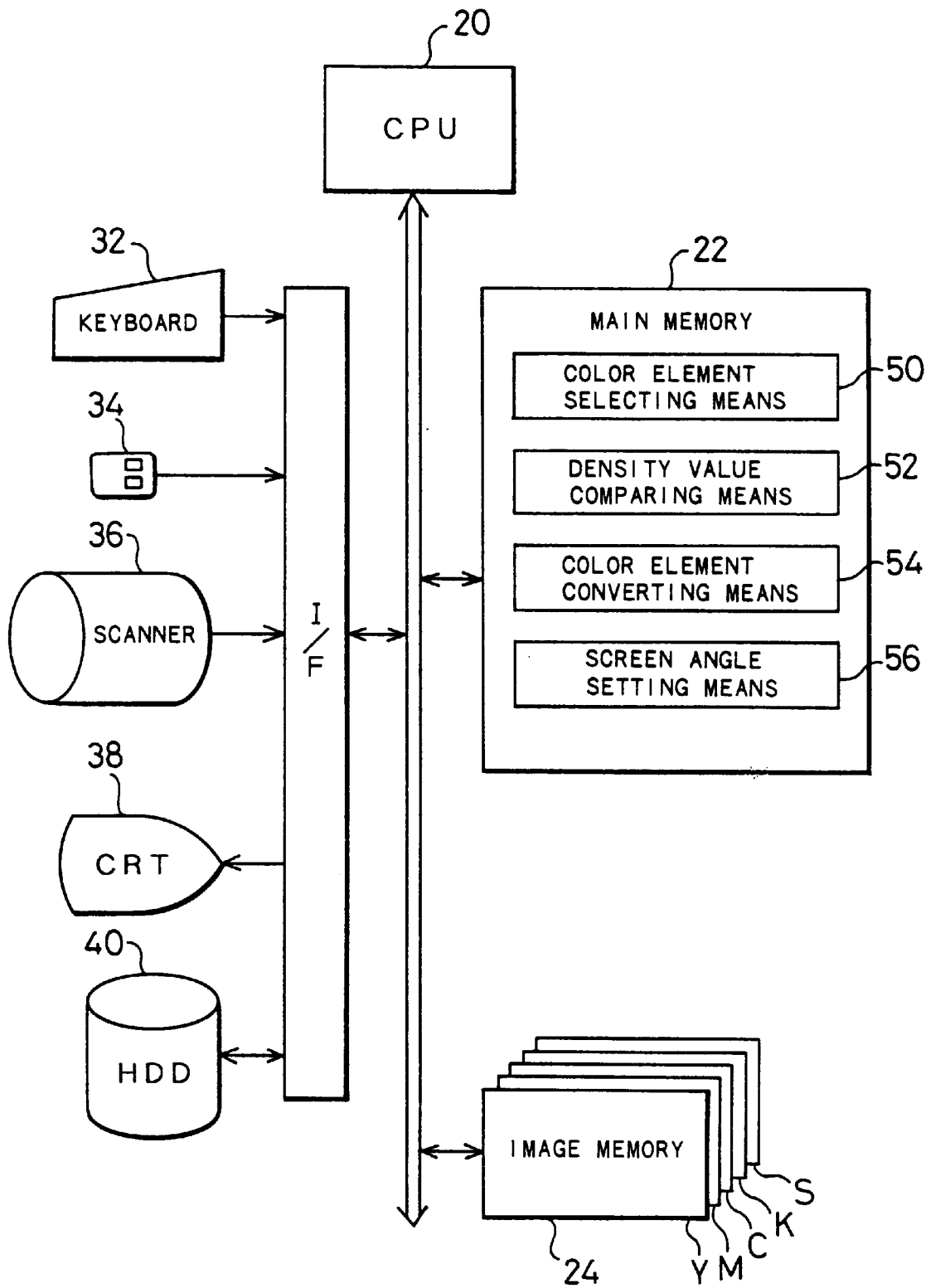

FIG. 1 is a block diagram illustrating the structure of an image processing apparatus embodying the present invention. The image processing apparatus is a computer system comprising a CPU 20, a main memory 22, and an image memory 24. The image processing apparatus further comprises a keyboard 32 and a mouse 34 functioning as input means or specifying means, a scanner 36 as image input means, a color CRT 38 as display means, and a hard disk drive 40 as external storage means.

The main memory 22 stores computer program codes implementing the functions of a color element selecting means 50, a density value comparing means 52, a color element converting means 54, and a screen angle setting means 56. The CPU 20 executes the software stored in the main memory 22 to effect the respective means. Details of these functions will be described later. The computer program codes implementing the functions of those means are stored in a portable storage medium (carriable storage medium), such as floppy disks and CD-ROM, and transferred from the portable storage medium to the main memory 22 or the hard disk drive 40.

The image memory 24 has a memory area of five planes, in which image data of five color separation images, that is, Y, M, C, and K separations and a special color separation (hereinafter referred to as 'S separation'), are respectively stored.

Figure 2:
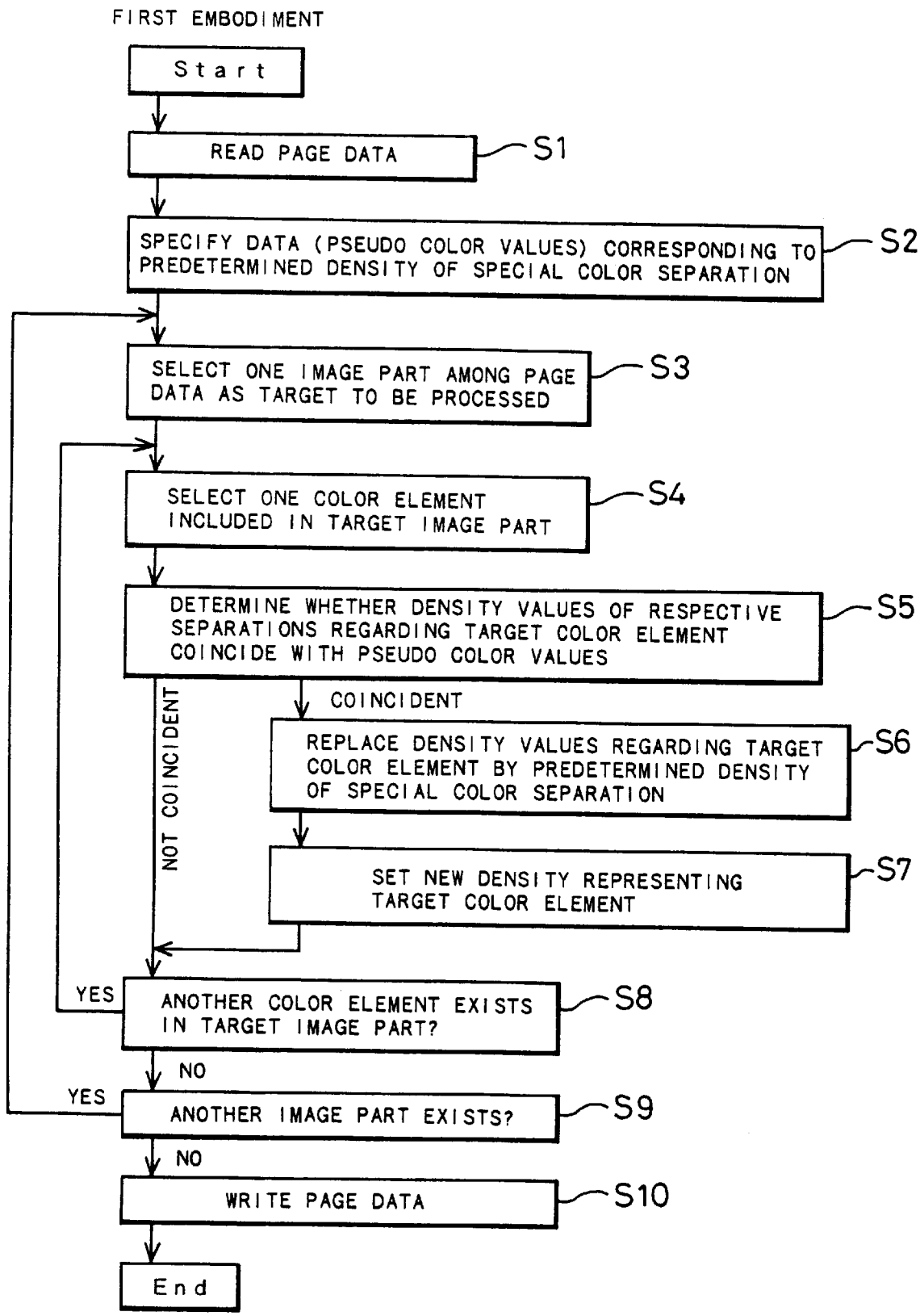
FIG. 2 is a flowchart showing a processing routine executed in the first embodiment.

FIG. 2 is a flowchart showing a processing routine executed in the first embodiment. When the program enters the routine, page data representing a one-page image to be processed are read out from the hard disk drive 40 to the image memory 24 at step S1. The one-page image herein refers to an image composed of a plurality of image parts, which are laid out on an image plane of one page. The image parts include a screen tint image area (tint image area) which is filled with a uniform density, a vignette image area (gradation image area) in which the density gradually varies at a constant rate of variation in a predetermined direction, and pictures.

Figure 3:
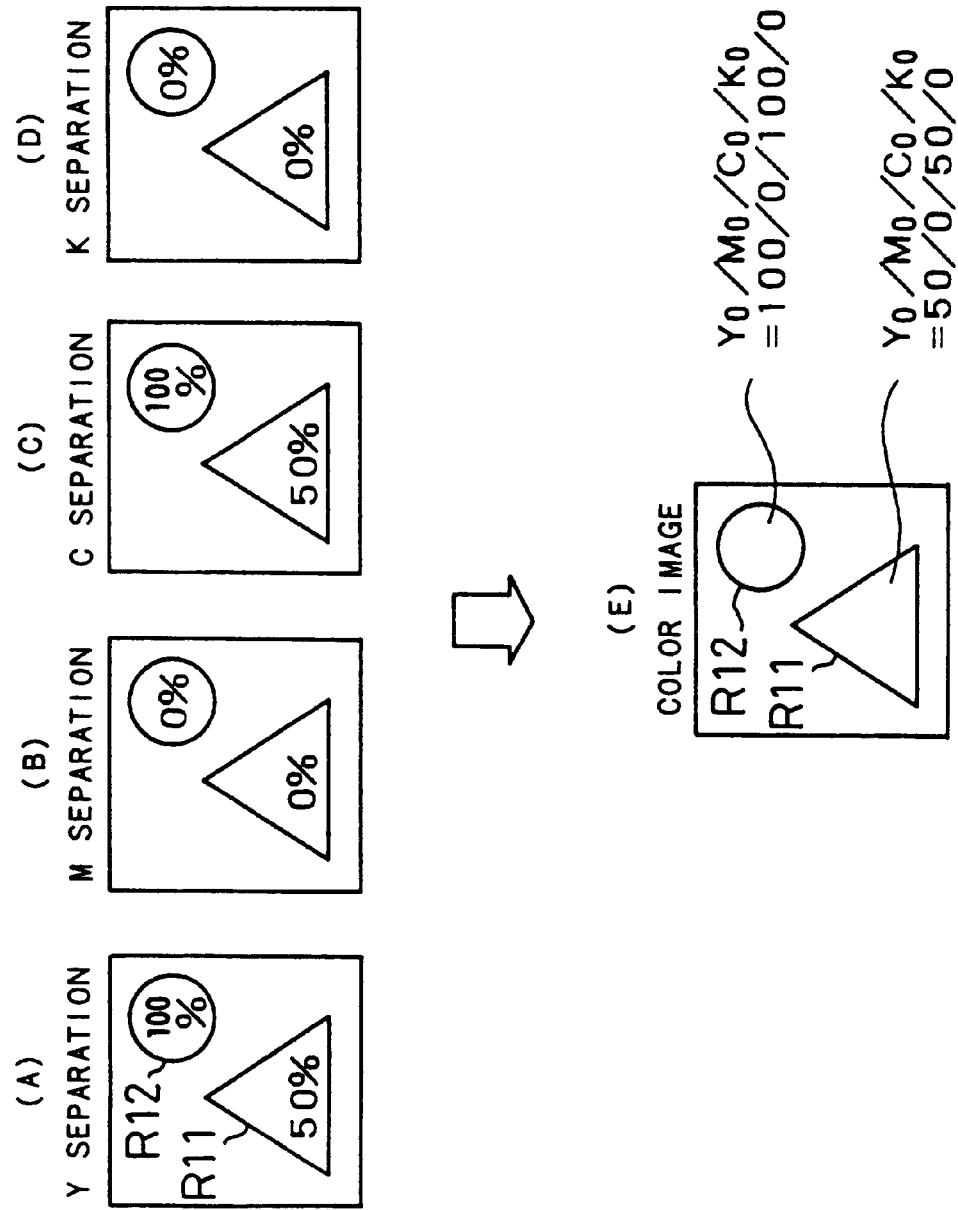
FIG. 3 shows an example of a one-page image to be processed in the first embodiment.

FIG. 3 shows an example of the one-page image to be processed in the first embodiment. (A), (B), (C), and (D) of FIG. 3 respectively show images of Y, M, C, and K separations, while (E) of FIG. 3 illustrates a color image reproduced by laying these images one upon another. Referring to (A) of FIG. 3, the one-page image has two tint image areas R12 and R12. The densities of Y, M, C, and K separations of the first image area R11 are 50%, 0%, 50%, and 0%, respectively, and those of the second image area R12 are 100%, 0%, 100%, and 0%.

At step S2 in the flowchart of FIG. 2, a user specifies density values of the Y, M, C, and K separations corresponding to a predetermined density of the special color separation (S separation). The density values of the Y, M, C, and K separations corresponding to the predetermined density of the special color separation are hereinafter referred to as 'pseudo color values' or 'specific densities'. The pseudo color values may be read out from a special color density database stored in the hard disk drive 40. The special color density database stores the specific densities of the Y, M, C, and K separations corresponding to predetermined densities of various special colors (for example, green orange, and metallic colors). The user can readily specify the corresponding pseudo color values of the Y, M, C, and K separations simply by selecting a special color and its density from the database. In accordance with an alternative procedure not using such a database, the user manually inputs a predetermined density of a special color separation and the corresponding pseudo color values of the Y, M, C, and K separations. In this embodiment, it is assumed that $Y_S=100\%$, $M_S=0\%$ $C_S=100\%$, and $K_S=0\%$ are set as pseudo color values of the Y, M, C, and K separations corresponding to 100% density (solid) of a special color separation.

The program proceeds to step S3, at which one image part is selected as a target to be processed among a plurality of image parts included in the one-page image. The plurality of image parts are registered in the form of a list in the page data representing the one-page image. At step S3, the plurality of image parts are successively extracted one by one. In the example of FIG. 3, the first image area R11 is selected first.

At step S4, the color element selecting means 50 extracts a color element included in the target image part thus selected and reads out color element data representing the extracted color element as a target of special color conversion processing. The term 'color element' herein implies a color expressed by the densities of the Y, M, C, and K separations. When the selected image part is a tint image area, only one color element is included in the image part. When the selected image part is a vignette image part or a picture, on the other hand, a plurality of color elements are included in the image part. The processing of step S4 selects one color element among the plurality of alternatives and reads out the initial densities of the Y, M, C, and K separations regarding the selected color element. In the example of FIG. 3, the initial densities for the first image area R1 are $Y_0=50\%$, $M_0=0\%$, $C_0=50\%$, and $K_0=0\%$.

The program then proceeds to step S5, at which the density value comparing means 52 determines whether the initial densities of the Y, M, C, and K separations obtained at step S4 thoroughly coincide with the pseudo color values specified at step S2. In the first embodiment, since $Y_S=100\%$, $M_S=0\%$, $C_S=100\%$, and $K_S=0\%$ have been set as the pseudo color values, these pseudo color values are compared with the initial density values $Y_0=50\%$, $M_0=0\%$, $C_0=50\%$, and $K_0=0\%$ in the first image area R11. The initial densities of the respective color separations regarding the first image area R1 are not identical with the pseudo color values, so the result of determination at step S5 is 'Not Coincident'.

When the result of determination is 'Not Coincident' at step S5, the program skips the processing of steps S6 and S7 and goes to step S8, at which it is determined whether another color element is included in the target image part. When another color element exists at step S8, the program returns to step S4 and repeats the processing of steps S4 through S7 for another color element. Since the first image area R11 shown in FIG. 3 is a tint image area and includes only one color element, however, the program goes from step S8 to step S9. It is determined at step S9 whether another image part is included in the one-page image. When another image part exists at step S9, the program returns to step S3 to select another image part (the second image area R12 in the example of FIG. 3) as a next target to be processed.

The initial density values of the respective color separations $Y_0=100\%$, $M_0=0\%$, $C_0=100\%$, and $K_0=0\%$ for the color element of the second image part thoroughly coincide with the pseudo color values $Y_S=100\%$, $M_S=0\%$, $C_S=100\%$, and $K_S=0\%$, respectively. In this case, the result of determination at step S5 is 'Coincident' and the program proceeds to step S6, at which the color element converting means 54 changes the density values of the Y, M, C, and K separations for the target color element to zero while setting the density of the special color separation equal to the predetermined density value (100%). At step S7, the color element converting means 54 sets the predetermined density of the special color as a new density representing the target color element. FIG. 4 illustrates a concrete procedure of the processing executed in the first embodiment. (A1) through (D1) of FIG. 4 show the initial density values $Y_0$, $M_0$, $C_0$, and $K_0$ of the Y, M, C, and K separations prior to the special color conversion of the color element, whereas (A2) through (D2) of FIG. 4 show density values $Y_1$, $M_1$, $C_1$, and $K_1$ of the Y, M, C, and K separations after the conversion and (E) of FIG. 4 shows a density value $S_1$ of the S separation after the special color conversion. As clearly shown in FIG. 4, in the first embodiment, the area having the color element thoroughly coinciding with the pseudo color values (that is, the second image area R12) is converted to have the predetermined density (100%) of the special color separation.

When the target color element to be processed already includes a density of the S separation, which is not equal to 0%, the result of determination at step S5 is always 'Not Coincident' regardless the initial density values of the Y, M, C, and K separations. This means that, even when the initial densities of the Y, M, C, and K separations thoroughly coincide with the pseudo color values, it is always determined as being not coincident at step S5.

In the determination procedure of step S5, allowable errors $\Delta Y$, $\Delta M$, $\Delta C$, and $\Delta K$ may be set for the respective pseudo color values of the Y, M, C, and K separations. In case that such allowable errors are set, the result of determination at step S5 is 'Coincident' when the initial density values $Y_0$, $M_0$, $C_0$, and $K_0$ of the Y, M, C, and K separations for the target color element are within the preset ranges of the pseudo color values taking into account the respective allowable errors; the ranges are $Y_S \pm \Delta Y$, $M_S \pm \Delta M$, $C_S \pm \Delta C$, and $K_{S \pm \Delta K}$.

The processing of steps S3 through S9 in the flowchart of FIG. 2 is repeated to determine whether the initial density values of the Y, M, C, and K separations with respect to each color element included in each image part coincide with the pseudo color values and convert the density values of the color element to a predetermined density of a special color separation. At step S10, the converted page data representing the one-page image thus obtained are written into the hard disk drive 40.

If a user desires to make an image area which is to be reproduced by a special color separation, the user could set the initial density values of the image area to coincide with the pseudo color values. The image area of a special color separation can be produced readily by converting the initial densities of the Y, M, C, and K separations to a predetermined density of the special color separation according to the processing routine of FIG. 2.

As discussed above, the process of the first embodiment enables an image area, which is supposed to be reproduced by four basic color separations, Y, M, C, and K, to be reproduced by only a special color separation, thereby effectively preventing moires from being observed. A desired ink other than Y, M, C, and K may be used as a special color, so that the color reproducibility can be enhanced favorably. By way of example, in case that green color is reproduced by the Y, M, C, and K separations, the initial densities are set as Y=100%, M=0%, C=100%, and K=0%. Specifying green as a special color enables the initial densities of the Y, M, C, and K separations to be set all equal to 0%. This remarkably improves the reproducibility of green in printed matters. Printing with five or more color separations including a special color separation gives the depth in color to the resulting printed matters.

Any arbitrary density value other than 100% (solid) may be set as the predetermined density of the special color separation. As for a one-page image including no back separation, density values of the other three color separations, Y, M, and C are sufficiently set as pseudo color values.

B. Second Embodiment

Figure 5:
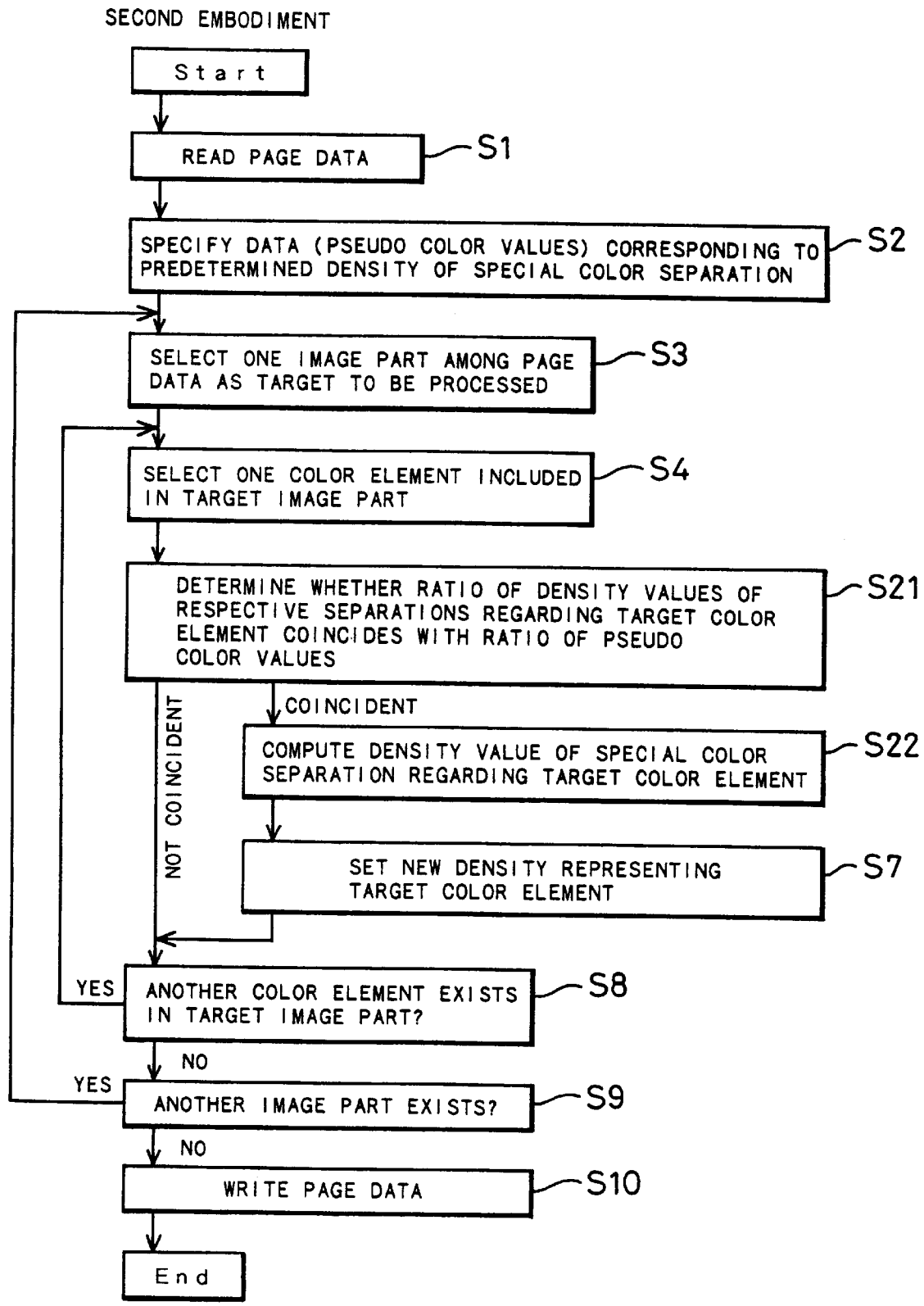
FIG. 5 is a flowchart showing a processing routine executed in a second embodiment.

FIG. 5 is a flowchart showing a processing routine executed in a second embodiment, and FIG. 6 illustrates a concrete procedure of the processing executed in the second embodiment. The processing routine of FIG. 5 is similar to that of the first embodiment shown in FIG. 2, except that steps S21 and S22 are carried out instead of steps S5 and S6.

At step S21 in the flowchart of FIG. 5, the density value comparing means 52 determines whether a ratio $RT_0$ (=$Y_0:M_0:C_0:K_0$) of the initial density values of the respective color separations regarding the target color element coincides with a ratio $RT_S$ (=$Y_S:M_S:C_S:K_S$) of the pseudo color values of the Y, M, C, and K separations. When coincident, the program proceeds to step S22, at which the color element converting means 54 calculates a density value $S_1$ of the special color separation regarding the target color element according to the following Equation (1):

$$S_1 = S_S \times Y_0/Y_S \quad (1)$$

while new density values $Y_1$, $M_1$, $C_1$, and $K_1$ of the Y, M, C, and K separations regarding the target color element are set all equal to 0%. Since the ratio $RT_0$ of the densities of the respective color separations regarding the target color element coincides with the ratio $RT_S$ of the pseudo color values, the ratio $Y_0/Y_S$ in Equation (1) can be replaced by the ratio of another color separation, $M_0/M_S$, $C_0/C_S$, or $K_0/K_S$.

In the example of FIG. 6, it is assumed that $Y_S$=100%, $M_S$=0%, $C_S$=100%, and $K_S$=0% are set as pseudo color values corresponding to a predetermined density $S_S$=100% of the special color separation. The ratio $RT_0$ (=50:0:50:0= 1:0:1:0) of the density values of the Y, M, C, and K separations in the first image area R11 is identical with the ratio $RT_S$. (=100:0:100:0=1:0:1:0) of the pseudo color values. The initial density values $Y_0$, $M_0$, $C_0$, and $K_0$ of the Y, M, C, and K separations in the first image area R11 are thus all changed to 0%, whereas the density $S_1$ of the special color separation is set equal to 50% according to Equation (1). In a similar manner, the ratio $RT_0$ (=100:0:100:0= 1:0:1:0) of the initial density values of the Y, M, C, and K separations in the second image area R12 is identical with the ratio $RT_S$, of the pseudo color values. The initial density values $Y_0$, $M_0$, $C_0$, and $K_0$ of the Y, M, C, and K separations in the second image area R2 are thus all changed to 0%, whereas the density $S_1$ of the special color separation is set equal to 100% according to Equation (1).

Even when the ratio $RT_0$, of the density values is coincident with the ratio $RT_S$, of the pseudo color values, if the density value $S_1$ of the special color separation computed by the above Equation (1) exceeds 100%, the result of determination at step S21 is always 'Not Coincident' regardless the densities of the Y, M, C, and K separations.

In the determination procedure of step S21, allowable errors $\Delta Y$, $\Delta M$, $\Delta C$, and $\Delta K$ may be set for the respective pseudo color values of the Y, M, C, and K separations. In case that such allowable errors are set, the result of determination at step S21 is 'Coincident' when the density values $Y_0 M_0$, $C_0$, and $K_0$ of the Y, M, C, and K separations regarding the target color element satisfy all the relationships expressed by Inequalities (2a) through (2c) given below:

$$\frac{Y_S}{Y_0} - \left(\frac{\Delta Y}{Y_0} + \frac{\Delta M}{M_0}\right) < \frac{M_S}{M_0} < \frac{Y_S}{Y_0} + \left(\frac{\Delta Y}{Y_0} + \frac{\Delta M}{M_0}\right) \quad (2a)$$

$$\frac{Y_S}{Y_0} - \left(\frac{\Delta Y}{Y_0} + \frac{\Delta C}{C_0}\right) < \frac{C_S}{C_0} < \frac{Y_S}{Y_0} + \left(\frac{\Delta Y}{Y_0} + \frac{\Delta C}{C_0}\right) \quad (2b)$$

$$\frac{Y_S}{Y_0} - \left(\frac{\Delta Y}{Y_0} + \frac{\Delta K}{K_0}\right) < \frac{K_S}{K_0} < \frac{Y_S}{Y_0} + \left(\frac{\Delta Y}{Y_0} + \frac{\Delta K}{K_0}\right) \quad (2c)$$

As discussed above, when the ratio of the initial density values of the Y, M, C, and K separations regarding the target color element coincides with the ratio of the pseudo color values, the process of the second embodiment determines the density value of a special color separation according to the ratio of the density value of each color separation regarding the target color element to the pseudo color value, thereby producing the special color separation, which has a density distribution. This process is especially suitable for the cases in which vignette image areas (gradation image areas) are expressed by the special color separation. Since this process also reduces the densities of the Y, M, C, and K separations, it effectively preventing moires from being observed.

C. Third Embodiment

Figure 7:
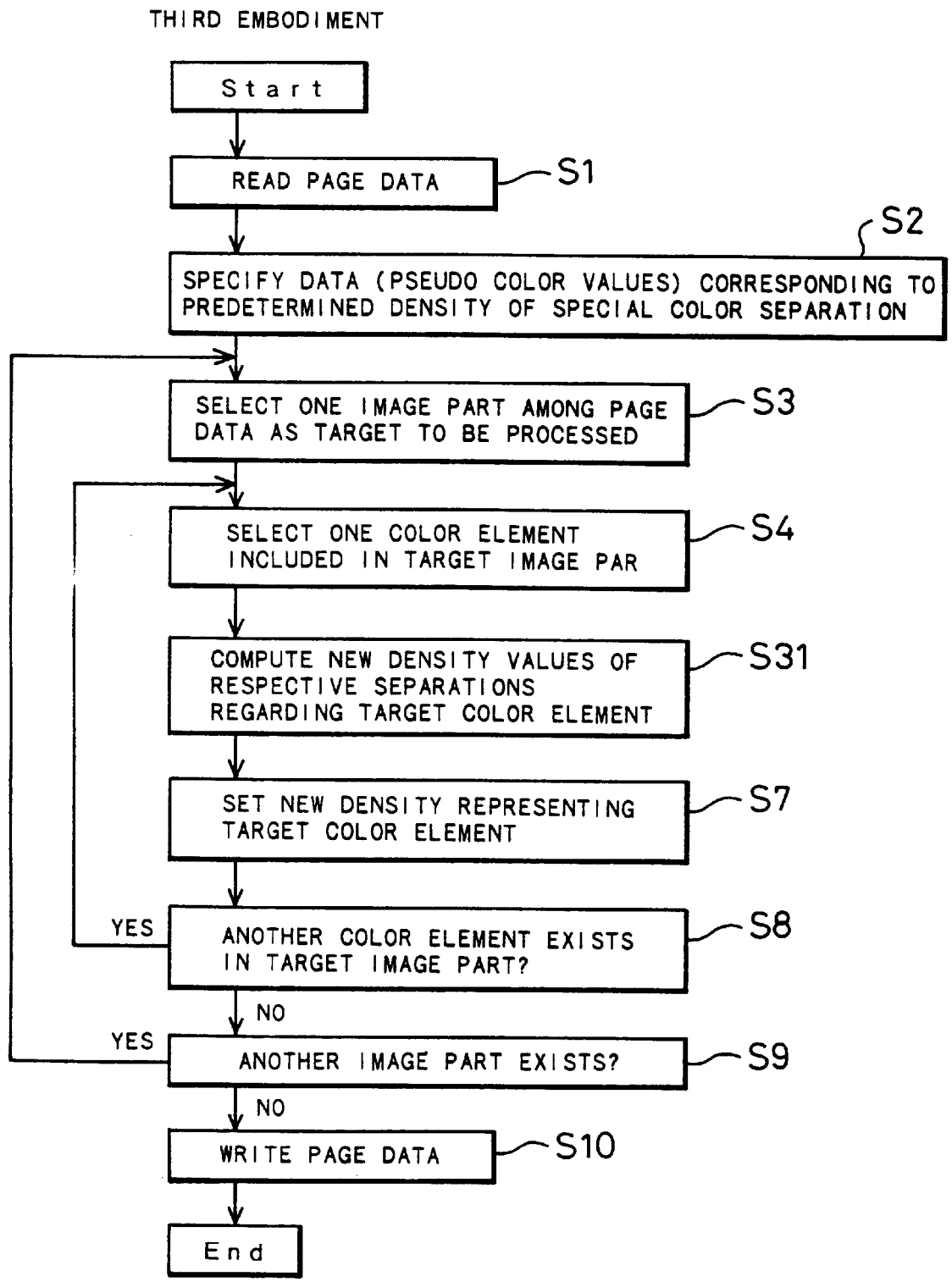
FIG. 7 is a flowchart showing a processing routine executed in a third embodiment.

FIG. 7 is a flowchart showing a processing routine executed in a third embodiment, and FIG. 8 illustrates a concrete procedure of the processing executed in the third embodiment. The processing routine of FIG. 7 is similar to that of the second embodiment shown in FIG. 5 except that step S21 is omitted and step S22 is replaced by step S31.

At step S31 in the flowchart of FIG. 7, the color element converting means 54 computes new density values $S_1$, $Y_1$, $M_1$, $C_1$, and $K_1$ of the respective color separations including the special color separation based on the pseudo color values $Y_S$, $M_S$, $C_S$, and $K_S$ of the Y, M, C, and K separations and the initial density values $Y_0$, $M_0$, $C_0$, and $K_0$ of the respective color separations regarding the target color element according to Equations (3a) through (3e) given below:

$$S_1 = \text{Min}(Y_0/Y_S, M_0/M_S, C_0/C_S, K_0/K_S, 1) \quad (3a)$$

$$Y_1 = Y_0 - S_1 \times Y_S \quad (3b)$$

$$M_1 = M_0 - S_1 \times M_S \quad (3c)$$

$$C_1 = C_0 - S_1 \times C_S \quad (3d)$$

$$K_1 = K_0 - S_1 \times K_S \quad (3e)$$

wherein the operator Min( ) represents an operation of selecting a minimum from the values in parentheses. Any separation having the preset pseudo color value equal to 0% is excluded from Equations (3a) through (3e) given above.

In the example of FIG. 8, the density values of the respective color separations regarding the target color element in the first image area R11 are $Y_0$=30%, $M_0$=30%, $C_0$=5%, and $K_0$=10%, whereas those regarding the target color element in the second image area R12 are $Y_0$=20%, $M_0$=60%, $C_0$=20%, and $K_0$=0%. It is assumed that $Y_S$=20%, $M_S$=40%, $C_S$=10%, and $K_S$=0% are set as pseudo color values corresponding to a predetermined density $S_S$=100% of the special color separation. Since the pseudo color value $K_S$ of the K separation is set equal to 0%, this is excluded from the above Equations (3a) through (3e). Namely the above Equations (3a) through (3e) are rewritten as Equations (4a) through (4e) given below:

$$S_1 = \text{Min}(Y_0/Y_S, M_0/M_S, C_0/C_S, 1) \quad (4a)$$

$$Y_1 = Y_0 - S_1 \times Y_S \quad (4b)$$

$$M_1 = M_0 - S_1 \times M_S \quad (4c)$$

$$C_1 = C_0 - S_1 \times C_S \quad (4d)$$

$$K_1 = K_0 \quad (4e)$$

The density $S_1$ of the special color separation in the first image area R11 is determined to be 50% according to Equation (4a) above. The new densities $Y_1$, $M_1$, $C_1$, and $K_1$ of the Y, M, C, and K separations are respectively equal to 20%, 10%, 0%, and 10%. The density $S_1$ of the special color separation in the second image area R2 is, on the other hand, determined to be 100%, and the new densities $Y_1$, $M_1$, $C_1$, and $K_1$ of the Y, M, C, and K separations are respectively equal to 0%, 20%, 10%, and 0%.

The value '1' in the right hand side of Equations (3a) and (4a) is used to restrict the upper limit of the density value $S_1$ of the special color separation to 100%.

As discussed above, the process of the third embodiment presets the pseudo color values $Y_S$, $M_S$, $C_S$, and $K_S$ of the respective color separations corresponding to the predetermined density $S_S$ of the special color separation, subtracts the values proportional to the pseudo color values from the initial densities of the respective color separations in each image area, and determines the density of the special color separation corresponding to the subtracted densities of the respective color separations. This process reduces the densities of the Y, M, C, and K separations as shown in FIG. 8, thereby effectively preventing moires from being observed.

D. Fourth Embodiment

Figure 9:
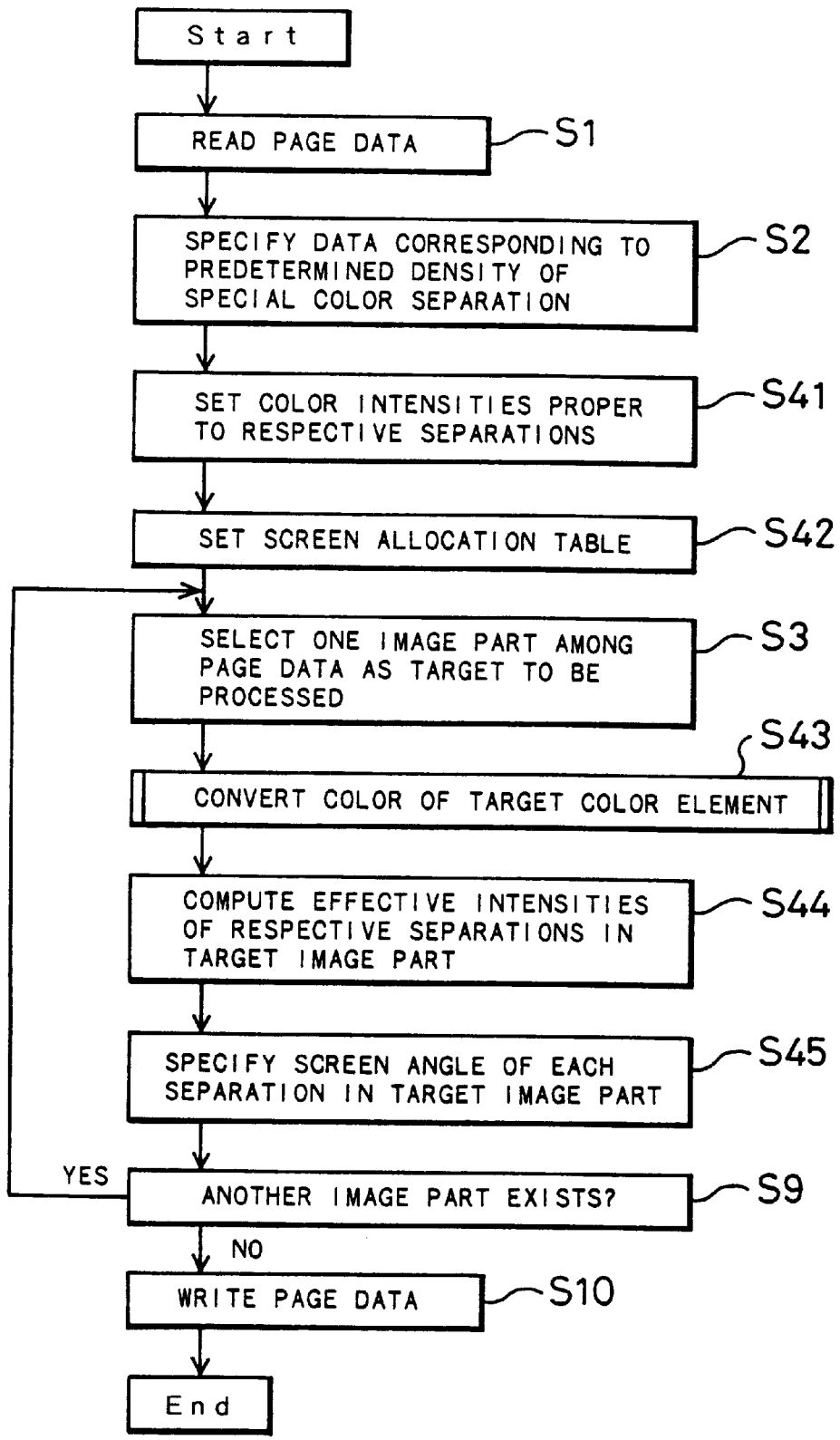
FIG. 9 is a flowchart showing a processing routine executed in a fourth embodiment.

FIG. 9 is a flowchart showing a processing routine executed in a fourth embodiment. Steps S1, S2, S3, S9, and S10 in the flowchart of FIG. 9 are identical with the corresponding steps in the first through the third embodiments discussed above. At step S41 in the flowchart of FIG. 9, color intensities $I_{Y0}$, $I_{M0}$, $I_{C0}$, $I_{K0}$, and $I_{S0}$, of the Y, M, C, and K separations and a special color separation are set according to Equations (5a) through (5e) given below:

$$I_{Y0} = 0.114 \quad (5a)$$

$$I_{M0} = 0.299 \quad (5b)$$

$$I_{C0} = 0.587 \quad (5c)$$

$$I_{K0} = 1.000 \quad (5d)$$

$$I_{S0} = I_{Y0} \times Y_S + I_{M0} \times M_S + I_{C0} \times C_S + I_{K0} \times K_S \quad (5e)$$

By way of example, it is assumed that $Y_S = 20\%$, $M_S = 40\%$, $C_S = 10\%$, and $K_S = 0\%$ are set as pseudo color values corresponding to a predetermined density $S_S = 100\%$ of the special color separation. The color intensity $I_{S0}$ of the special color separation is determined to be 0.201 by Equation (5e) above. The color intensity implies a relative intensity proper to the color of each color separation and more concretely represents a relative density of a solid image of each color separation. The above Equations (5a) through (5e) are derived from expressions for obtaining luminance of television signals, but other equations may be used for defining the color intensities of the respective color separations.

Referring back to the flowchart of FIG. 9, a screen allocation table is set at step S42. FIG. 10 illustrates an exemplified screen allocation table. The screen allocation table sets screen angles used for the respective color separations according to a number of color separations required for reproducing each image area. For example, when a certain image area is reproduced only by one color separation, the screen angle is set equal to 45 degrees. In case that an image area is reproduced by two color separations laid one upon the other, the halftone angles are set as 45 degrees and 0 degree in descending order of effective color intensities of the color separations. The effective color intensities of the color separations are obtained by multiplying the color intensities of the respective color separations by the densities of the color separations. When a certain image area is reproduced by five color separations laid one upon another, the screen angles of the first three color separations are set equal to 45 degrees, 15 degrees, and 75 degrees in descending order of effective color intensities. A first FM-dot is used for the fourth color separation, and a second FM-dot for the fifth color separation. The 'FM-dot' is a screening process for expressing the density of an image by frequency modulation and is also referred to as 'FM screening'. In FM-dot, dots on which ink is applied have an identical size, and the frequency of dots is varied according to the density of the image. Unlike the standard halftone dots, FM-dot does not have periodicity for the positions of dots, thereby effectively preventing moires and rosette pattern in multicolor printing. Application of two different types of FM-dot to an image area reproduced by five color separations enables the difference in screen angle between the other three color separations to be kept at 30 degrees. It is known to the skilled of the art that setting the difference in screen angle between color separations to 30 degrees can effectively prevent moires from being observed. In the manner discussed above, FM-dot is applied to an image area reproduced by five or more color separations. This reduces the number of color separations, to which the standard halftone dots (or 'normal halftone dots') are applied, to four or a less number, thereby effectively preventing moires from being observed.

The screen allocation table may be read out from a screen allocation database previously prepared or otherwise specified manually by the user.

Referring back to the flowchart of FIG. 9, at step S43, the color element converting means 54 implements the processing of steps S5, S6, and S7 of the first embodiment shown in FIG. 2, the processing of steps S21, S22, and S7 of the second embodiment shown in FIG. 5, and the processing of steps S31 and S7 of the third embodiment shown in FIG. 7, in order to convert the color separations of the target color element. In the fourth embodiment, it is assumed that the processing of steps S31 and S7 of the third embodiment is carried out at step S43 so as to determine the new densities $Y_1$, $M_1$, $C_1$, $K_1$, and $S_1$ of the respective color separations as shown in (A2) through (D2) and (E) of FIG. 8.

At step S44, the screen angle setting means 56 calculates effective color intensities $I_Y$, $I_M$, $I_C$, $I_K$ and $I_S$ of the respective color separations in the target image part according to Equations (6a) through (6e) given below:

$$I_Y = I_{Y0} \times Y_1 \quad (6a)$$

$$I_M = I_{M0} \times M_1 \quad (6b)$$

$$I_C = I_{C0} \times C_1 \quad (6c)$$

$$I_K = I_{K0} \times K_1 \quad (6d)$$

$$I_S = I_{S0} \times S_1 \quad (6e)$$

Figure 11:
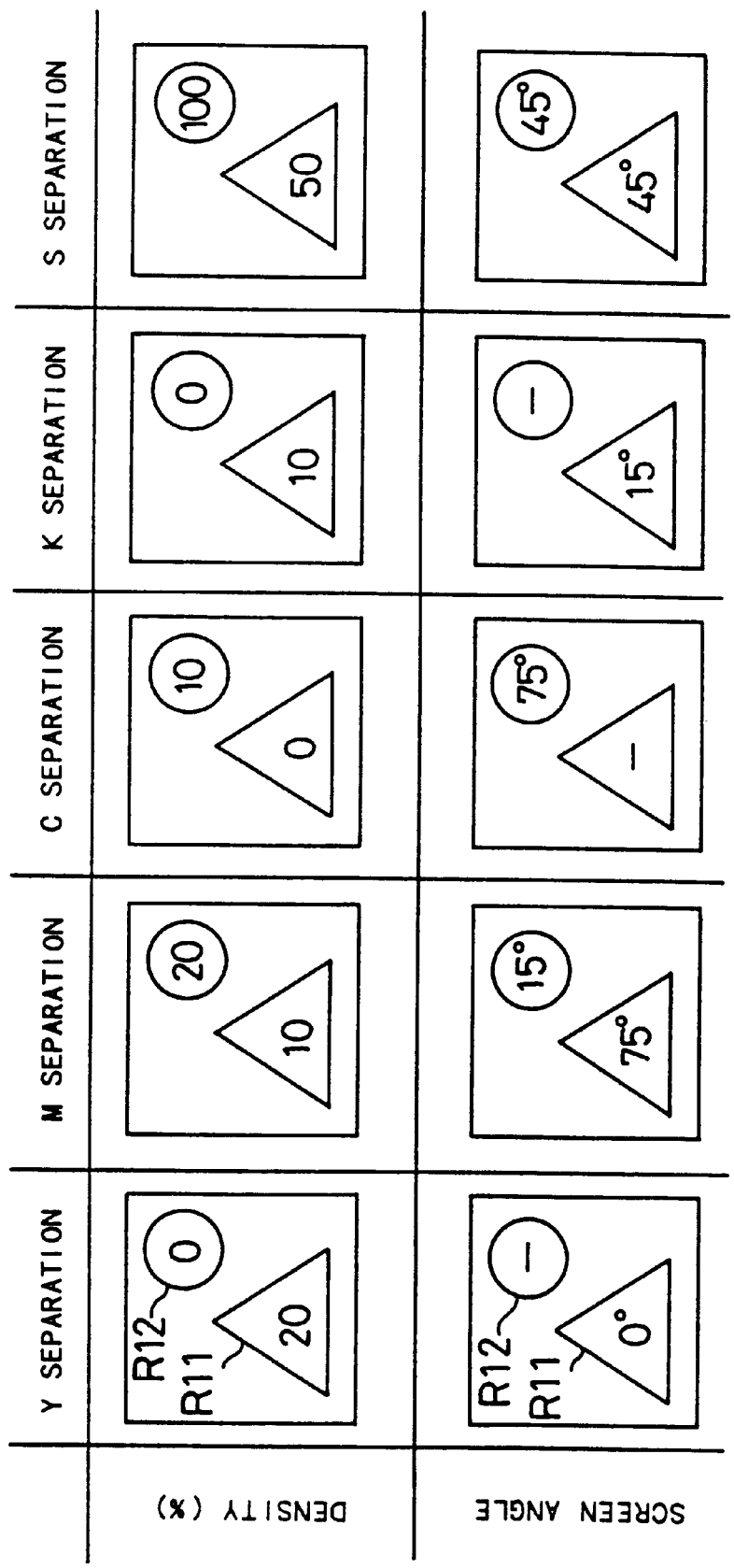
FIG. 11 illustrates a concrete procedure of the processing executed in the fourth

At step S45, the screen angle setting means 56 determines the screen angle and the screen type of each color separation according to the screen allocation table shown in FIG. 10, based on the number of color separations used for reproducing each image part and their effective color intensities. FIG. 11 shows a concrete procedure of the processing executed in the fourth embodiment. In the upper row of FIG. 11, the new densities $Y_1$, $M_1$, $C_1$, $K_1$, and $S_1$ after the special color conversion operation are shown for the respective image parts (that is, the image areas R11 and R12). These are identical with the results of the third embodiment shown in (A2) through (D2) and (E) of FIG. 8. The four color separations, Y, M, K, and S are used for reproducing the first image area R11. The effective color intensities of these color separations are $I_Y$=0.0288, $I_M$=0,0299, $I_K$=0.100, and $I_S$=0.1005. Allocation of the screen angles to the color separations in the order of effective color intensity results in the halftone angles of $\theta_S$=45 degrees, $\theta_K$=15 degrees, $\theta M$=75 degrees, and $\theta_Y$=0 degree. The three color separations M, C, and S are used for reproducing the second image area R12. The effective color intensities of these color separations are $I_M$=0.0598, $I_C$=0.0587, and $I_S$=0.201. Allocation of the screen angles to the color separations in the order of effective color intensity results in the screen angles of $\theta_S$=45 degrees, $\theta_M$=15 degrees, and $\theta_C$=75 degrees.

As discussed above, the process of the fourth embodiment allocates different types of screening to the respective color separations, based on the number of color separations used for reproducing each image part (image area) and the effective color intensities of the respective color separations, thus effectively preventing moires from being observed.

The first through fourth embodiments can be modified, for example, as follows:

(1) Although only one special color separation is used in each of the above embodiments, a plurality of special color separations may be used instead. In case that a plurality of special color separations are used, densities of Y, M, C, and K separations are first converted to a density of a first special color separation, and the resulting densities of the Y, M, C, and K separations are again converted to a density of a second special color separation.

(2) In the above embodiments, a special color separation is produced for a color image reproduced by Y, M, C, and K separations. It is, however, also possible to prepare a special color separation for a color image reproduced by only the three color separations, Y, M, and C. In the latter case, the part regarding the K separation should be omitted from the above discussion.

(3) In the above embodiments, all the image parts included in a color image are selected as targets or objects to be processed. In accordance with an alternative application, target image parts (or image areas) may be restricted. By way of example, only the color elements in screen tint image areas or vignette image areas may be specified as targets.

E. Fifth Embodiment

Figure 12:
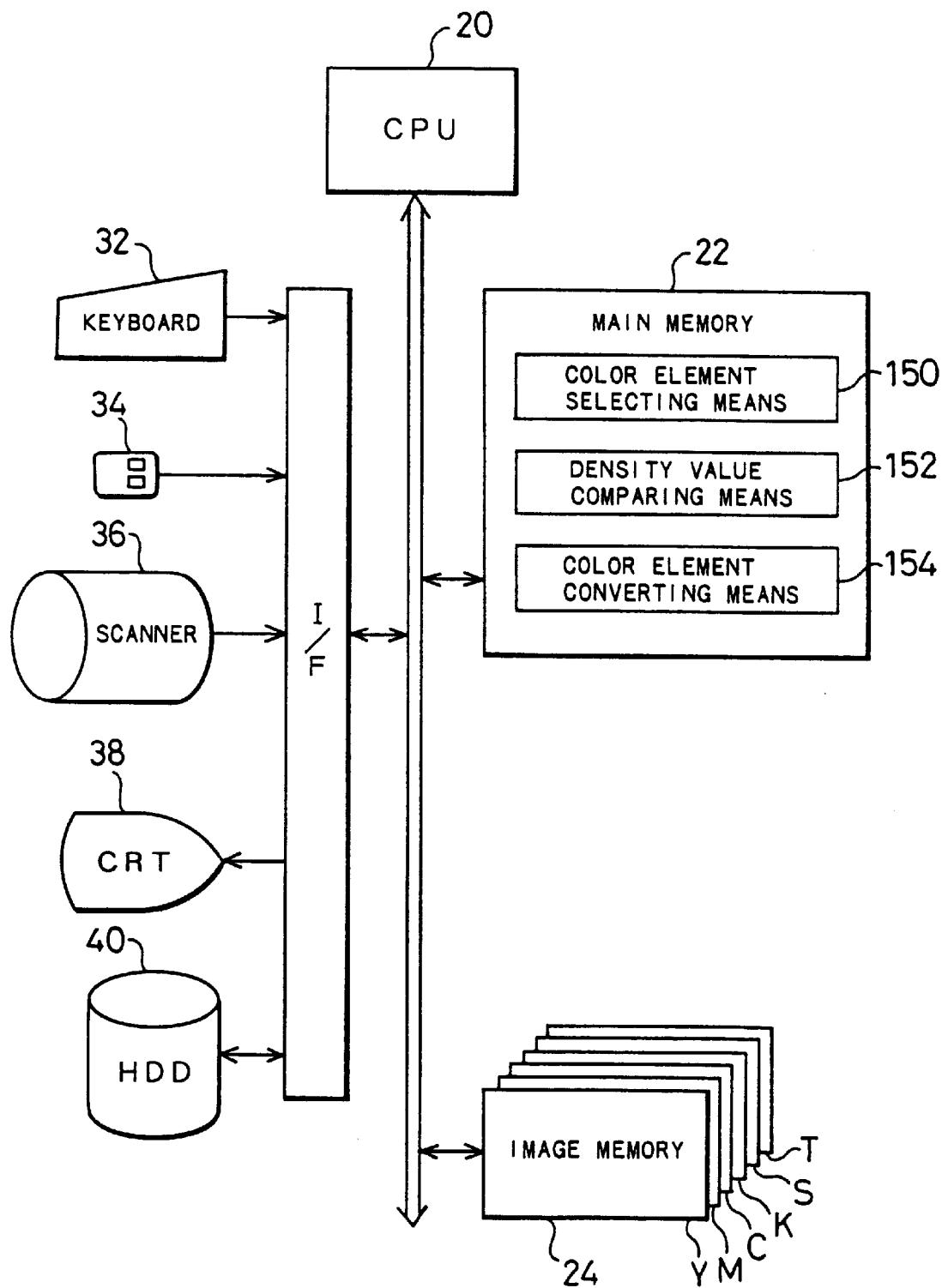
FIG. 12 is a block diagram illustrating structure of an image processing apparatus to which fifth through eighth embodiments of the present invention are applied.

FIG. 12 is a block diagram illustrating the structure of an image processing apparatus to which fifth through eighth embodiment of the present invention are applied.

The main memory 22 stores computer program codes implementing the functions of a color element selecting means 150, a density value comparing means 152, and a color element converting means 154. The CPU 20 executes the program codes stored in the main memory 22 to effect the respective means. Details of these functions will be described later. The program codes implementing the functions of such means are stored in a portable storage medium (carriable storage medium), such as floppy disks and CD-ROM, and transferred from the portable storage medium to the main memory 22 or the hard disk drive 40.

The image memory 24 has a memory area of six planes, in which image data of six color separation images, that is, Y, M, C, and K separations and a plurality of special color separations are respectively stored. In the following embodiments, two special color separations are referred to as 'S separation' and 'T separation'. Y, M, C, and K separations (or Y, M, and C separations) are referred to as 'basic color separations'.

Figure 13:
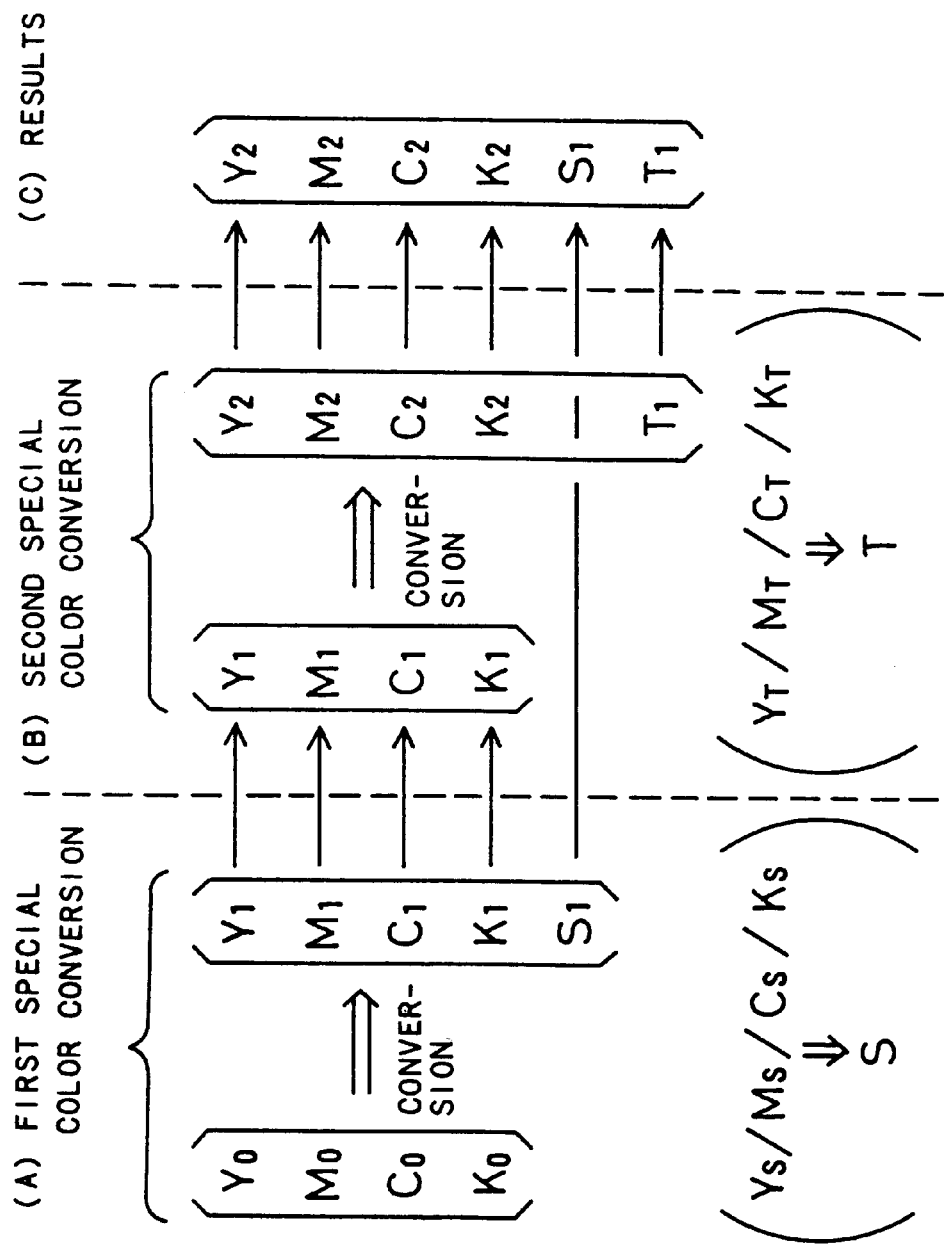
FIG. 13 shows a main concept of the method of preparing a plurality of special color separations in accordance with the fifth embodiment.

FIG. 13 shows a main concept of the method of preparing a plurality of special color separations in accordance with the fifth embodiment. Referring to the left column of (A) of FIG. 13, it is assumed that densities of Y, M, C, and K separations regarding a target color element are respectively expressed by $Y_0$, $M_0$, $C_0$, and $K_0$. In the fifth embodiment, these densities $Y_0$, $M_0$, $C_0$, and $K_0$ are first converted to a density of the S separation as shown by the arrow in (A) of FIG. 13; this conversion is hereinafter referred to as 'first special color conversion'. As a result of the first special color conversion, the densities of the Y, M, C, and K separations are converted to $Y_1$, $M_1$, $C_1$, and $K_1$, and the density of the S separation is set equal to $S_1$. Densities $Y_S$, $M_S$, $C_S$, and $K_S$ of the Y, M, C, and K separations corresponding to a predetermined density of the S separation have previously been set by the user. The densities $Y_S$, $M_S$, $C_S$, and $K_S$ will be hereinafter referred to as 'first specific densities' or 'first pseudo color values'. The density $S_1$ of the S separation is determined according to the first specific densities. Details of the determination process will be described later.

The densities $Y_1$, $M_1$, $C_1$, and $K_1$ of the Y, M, C, and K separations thus obtained are then converted to a density of the T separation as shown by the arrow in (B) of FIG. 13; this conversion is hereinafter referred to as second special color conversion'. As a result of the second special color conversion, the densities of the Y, M, C, and K separations are converted to $Y_2$, $M_2$, $C_2$, and $K_2$, and the density of the T separation is set equal to $T_1$. Densities $Y_T$, $M_T$, $C_T$, and $K_T$ of the Y, M, C, and K separations corresponding to a predetermined density of the T separation have previously been set by the user. The densities $Y_T$, $M_T$, $C_T$, and $K_T$ will be hereinafter referred to as 'second specific densities' or 'second pseudo color values'. The density $T_1$ of the T separation is determined according to the second specific densities. Consequently the densities $Y_2$, $M_2$, $C_2$, and $K_2$ of the Y, M, C, and K separations after the second special color conversion, the density $S_1$ of the S separation obtained by the first special color conversion, and the density $T_1$ of the T separation obtained by the second special color conversion are used as final density values of the six color separations.

Figure 14:
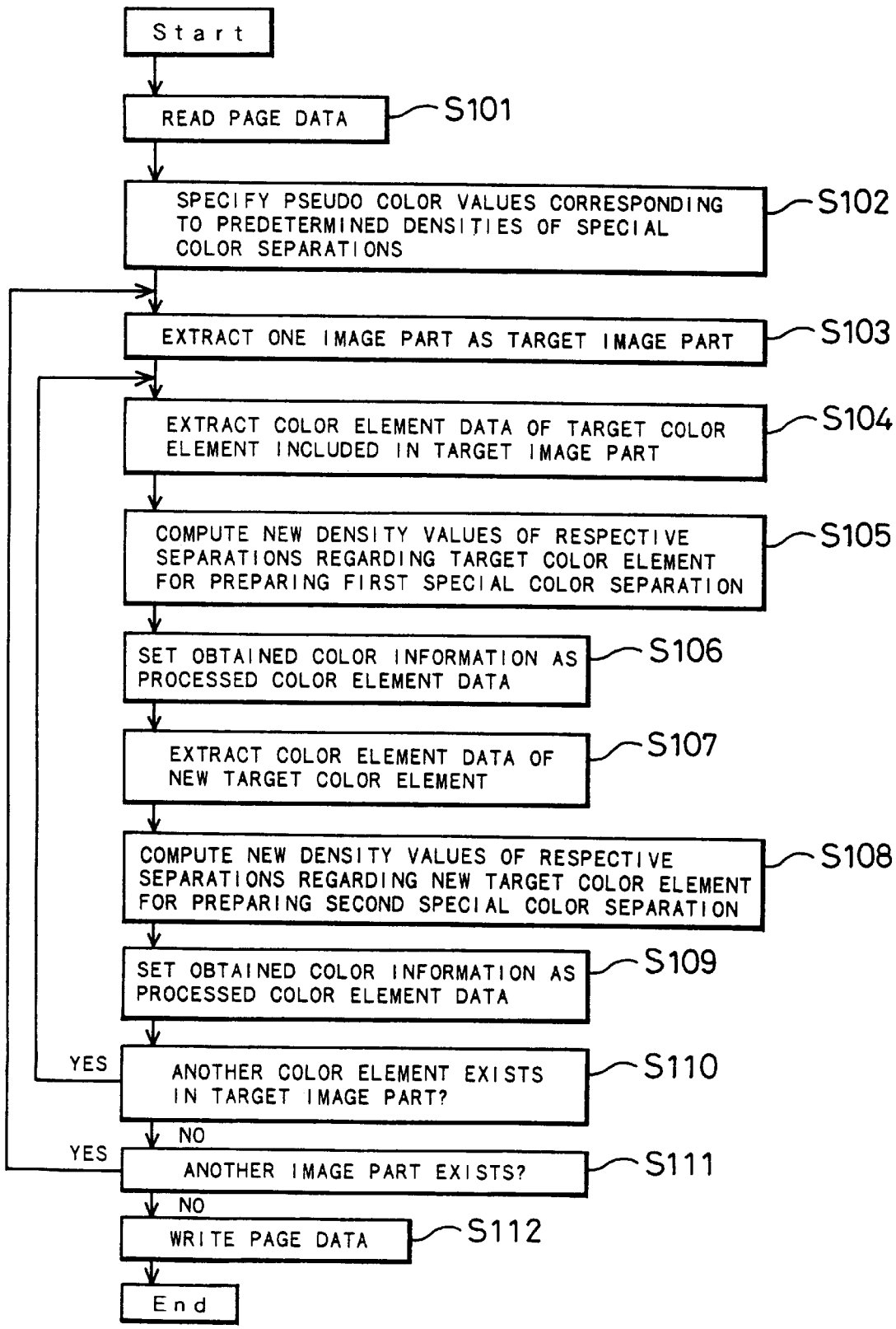
FIG. 14 is a flowchart showing a processing routine executed in the fifth embodiment.

FIG. 14 is a flowchart showing a processing routine executed in the fifth embodiment. When the program enters the routine, page data representing a one-page image to be processed are read out from the hard disk drive 40 to the image memory 24 at step S101. The one-page image herein refers to an image composed of a plurality of image parts, which are applied on an image plane of one page. The image parts include tint image areas filled with a uniform density, vignette image areas, and pictures.

Figure 15:
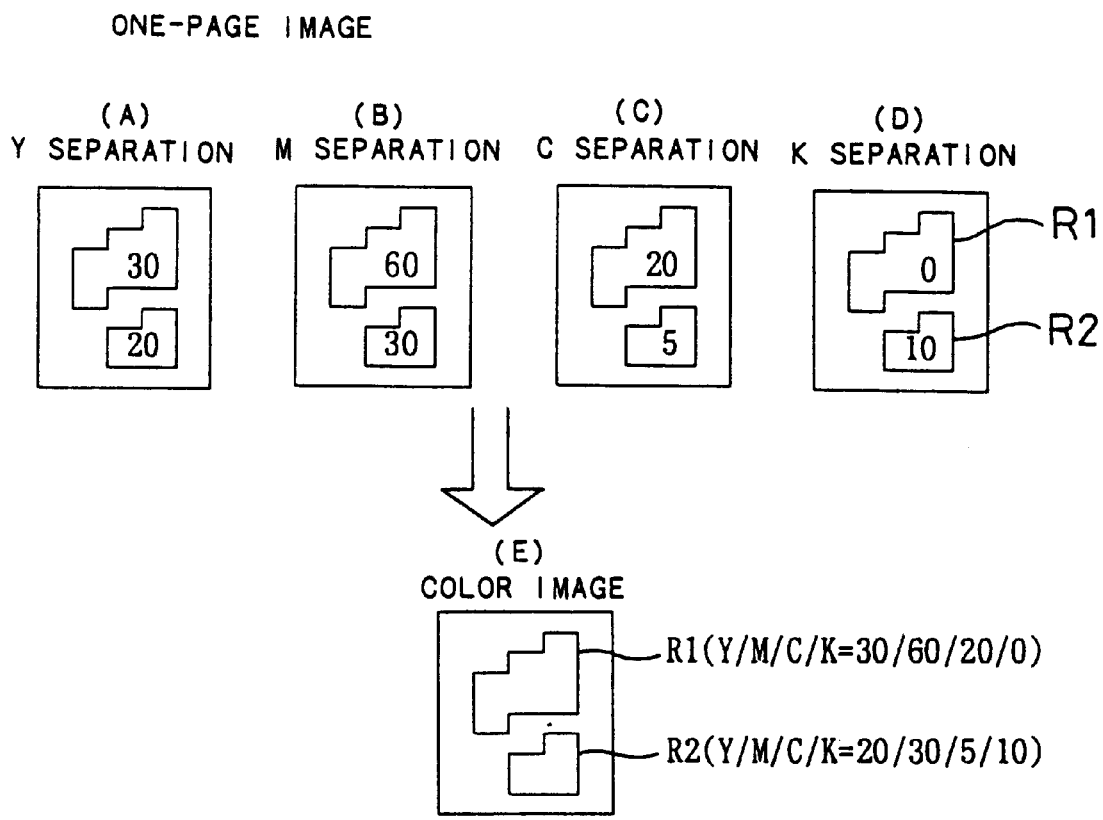
FIG. 15 shows an example of a one-page image to be processed in the fifth embodiment.

FIG. 15 shows an example of the one-page image to be processed in the fifth embodiment. (A), (B), (C), and (D) of FIG. 15 respectively show images of Y, M, C, and K separations, while (E) of FIG. 15 illustrates a color image reproduced by laying these images one upon another. Referring to (A) of FIG. 15, the one-page image has two tint image areas R1 and R2. The densities of Y, M, C, and K separations of the first image area R1 are 30%, 60%, 20%, and 0%, respectively, and those of the second image area R2 are 20%, 30%, 5%, and 10%.

At step S102 in the flowchart of FIG. 14, a user specifies first pseudo color values (or first specific densities) of the Y, M, C, and K separations corresponding to a predetermined density of the S separation, and second pseudo color values (or second specific densities) corresponding to a predetermined density of the T separation. The pseudo color values may be read from a special color density database stored in the hard disk drive 40. The densities of the Y, M, C, and K separations corresponding to predetermined densities of various special colors (for example, green, orange, and metallic colors) are registered in the special color density database. The user can readily specify the corresponding pseudo color values of the Y, M, C, and K separations simply by selecting a special color and its density among the data registered in such a database. In accordance with an alternative procedure not using such a database, the user manually inputs predetermined densities of desired special color separations and the corresponding pseudo color values of the Y, M, C, and K separations. In this embodiment, it is assumed that $Y_S=20\%$, $M_S=40\%$, $C_S=10\%$, and $K_O=0\%$ are set as the first pseudo color values of the Y, M, C, and K separations corresponding to the predetermined density of 100% (solid) for one special color separation S and $Y_T=20\%$, $M_T=10\%$, $C_T=0\%$, and $K_T=20\%$ are set as the second pseudo color values of the Y, M, C, and K separations corresponding to the predetermined density of 100% (solid) for the other special color separation T.

The program proceeds to step S103, at which one image part is selected as a target to be processed among a plurality of image parts included in the one-page image. The plurality of image parts are registered in the form of a list in the page data representing the one-page image. At step S103, the plurality of image parts are successively selected one by one. In the example of FIG. 15, the first image area R1 is selected first.

At step S104, the color element selecting means 150 extracts a color element included in the target image part thus selected and reads color element data representing the extracted color element as a target of special color conversion processing. The processing of step S104 selects one color element and reads the density values of the Y, M, C, and K separations regarding the selected color element. In the example of FIG. 15, the density values obtained for the first image area R1 are $Y_0=30\%$, $M_0=60\%$, $C_0=20\%$, and $K_0=0\%$.

The program then proceeds to step S105, at which the color element converting means 154 calculates new density values $S_1$, $Y_1$, $M_1$, $C_1$, and $K_1$ of the respective color separations including the S separation, based on the first pseudo color values $Y_S$, $M_S$, $C_S$, and $K_S$ of the Y, M, C, and K separations corresponding to a predetermined density of the S separation and on the initial density values $Y_0$, $M_0$, $C_0$, and $K_0$ of the respective color separations regarding the target color element according to Equations (7a) through (7e) given below:

$$S_1 = \mathrm{Min}(Y_0/Y_S, M_0/M_S, C_0/C_S, K_0/K_S, 1) \times \alpha \quad (7a)$$

α: 0<α<1 (predetermined by the user)

$$Y_1 = Y_0 - S_1 \times Y_S \quad (7b)$$

$$M_1 = M_0 - S_1 \times M_S \quad (7c)$$

$$C_1 = C_0 - S_1 \times C_S \quad (7d)$$

$$K_1 = K_0 - S_1 \times K_S \quad (7e)$$

wherein the operator Min( ) represents an operation of extracting a minimum value from the values in parentheses. Any color separation having the preset pseudo color value equal to 0% is excluded from Equations (7a) through (7e).

The value extracted by the operation of 'Min( )' in Equation (7a) corresponds to a minimum ratio in the present invention. The second terms in the right hand sides of Equations (7b) through (7e) respectively represent the proportional density values in the present invention, whereas the left hand side terms of Equations (7b) through (7e) represent the post-subtraction densities with respect to the plurality of basic color separations.

FIG. 16 illustrates a concrete procedure of the processing executed in the fifth embodiment. In the example of (A1) through (D1) of FIG. 16, the initial density values of the respective color separations regarding the target color element in the first image area R1 are $Y_0=30\%$, $M_0=60\%$, $C_0=20\%$, and $K_0=0\%$, whereas those regarding the target color element in the second image area R2 are $Y_0=20\%$, $M_0=30\%$, $C_0=5\%$, and $K_0=10\%$. It is assumed that $Y_S=20\%$, $M_S=40\%$, $C_S=10\%$, and $K_S=0\%$ are set as the first pseudo color values corresponding to a predetermined density S=100% of the S separation. Since the pseudo color value $K_S$ of the K separation is set equal to 0%, this is excluded from the above Equations (7a) through (7e). Namely the above Equations (7a) through (7e) are rewritten as Equations (8a) through (8e) given below:

$$S_1 = \mathrm{Min}(Y_0/Y_S, M_0/M_S, C_0/C_S, 1) \times \alpha \quad (8a)$$

$$Y_1 = Y_0 - S_1 \times Y_S \quad (8b)$$

$$M_1 = M_0 - S_1 \times M_S \quad (8c)$$

$$C_1 = C_0 - S_1 \times C_S \quad (8d)$$

$$K_1 = K_0 \quad (8e)$$

Supposing that α is equal to 0.5, the density $S_1$ of the S separation with respect to the first image area R1 is determined to be 50% by Equation (8a), whereas the new densities $Y_1$, $M_1$, $C_1$, and $K_1$ of the Y, M, C, and K separations regarding the first image area R1 are equal to 20%, 40%, 15%, and 0%, respectively. The density $S_1$ of the S separation with respect to the second image area R2 is, on the other hand, determined to be 25%, whereas the new densities $Y_1$, $M_1$, $C_1$, and $K_1$ of the Y, M, C, and K separations regarding the second image area R2 are equal to 15%, 20%, 2.5%, and 10%, respectively. These results are shown in (A2) through (E2) of FIG. 16.

The value '1' in the right hand side of Equations (7a) and (8a) is used to restrict the upper limit of the density value $S_1$ of the S separation to (100×α)%. The coefficient α is arbitrarily set by a user to restrict the upper limit of the density value $S_1$ of the S separation.

Referring back to the flowchart of FIG. 14, at step S106, the color information obtained through the above processing is set as the processed color element data. The program then proceeds to step S107, at which the color element selecting means 150 reads color element data representing a new target color element extracted as a target of the subsequent special color conversion processing in the same manner as step S104 discussed above. At step S107, the color information obtained at step S105 may be input directly. In this case, the density values (first post-subtraction densities) $Y_1$, $M_1$, $C_1$, and $K_1$ of the Y, M, C, and K separations calculated at step S105 are selected as the target of special color conversion processing.

At step S108, the similar processing to that of step S105 is carried out for the second special color separation T. The color element converting means 154 calculates new density values $T_1$, $Y_2$, $M_2$, $C_2$, and $K_2$ of the respective color separations including the T separation based on the second pseudo color values $Y_T$, $M_T$, $C_T$, and $K_T$ of the Y, M, C, and K separations corresponding to a predetermined density of the T separation and on the density values $Y_1$, $M_1$, $C_1$, and $K_1$, of the respective color separations regarding the new target color element according to Equations (9a) through (9e) given below:

$$T_1 = \text{Min}(Y_1/Y_T, M_1/M_T, C_1/C_T, K_1/K_T, 1) \times \beta \tag{9a}$$

β: 0<β<1 (defined by the user)

$$Y_2 = Y_1 - T_1 \times Y_T \tag{9b}$$

$$M_2 = M_1 - T_1 \times M_T \tag{9c}$$

$$C_2 = C_1 - T_1 \times C_T \tag{9d}$$

$$K_2 = K_1 - T_1 \times K_T \tag{9e}$$

In the example of (A2) through (D2) of FIG. 16, the density values of the respective color separations regarding the new target color element in the first image area R1 are $Y_1 = 20\%$, $M_1 = 40\%$, $C_1 = 15\%$, and $K_1 = 0\%$, whereas those regarding the new target color element in the second image area R2 are $Y_1 = 15\%$, $M_1 = 20\%$, $C_1 = 2.5\%$, and $K_1 = 10\%$. It is assumed that $Y_T = 20\%$, $M_T = 10\%$, $C_T = 0\%$, and $K_T = 20\%$ are set as the second pseudo color values corresponding to a predetermined density T=100% of the T separation. Since the pseudo color value $C_T$ of the C separation is set equal to 0%, this is excluded from the above Equations (9a) through (9e). Namely the above Equations (9a) through (9e) are rewritten as Equations (10a) through (10e) given below:

$$T_1 = \text{Min}(Y_1/Y_T, M_1/M_T, K_1/K_T, 1) \times \beta \tag{10a}$$

$$Y_2 = Y_1 - T_1 \times Y_Y \tag{10b}$$

$$M_2 = M_1 - T_1 \times M_T \tag{10c}$$

$$C_2 = C_1 \tag{10d}$$

$$K_2 = K_1 - T_1 \times K_T \tag{10e}$$

Supposing that β is equal to 0.5, the density $T_1$ of the T separation with respect to the first image area R1 is determined to be 0% by Equation (10a), whereas the new densities (second post-subtraction densities) $Y_2$, $M_2$, $C_2$, and $K_2$ of the Y, M, C, and K separations regarding the first image area R1 are equal to 20%, 40%, 15%, and 0%, respectively. The density $T_1$ of the T separation with respect to the second image area R2 is , on the other hand, determined to be 25%, whereas the new densities $Y_2$, $M_2$, $C_2$, and $K_2$ of the Y, M, C, and K separations regarding the second image area R2 are equal to 10%, 17.5%, 2.5%, and 5%, respectively. These results are shown in (A3) through (D3) and (F3) of FIG. 16.

The first coefficient α used to restrict the upper limit of the density of the S separation in the first special color conversion and the second coefficient β used to restrict the upper limit of the density of the T separation in the second special color conversion may be set independently to different values.

(A4) through (F4) of FIG. 16 illustrate the final results obtained by the two-stage special color conversion executed at step S105 and step S108. The final color information $Y_2$, $M_2$, $C_2$, $S_1$, and $T_1$ regarding the first image area R1 are respectively equal to 20%, 40%, 15%, 0%, 50%, and 0%, while the final color information $Y_2$, $M_2$, $C_2$, $K_2$, $S_1$ and $T_1$ regarding the second image area R2 are equal to 10%, 17.5%, 2.5%, 5%, 25%, and 25%.

Referring back to the flowchart of FIG. 14, in the same manner as the processing of step S106, the color information obtained through the above processing is set as the processed color element data at step S109. The program then goes to step S110, at which it is determined whether another color element is included in the target image part. When another color element exists at step S110, the program returns to step S104 and repeats the processing of steps S104 through S109 for another color element. Since the first image area R1 shown in FIG. 15 is a tint image area and includes only one color element, the program goes from step S110 to step S111. It is determined at step S111 whether another image part is included in the one-page image. When another image part exists at step S111, the program returns to step S103 to select another image part (the second image area R2 in the example of FIG. 15) as a next target or object to be processed.

The processing of steps S103 through S111 in the flow-chart of FIG. 14 is repeated to process the density values of the Y, M, C, and K separations with respect to each color element included in each image part and set the densities of the plurality of special color separations. At step S112, the converted page data representing the one-page image thus obtained are written into the hard disk drive 40.

In the process of producing a one-page image, the density values of an image area, which the user desires to change to be expressed by one or a plurality of special color separations, may be previously set to coincide with the pseudo color values. Special color separation images can be prepared readily by converting the densities of the Y, M, C, and K separations of the one-page image to densities of the special color separations according to the processing routine of FIG. 14.

In the fifth embodiment discussed above, a plurality of desired inks other than Y, M, C, and K may be used as a plurality of special colors, so that the color reproducibility of printed matters can be enhanced favorably. By way of example, in case that green color is to be reproduced by the Y, M, C, and K separations, the densities are set as Y=100%, M=0%, C=100%, and K=0%. Specifying green as a special color enables the densities of the Y, M, C, and K separations to be set all equal to 0%. This remarkably improves the reproducibility of green in printed matters. Printing with six or more color separations including a plurality of special color separations gives the depth in color to the resulting printed matters.

Any arbitrary density value other than 100% (solid) may be set as the predetermined density of each special color separation used for specifying the pseudo color values. As for a one-page image including no K separation, density values of only the other three color separations, that is, Y, M, and C, are set as pseudo color values. The order of priority in processing a plurality of special color separations (S separation and T separation in the fifth embodiment) may be determined by the user.

F. Sixth Embodiment

Figure 17:
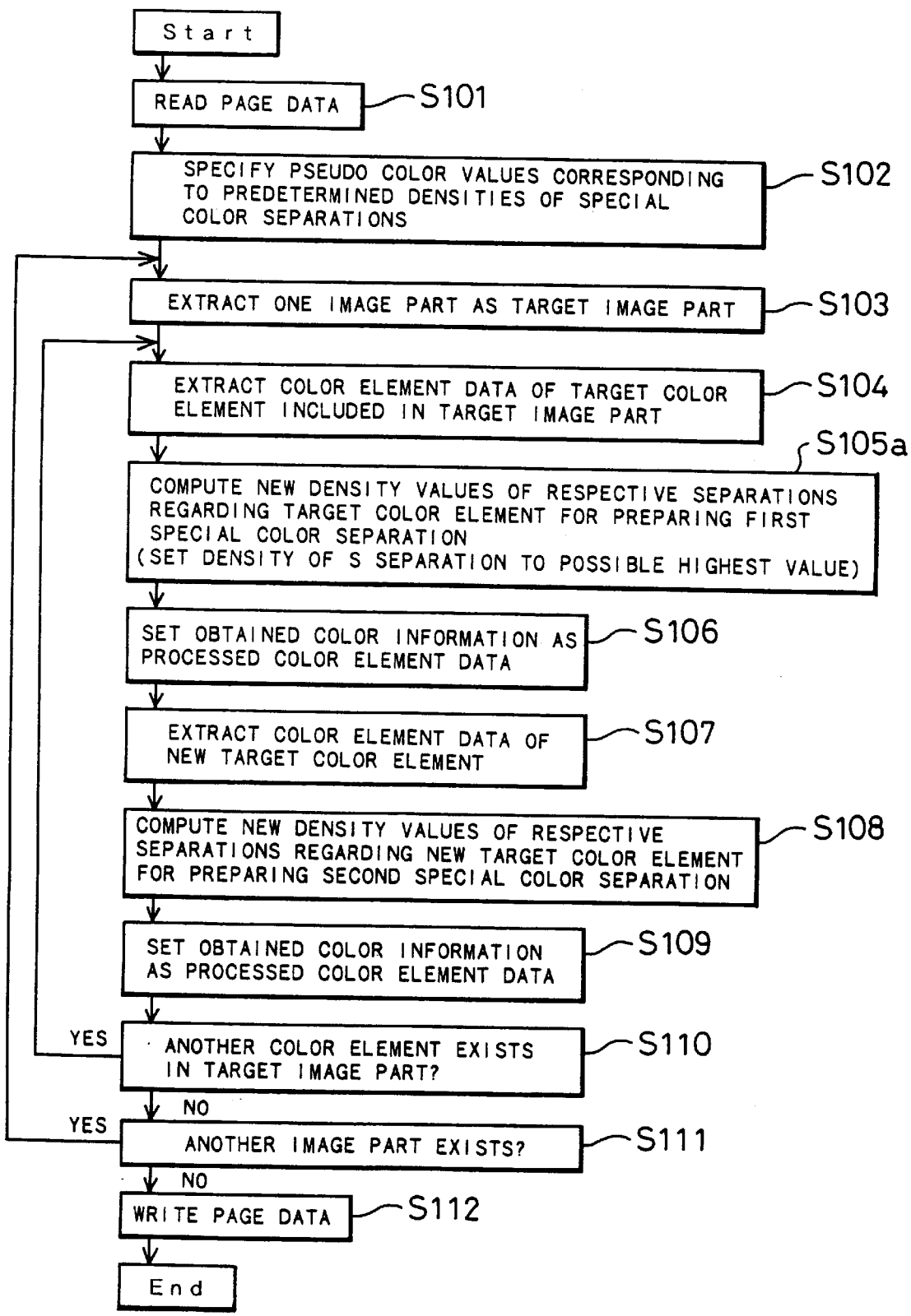
FIG. 17 is a flowchart showing a processing routine executed in the sixth embodiment.
Figure 18:
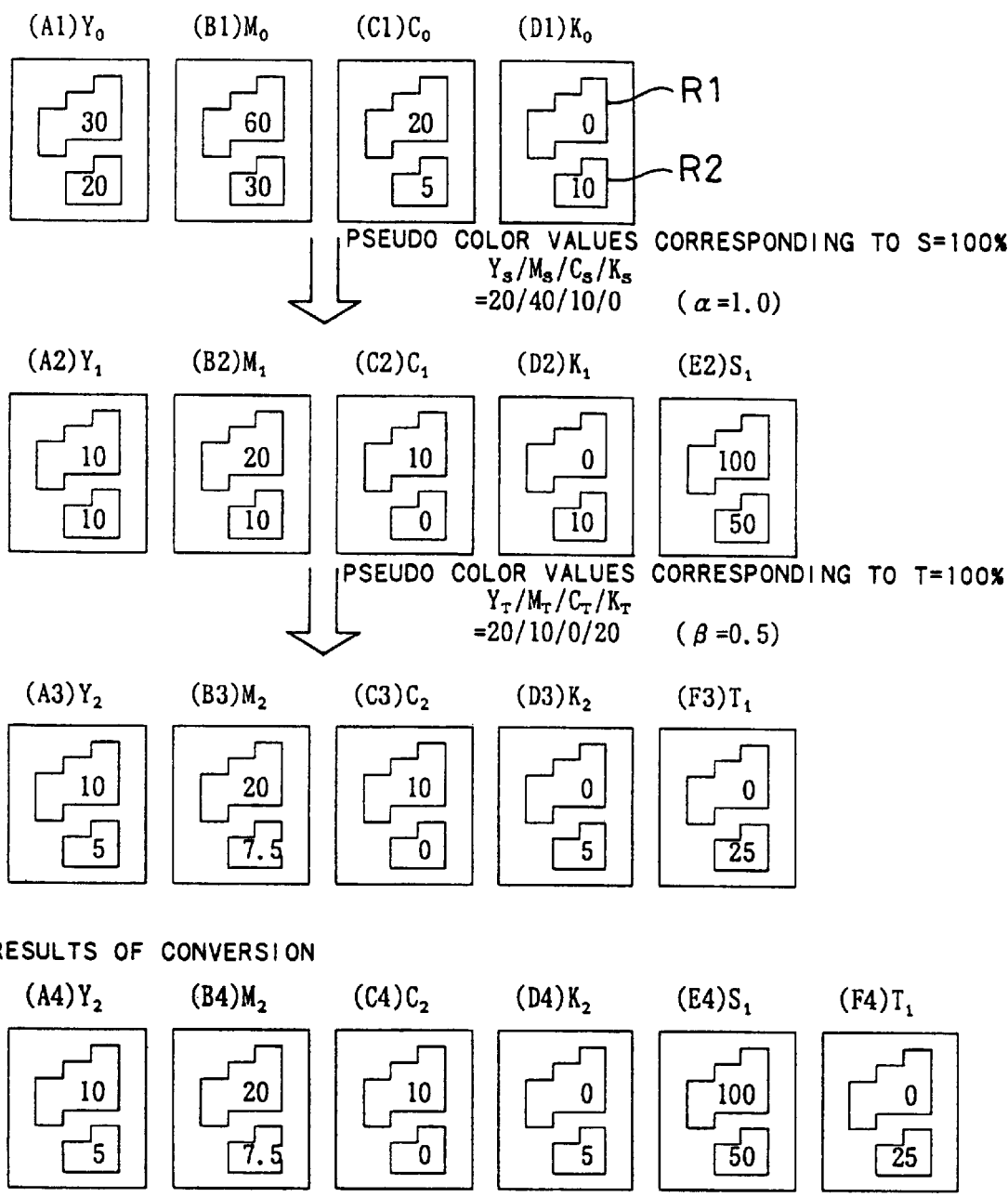
FIG. 18 illustrates a concrete procedure of the processing executed in the sixth embodiment.

FIG. 17 is a flowchart showing a processing routine executed in a sixth embodiment, and FIG. 18 illustrates a concrete procedure of the processing executed in the sixth embodiment. The processing routine of FIG. 17 is similar to that of the fifth embodiment shown in FIG. 14, except that step 5 is replaced by step S105a, at which the density of the S separation is set to the possible highest value. This procedure corresponds to setting the coefficient a in Equation (7a) given above equal to one. In other words, at step S105a of the second embodiment, the conversion process is carried out to set the density of the special color separation to a maximum value, which is not greater than 100%.

The drawings of FIG. 18 correspond to those of FIG. 16 in the fifth embodiment. (A2) through (E2) of FIG. 18 show density values of the respective color separations after the first special color conversion executed at step S105a. Since the pseudo color value of the K separation corresponding to a predetermined density of the S separation is equal to zero, the K separation is excluded from the target of the first special color conversion. At step S105a of the sixth embodiment, the special color conversion is thus carried out for the other three color separations, Y, M, and C. The pseudo color values corresponding to the predetermined density S=100% are set as $Y_S$=20%, $M_S$=40%, and $C_S$=10%. The special color conversion for the first image area R1, upon condition that the density of the S separation should be set to a maximum value not greater than 100%, enables the density of the S separation to be set equal to 100%. New densities $Y_1$, $M_1$, and $C_1$ of the Y, M, and C separations with respect to the first image area R1 after the special color conversion are obtained by subtracting the pseudo color values $Y_S$, $M_S$, and $C_S$ from the initial densities $Y_0$, $M_0$, and $C_0$, respectively (see (A2) through (C2) of FIG. 18). The special color conversion for the second image area R2, upon condition that the density of the S separation should be set to a maximum value not greater than 100%, enables the density of the S separation to be set equal to 50%. New densities $Y_1$, $M_1$, and $C_1$ of the Y, M, and C separations with respect to the second image area R2 after the special color conversion are obtained by subtracting half the pseudo color values $Y_S$, $M_S$, and $C_S$ from the original densities $Y_0$, $M_0$, and $C_0$, respectively (see (A2) through (C2) of FIG. 18). The post-subtraction density $C_1$ of the C separation with respect to the second image area R2 accordingly becomes equal to 0%.

In the sixth embodiment, the coefficient β used for the second special color conversion concerned with the T separation (executed at step S108) is set equal to 0.5. The results of the second special color conversion (see (A3) through (D3), (F3), and (A4) through (F4) of FIG. 18) are not specifically explained here.

In the sixth embodiment discussed above, the special color conversion is carried out upon condition that the density of the S separation should be set to a maximum value which is not greater than 100%. This method enables the density of the S separation to be set to the possible highest value only by once of the special color conversion.

G. Seventh Embodiment

Figure 19:
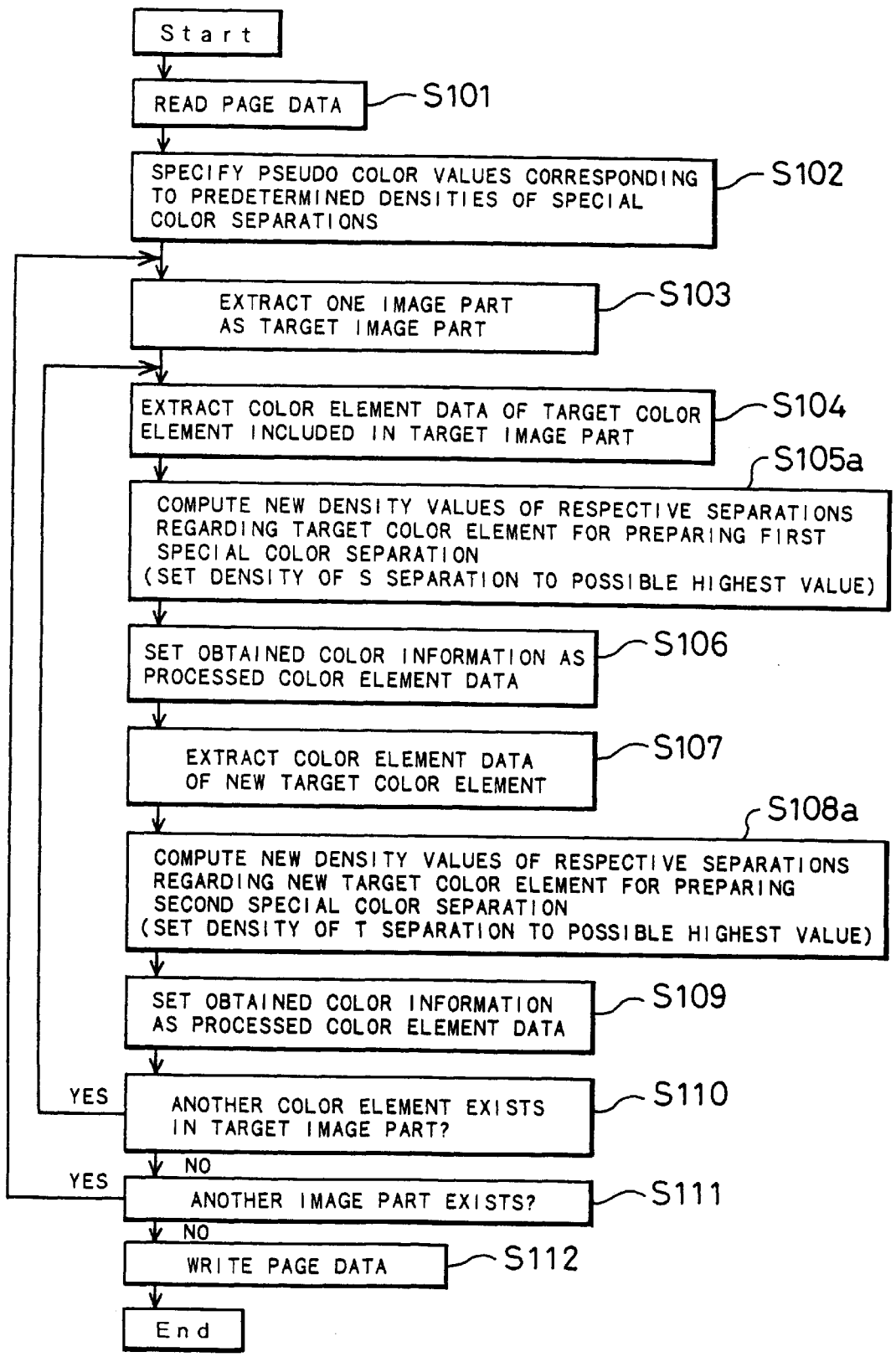
FIG. 19 is a flowchart showing a processing routine executed in the seventh embodiment.
Figure 20:
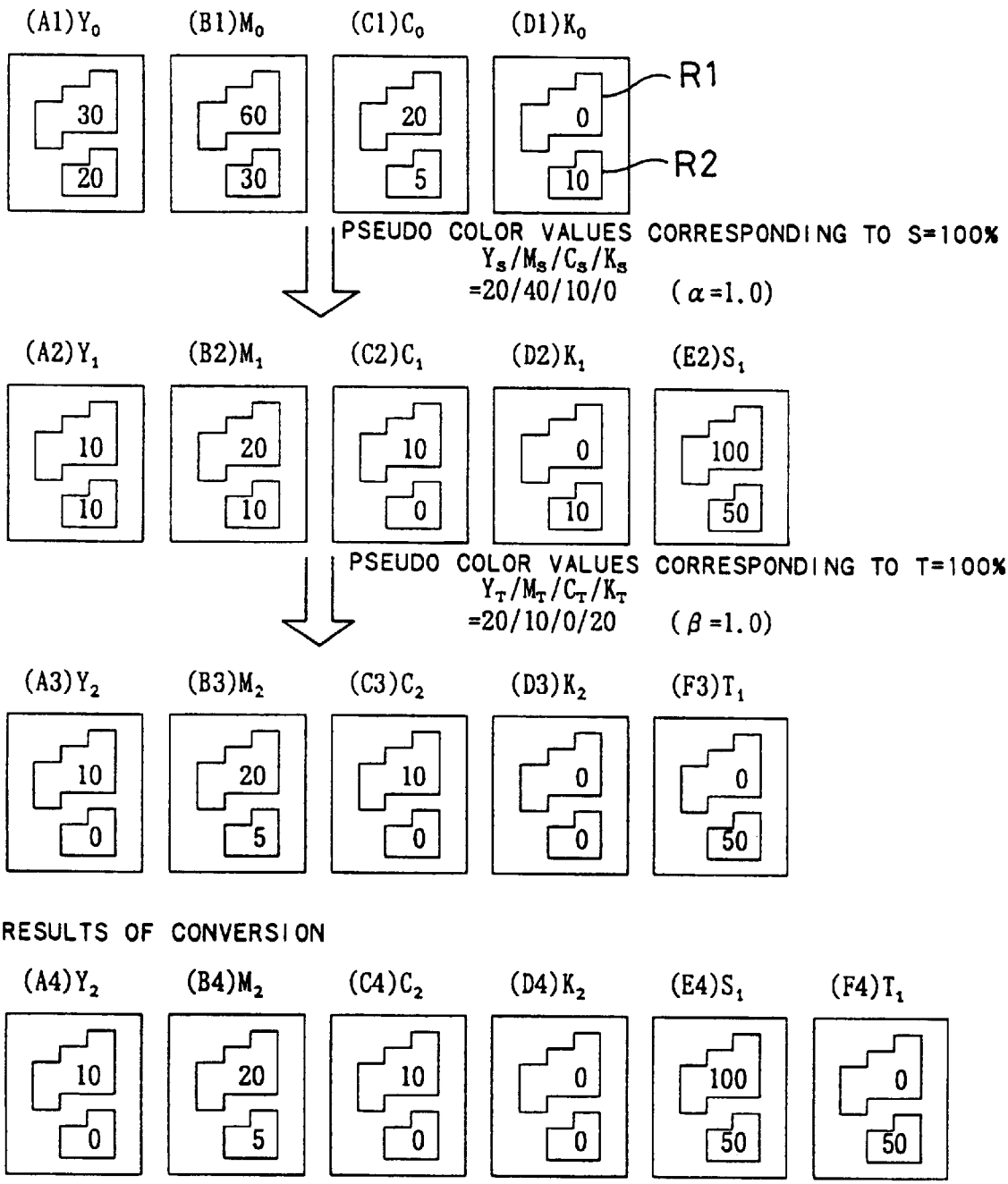
FIG. 20 illustrates a concrete procedure of the processing executed in the seventh embodiment.

FIG. 19 is a flowchart showing a processing routine executed in a seventh embodiment, and FIG. 20 illustrates a concrete procedure of the processing executed in the seventh embodiment. The processing routine of FIG. 19 is similar to that of the sixth embodiment shown in FIG. 17, except that step S108 is replaced by step S108a, at which the density of the T separation is set to the possible highest value. This procedure corresponds to setting the coefficient β in Equation (9a) given above equal to one. The concrete procedure shown in FIG. 20 is similar to that of FIG. 18 and is thus not specifically described here.

H. Eighth Embodiment

Figure 21:
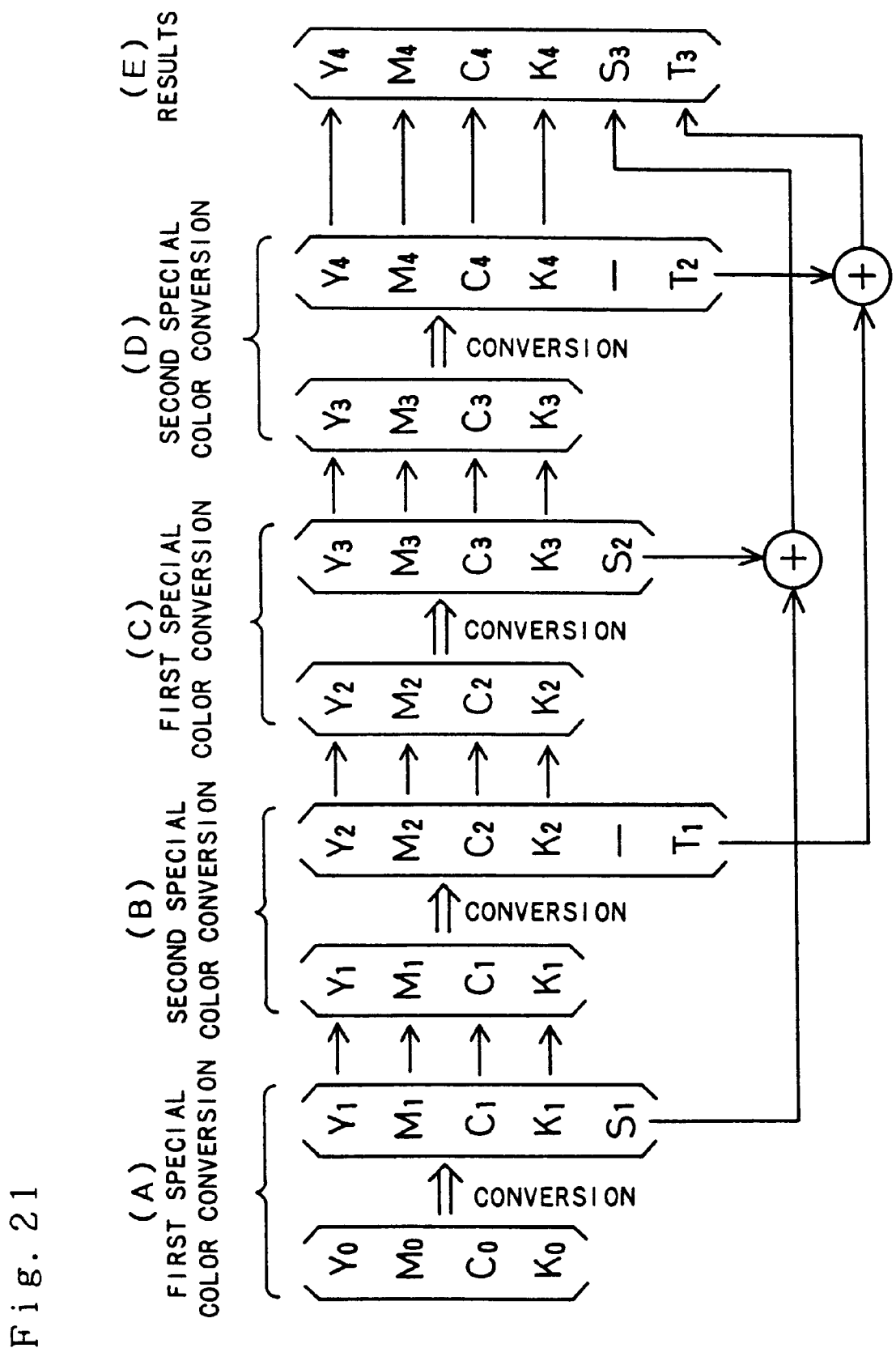
FIG. 21 shows a main concept of the method of preparing a plurality of special color separations in accordance with a eighth embodiment.

FIG. 21 shows a main concept of the method of preparing a plurality of special color separations in accordance with a eighth embodiment. In the eighth embodiment, first special color conversion concerned with the S separation is carried out first as shown in (A) of FIG. 21, and second special color conversion concerned with the T separation is then carried out as shown in (B) of FIG. 21. These procedures are identical with those executed in the fifth embodiment. The processing of the eighth embodiment then further carries out the first special color conversion (see (C) of FIG. 21) and the second special color conversion (see (D) of FIG. 21). The eighth embodiment is characterized by executing plural cycles of a special color conversion loop including the first special color conversion and the second special color conversion. Referring to (E) of FIG. 21, final densities $S_3$ and $T_3$ of the special color separations are obtained by adding the densities $S_1$ and $T_1$ of the special color separations after the first cycle of the special color conversion loop ((A) and (B) of FIG. 21) to the densities $S_2$ and $T_2$ of the special color separations after the second cycle of the special color conversion loop ((C) and (D) of FIG. 21).

In the eighth embodiment, at least either one of the coefficients α and β used for conversion is set to a value less than 1.0. When both the coefficients α and β are set equal to 1.0, no substantial conversion is implemented in the second special color conversion loop ((C) and (D) of FIG. 21).

Figure 22:
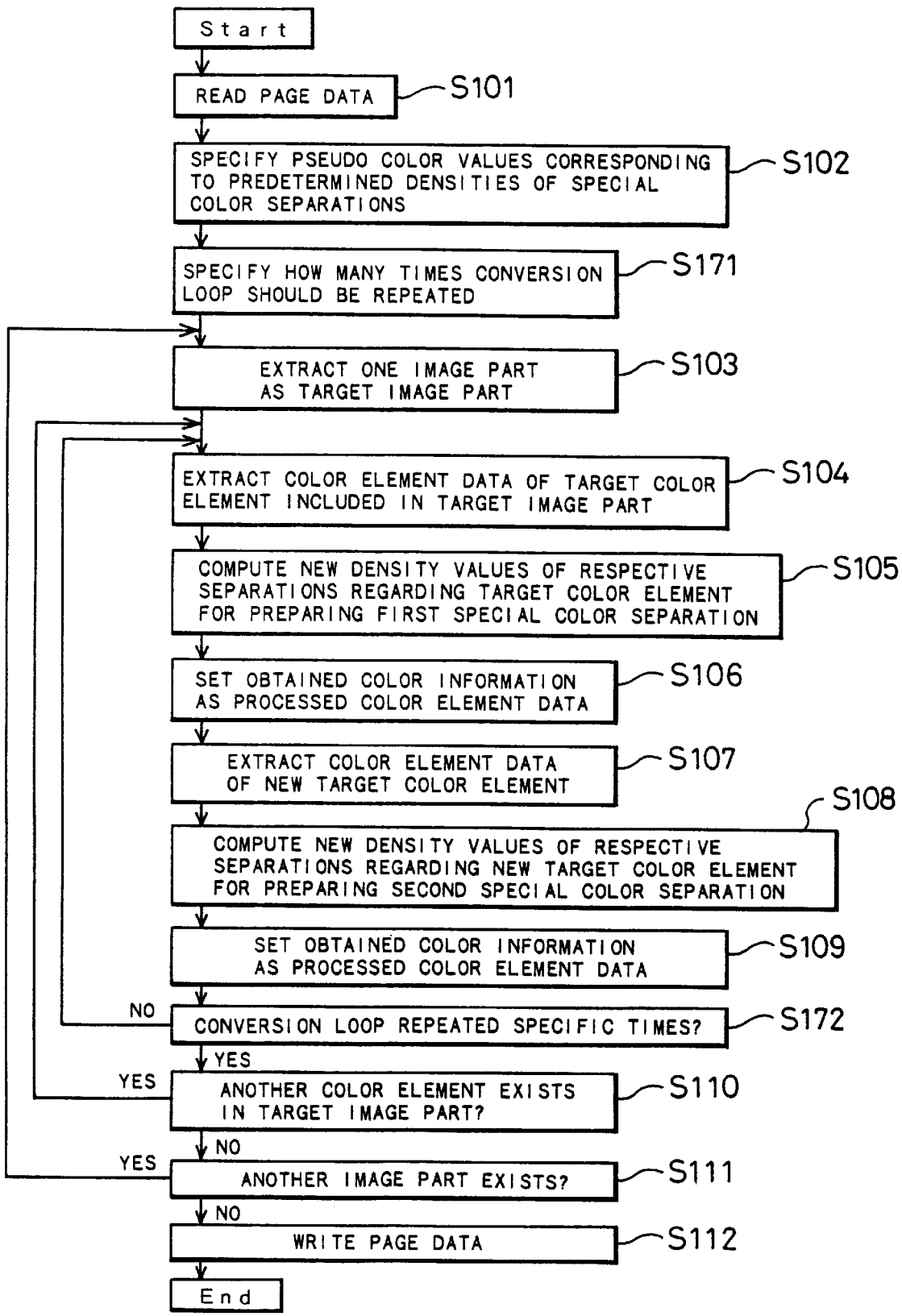
FIG. 22 is a flowchart showing a processing routine executed in the eighth embodiment.
Figure 23:
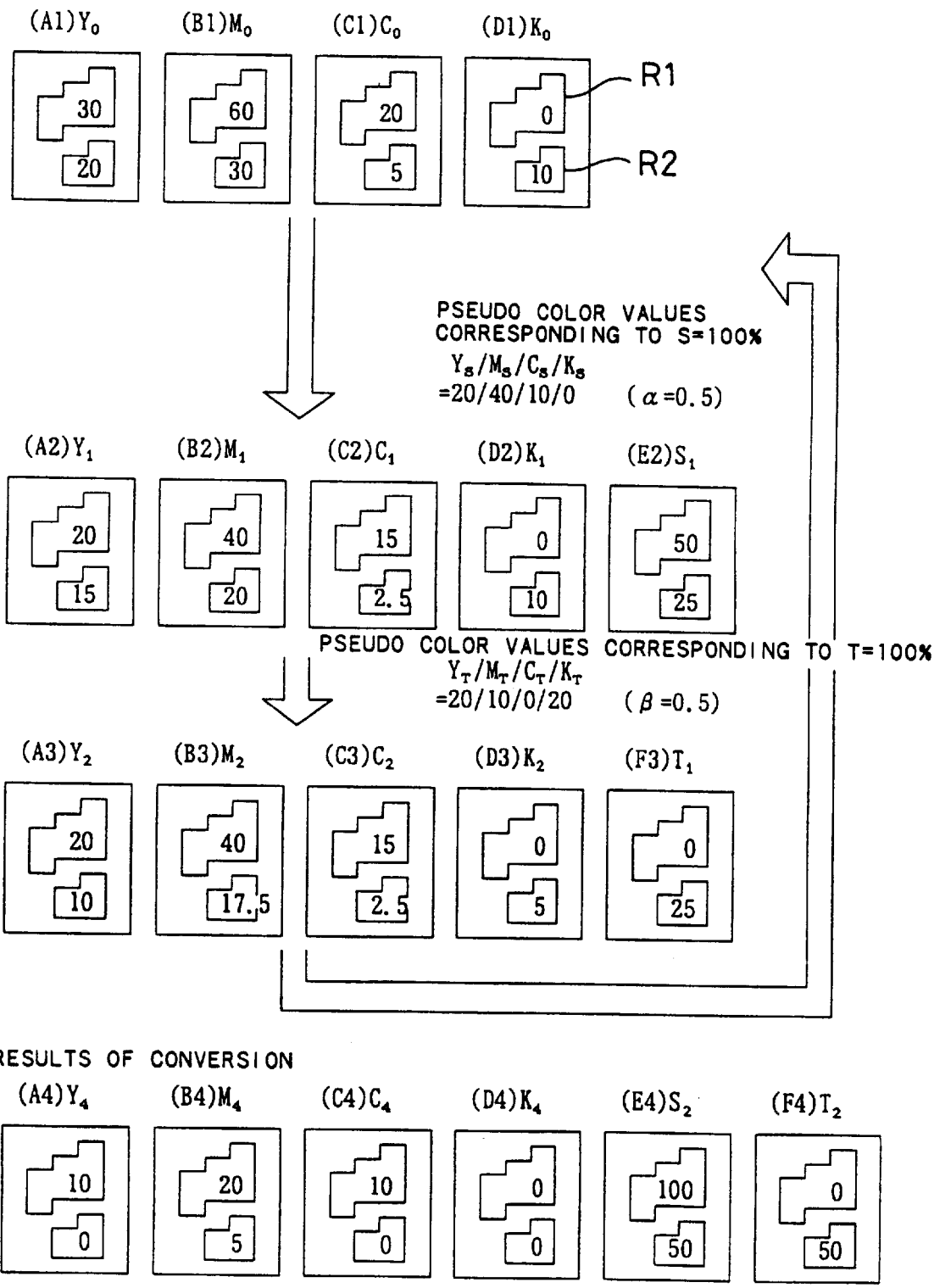
FIG. 23 illustrates a concrete procedure of the processing executed in the eighth embodiment.

FIG. 22 is a flowchart showing a processing routine executed in the eighth embodiment, and FIG. 23 illustrates a concrete procedure of the processing executed in the eighth embodiment. The processing routine of FIG. 22 is similar to that of the fifth embodiment shown in FIG. 14, except that step S171 is interposed between steps S102 and S103 and step S172 is interposed between steps S109 and S110. At step S171, the user arbitrarily specifies how many times the special color conversion loop should be repeated. At step S172, it is determined whether the special color conversion loop has already been carried out the specified times. When not, the program returns to step S104.

As discussed above, the processing of the eighth embodiment repeats the special color conversion loop of steps S104 through S109 the specified times, thereby reducing a difference in resulting density between the S separation and the T separation due to the order of the two special color conversions. When a plurality of special color conversions were carried out in sequence, the density of a first special color separation extracted first would tend to have a relatively high density. The eighth embodiment, however, carries out the conversion loop to convert densities of the basic color separations to densities of a plurality of special color separations a plurality of times, thereby relieving the tendency of giving priority to determination of the density of one special color separation (S separation in the above embodiments). The final results shown in (A4) through (F4) of FIG. 23 happen to be identical with those of the seventh embodiment.

The user can specify any arbitrary number as a number of repetition at step S171 in the flowchart of FIG. 22. In accordance with an alternative procedure, convergence of the resulting density values is monitored, and the number of repetition is automatically controlled based on the result of monitoring. In this case, a predetermined density value of an arbitrary separation can be set as the criterion of determination. By way of example, completion of convergence may be determined when a special color separation (such as the S separation or the T separation) reaches a preset density value or when any one of the Y, M, C, and K separations reaches a preset density value.

The eighth embodiment may be modified in the following manner. Instead of specifying how many times the conversion loop should be repeated, the first special color conversion and the second special color conversion may be repeatedly carried out until the conversion processing does not substantially convert the basic color separations (Y, M, C, and K) to the special color separations (that is, until no substantial conversion is effected).

Although the densities of the basic color separations Y, M, C, and K are converted to those of two special color separations in the above embodiments, the principle of the invention is also applicable to conversion to three or more special color separations.

The above embodiments discussed above can effectively prevent unevenness of color in tint areas and vignette areas due to different inks used, since the respective inks are used with the same ratio for the tint areas and vignette areas in which pixels have the same density ratio of the basic color separations.

I. Ninth Embodiment

Figure 24:
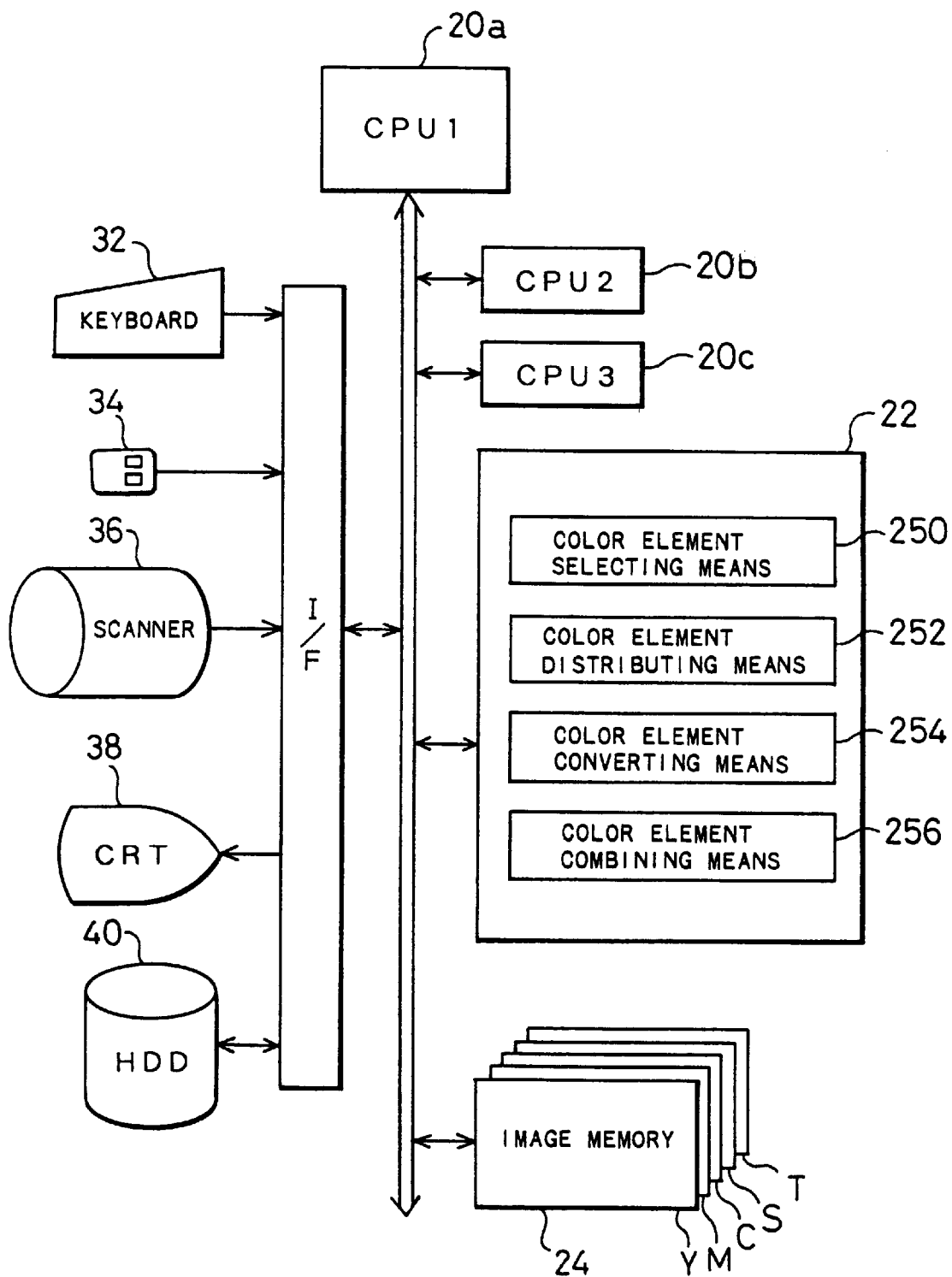
FIG. 24 is a block diagram illustrating structure of an image processing apparatus to which ninth through twelfth embodiments of the present invention are applied.

FIG. 24 is a block diagram illustrating the structure of an image processing apparatus to which the ninth through twelfth embodiments of the present invention is applied. The image processing apparatus includes three CPUs 20a, 20b, and 20c.

The main memory 22 stores computer program codes implementing the functions of a color element selecting means 250, a color element distributing means 252, a color element converting means 254, and a color element combining means 256. Each means is effected by one of the three CPUs 20a, 20b, and 20c executing the program code stored in the main memory 22. Details of their functions will be described later. The computer codes implementing the functions of such means are stored in a portable storage medium (carriable storage medium), such as floppy disks and CD-ROM, and transferred from the portable storage medium to the main memory 22 or the hard disk drive 40.

The image memory 24 has a memory area of five planes, in which image data of five color separation images, that is, Y, M, and C separations and a plurality of special color separations (in the embodiment, two special color separations, 'S separation' and 'T separation'), are respectively stored. In the description below, a color image to be processed in the ninth embodiment includes no K separation and is to be reproduced by Y, M, and C separations. The principle of the ninth embodiment is, however, also applicable to color images including a K separation.

Figure 25:
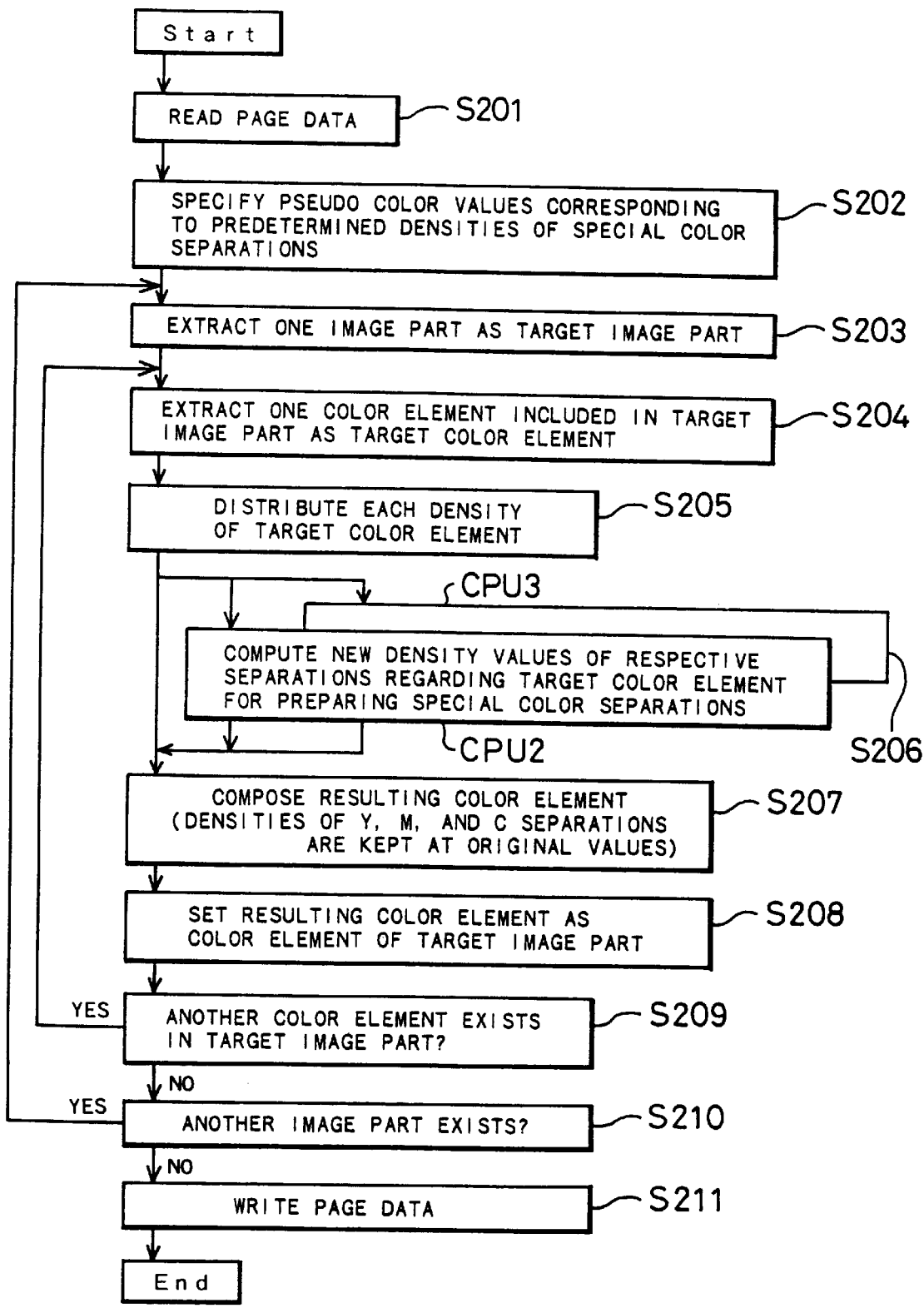
FIG. 25 is a flowchart showing a processing routine executed in the ninth embodiment.

FIG. 25 is a flowchart showing a processing routine executed in the ninth embodiment. When the program enters the routine, page data representing a one-page image to be processed are read out from the hard disk drive 40 to the image memory 24 at step S201. The one-page image herein refers to an image composed of a plurality of image parts, which are applied on an image plane of one page. The image parts include tint image areas, vignette image areas, and pictures.

Figure 26:
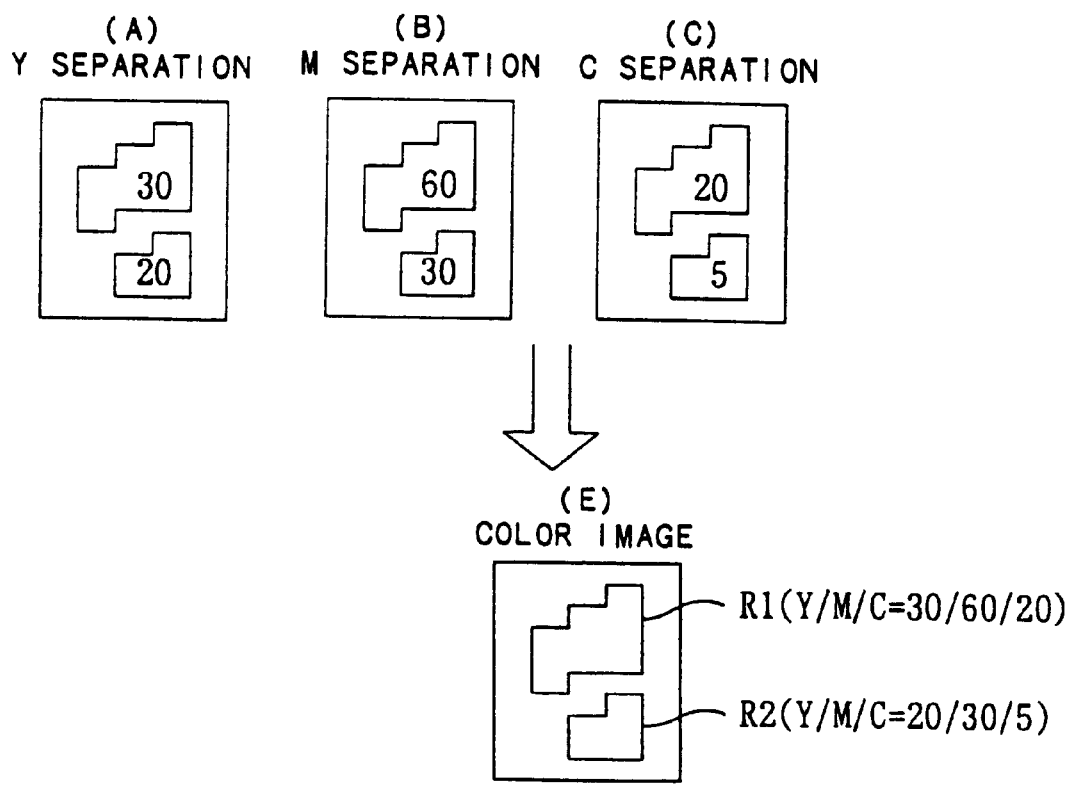
FIG. 26 shows an example of a one-page image to be processed in the ninth embodiment.

FIG. 26 shows an example of the one-page image to be processed in the ninth embodiment. (A), (B), and (C) of FIG. 26 respectively show images of Y, M, and C separations, while (E) of FIG. 26 illustrates a color image reproduced by laying these images one upon another. Referring to (A) of FIG. 26, the one-page image has two tint image areas R1 and R2. The initial densities of Y, M, and C separations of the first image area R1 are 30%, 60%, and 20%, respectively, and those of the second image area R2 are 20%, 30%, and 5%.

At step S202 in the flowchart of FIG. 25, a user specifies specific densities (or pseudo color values) of the Y, M, and C separations corresponding to predetermined densities of the two special color separations (S separation and T separation). The pseudo color values may be read out from a special color density database stored in the hard disk drive 40. In the ninth embodiment, it is assumed that $Y_S=20\%$, $M_S=40\%$, and $C_S=10\%$ are set as the pseudo color values (first pseudo color values) of the Y, M, and C separations corresponding to the predetermined density of 100% (solid) for one special color separation S, and $Y_T=20\%$, $M_T=10\%$, and $C_T=0\%$ are set as the pseudo color values (second pseudo color values) of the Y, M, and C separations corresponding to the predetermined density of 100% (solid) for the other special color separation T.

The program proceeds to step S203, at which one image part is selected as a target to be processed among a plurality of image parts included in the one-page image. The plurality of image parts are registered in the form of a list in the page data representing the one-page image. At step S203, the plurality of image parts are successively extracted one by one. In the example of FIG. 26, the first image area R1 is selected first.

At step S204, the color element selecting means 250 extracts a color element included in the target image part thus selected and reads color element data representing the extracted color element as a target of conversion processing. The processing of step S204 selects one color element and reads the initial density values of the Y, M, and C separations regarding the selected color element. In the example of FIG. 26, the initial density values obtained for the first image area R1 are $Y_1=30\%$, $M_1=60\%$, and $C_1=20\%$.

At step S205, the color element distributing means 252 distributes each of the initial density values $Y_1$, $M_1$, and $C_1$ obtained at step S204 into divisional densities for the S separation and another divisional densities for the T separation according to a predetermined distribution ratio.

Figure 27:
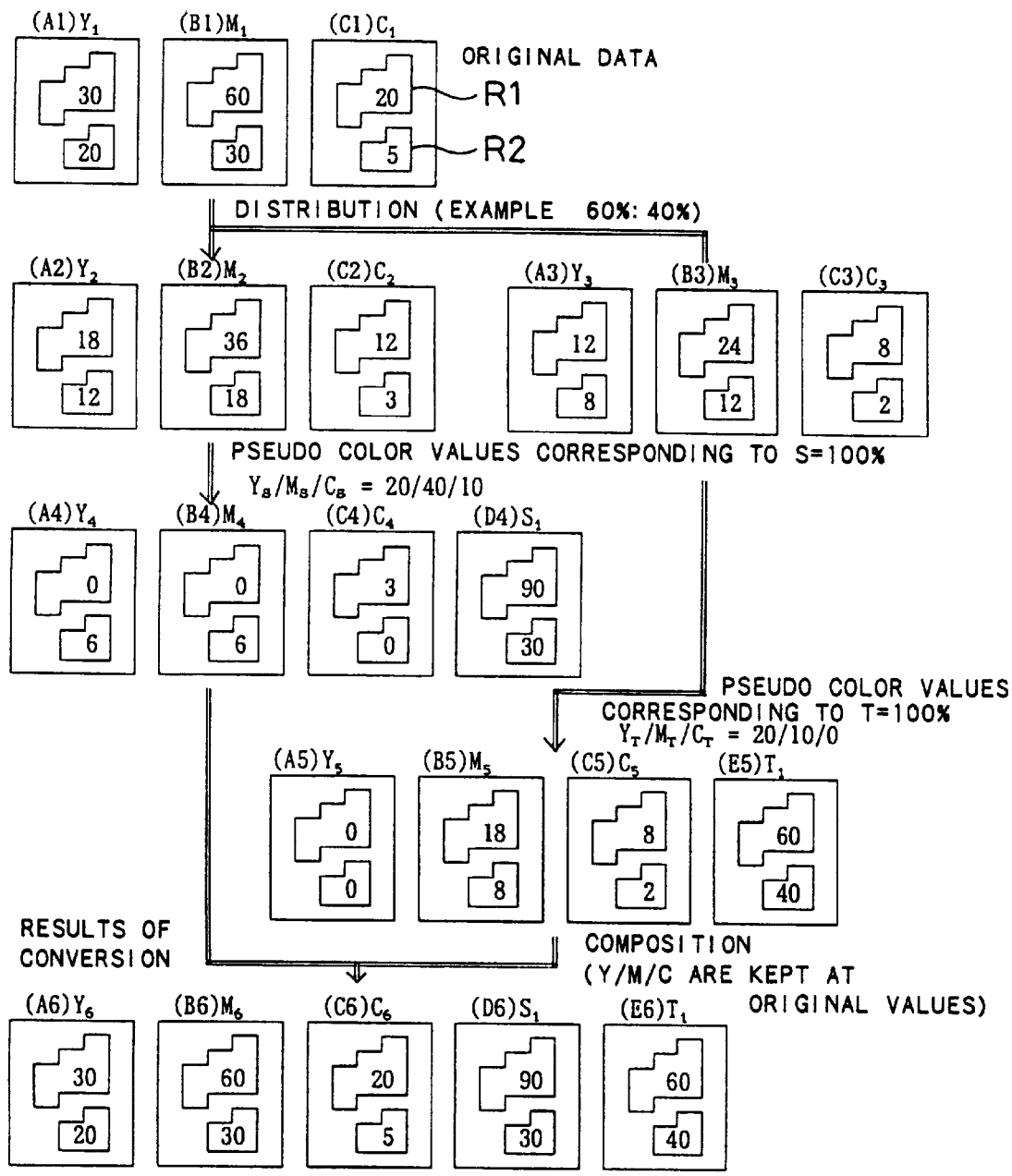
FIG. 27 illustrates a concrete procedure of the processing executed in the ninth embodiment.

FIG. 27 illustrates a concrete procedure of the processing executed in the ninth embodiment. In the example of FIG. 27, the distribution ratio is set equal to 6:4. Divisional densities $Y_2$, $M_2$, and $C_2$ for the S separation are determined by distributing the initial densities $Y_1$, $M_1$, and $C_1$ at the ratio of 60% (see (A2) to (C2) of FIG. 27), whereas divisional densities $Y_3$, $M_3$, and $C_3$ for the T separation being determined by distributing the initial densities $Y_1$, $M_1$, and $C_1$ at the ratio of 40% (see (A3) to (C3) of FIG. 27). In the first image area R1, the divisional densities for the S separation are $Y_2=18\%$, $M_2=36\%$, and $C_2=12\%$, and those for the T separation are $Y_3=12\%$, $M_3=24\%$, and $C_3=8\%$.

Referring back to the flowchart of FIG. 25, at step S206, the second CPU 20b executes special color conversion for the S separation while the third CPU 20c executes special color conversion for the T separation. Namely special color conversion for the S separation and that for the T separation are carried out simultaneously by the two CPUs 20b and 20c.

The second CPU 20b implements the color element converting means 254 and computes new density values $S_1$, $Y_4$, $M_4$, and $C_4$ of the respective color separations including the S separation, based on the first pseudo color values $Y_S$, $M_S$, and $C_S$ of the Y, M, and C separations corresponding to a predetermined density of the S separation and on the divisional density values $Y_2$, $M_2$, and $C_2$ of the respective color separations regarding the target color element according to Equations (11a) through (11d) given below:

$$S_1 = \text{Min}(Y_2/Y_S, M_2/M_S, C_2/C_S, 1) \quad (11a)$$

$$Y_4 = Y_2 - S_1 \times Y_S \quad (11b)$$

$$M_4 = M_2 - S_1 \times M_S \quad (11c)$$

$$C_4 = C_2 - S_1 \times C_S \quad (11d)$$

wherein the operator Min( ) represents an operation of extracting a minimum value from the values in parentheses. Any color separation having the preset pseudo color value equal to 0% is excluded from Equations (11a) through (11d).

The value extracted by the operation of 'Min( )' in Equation (11a) corresponds to a minimum ratio in the present invention. The second terms in the right hand side of Equations (11b) through (11d) respectively represent the proportional density values in the present invention, whereas the left hand side terms of Equations (11b) through (11d) represent the post-subtraction densities with respect to the plurality of basic color separations.

In the example of (A2) through (C2) of FIG. 27 the density values of the respective color separations regarding the target color element in the first image area R1 are defined as $Y_2=18\%$, $M_2=36\%$, and $C_2=12\%$. Referring to (A4) through (D4) of FIG. 27, the density $S_1$ of the S separation with respect to the first image area R1 is thus equal to 90%, whereas the new densities (or post-subtraction densities) $Y_4$, $M_4$, and $C_4$ of the Y, M, and C separations for the first image area R1 are respectively equal to 0%, 0%, and 3%. The density values of the respective color separations regarding the target color element in the second image area R2 are defined as $Y_2=12\%$, $M_2=18\%$, and $C_2=3\%$. As shown in (A4) through (D4) of FIG. 27, the density $S_1$ of the S separation with respect to the second image area R2 is thus equal to 30%, whereas the new densities (or post-subtraction densities) $Y_4$, $M_4$, and $C_4$ of the Y, M, and C separations for the second image area R2 are respectively equal to 6%, 6%, and 0%.

At step S206 in the flowchart of FIG. 25, the third CPU 20c also implements the color element converting means 254 and computes new density values $T_1$, $Y_5$, $M_5$, and $C_5$ of the respective color separations including the T separation, based on the second pseudo color values $Y_T$, $M_T$, and $C_T$ of the Y, M, and C separations corresponding to a predetermined density of the T separation and on the divisional density values $Y_3$, $M_3$, and $C_3$ of the respective color separations regarding the target color element according to Equations (12a) through (12d) given below:

$$T_1=\text{Min}(Y_3/Y_T, M_3/M_T, C_3/C_T, 1) \quad (12a)$$

$$Y_5=Y_3-T_1 \times Y_T \quad (12b)$$

$$M_5=M_3-T_1 \times M_T \quad (12c)$$

$$C_5=C_3-T_1 \times C_T \quad (12d)$$

In the example of (A3) through (C3) of FIG. 27, the density values of the respective color separations regarding the target color element in the first image area R1 are defined as $Y_3=12\%$, $M_3=24\%$, and $C_3=8\%$. The density $T_1$ of the T separation with respect to the first image area R1 is thus equal to 60%, whereas the new densities $Y_5$, $M_5$, and $C_5$ of the Y, M, and C separations for the first image area R1 are respectively equal to 0%, 18%, and 8% as shown in (A5) through (C5) and (E5) of FIG. 27.

Referring back to the flowchart of FIG. 25, the program proceeds to step S207, at which the color information of the S separation and the T separation obtained through the above processing is combined with the color information of the original color element, whereby the new densities are set for the five color separations Y, M, C, S, and T regarding the target color element. Referring to (A6) through (E6) of FIG. 27, the densities of the Y, M, and C separations are kept at their initial values, whereas the new values are set for the special color separations S and T.

The program then goes to step S208, at which the resulting color element obtained at step S207 is stored as the color element of the target image part. At step S209, it is determined whether another color element is included in the target image part. When another color element exists at step S209, the program returns to step S204 and repeats the processing of steps S204 through S208 for another color element. Since the first image area R1 shown in FIG. 26 is a tint image area and includes only one color element, however, the program goes from step S209 to step S210. It is determined at step S210 whether another image part is included in the one-page image. When another image part exists at step S210, the program returns to step S203 to select another image part (the second image area R2 in the example of FIG. 26) as next target or object to be processed.

The processing of steps S203 through S210 in the flowchart of FIG. 25 is repeated to process the density values of the Y, M, and C separations with respect to each color element included in each image part and set the densities of the plurality of special color separations. At step S211, the converted page data representing the one-page image thus obtained are written into the hard disk drive 40.

In the process of preparing a one-page image, the density values of an image area, which the user desires to change to be expressed by one or a plurality of special color separations, may be previously set to coincide with the pseudo color values. Special color separations can be produced readily by converting the densities of the Y, M, and C separations of the one-page image to predetermined densities of the special color separations according to the processing routine of FIG. 25.

The ninth embodiment enables plural stages of special color conversion to be simultaneously carried out in order to determine the densities of the plurality of special color separations, thereby realizing high-speed processing. The densities of the plurality of special color separations are determined according to the weighting operation according to the predetermined distribution ratio. For a special color having a relatively large distribution ratio, a relatively large value is set for the density of the special color. For a special color having a relatively small distribution ratio, on the contrary, a relatively small value is set for the density of the special color.

Any arbitrary density value other than 100% (solid) may be set as the predetermined density of each special color separation. Although the color image including no K separation but reproduced only by Y, M, and C separations is processed in the above embodiment, the processing discussed above is also applicable to color images including a K separation and reproduced by Y, M, C, and K separations.

Any arbitrary percents other than 60% to 40% may be set as the distribution ratio of the density of each color separation regarding the target color element. The total of the distribution ratios may be any value other than 100%.

J. Tenth Embodiment

Figure 28:
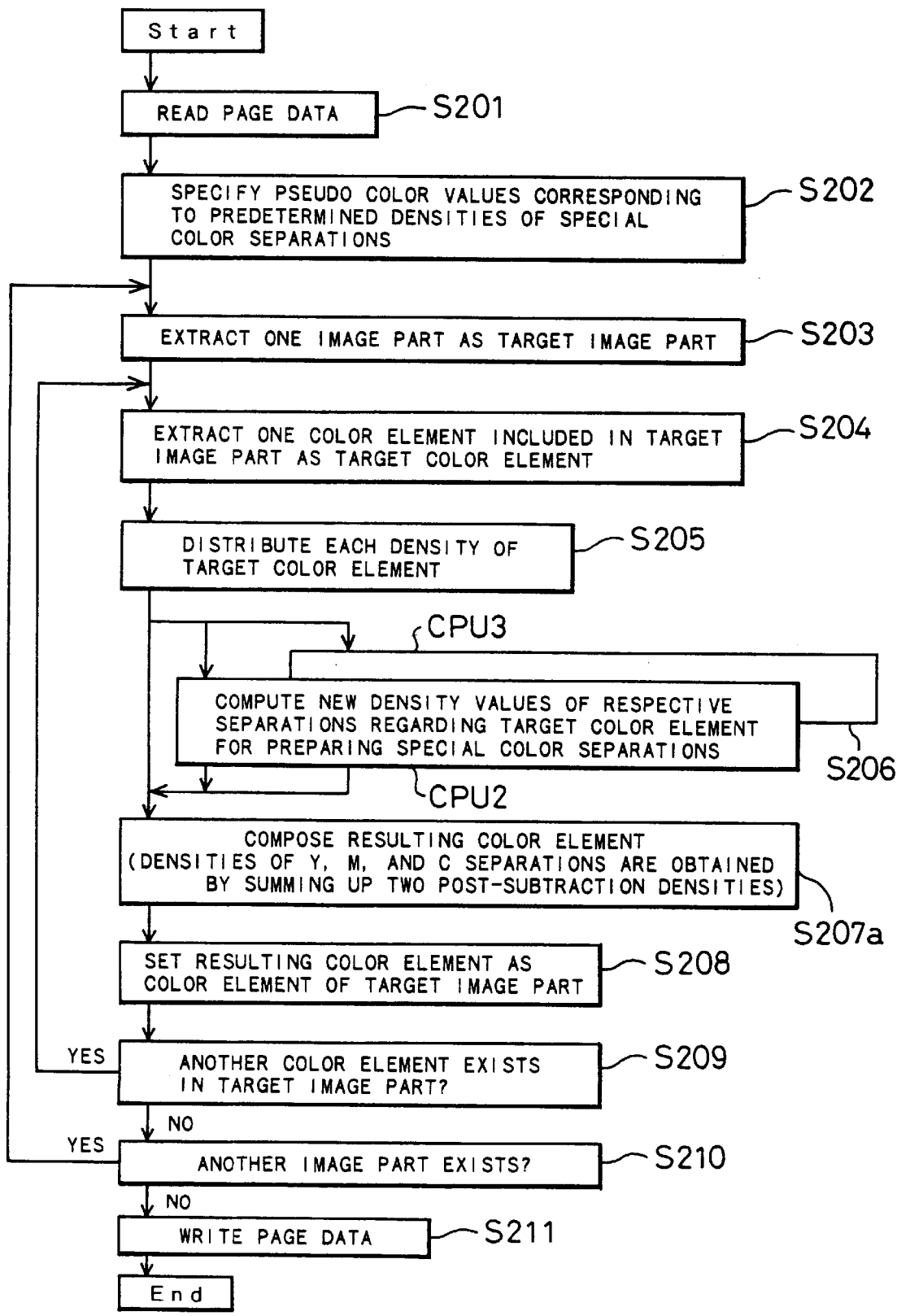
FIG. 28 is a flowchart showing a processing routine executed in the tenth embodiment.
Figure 29:
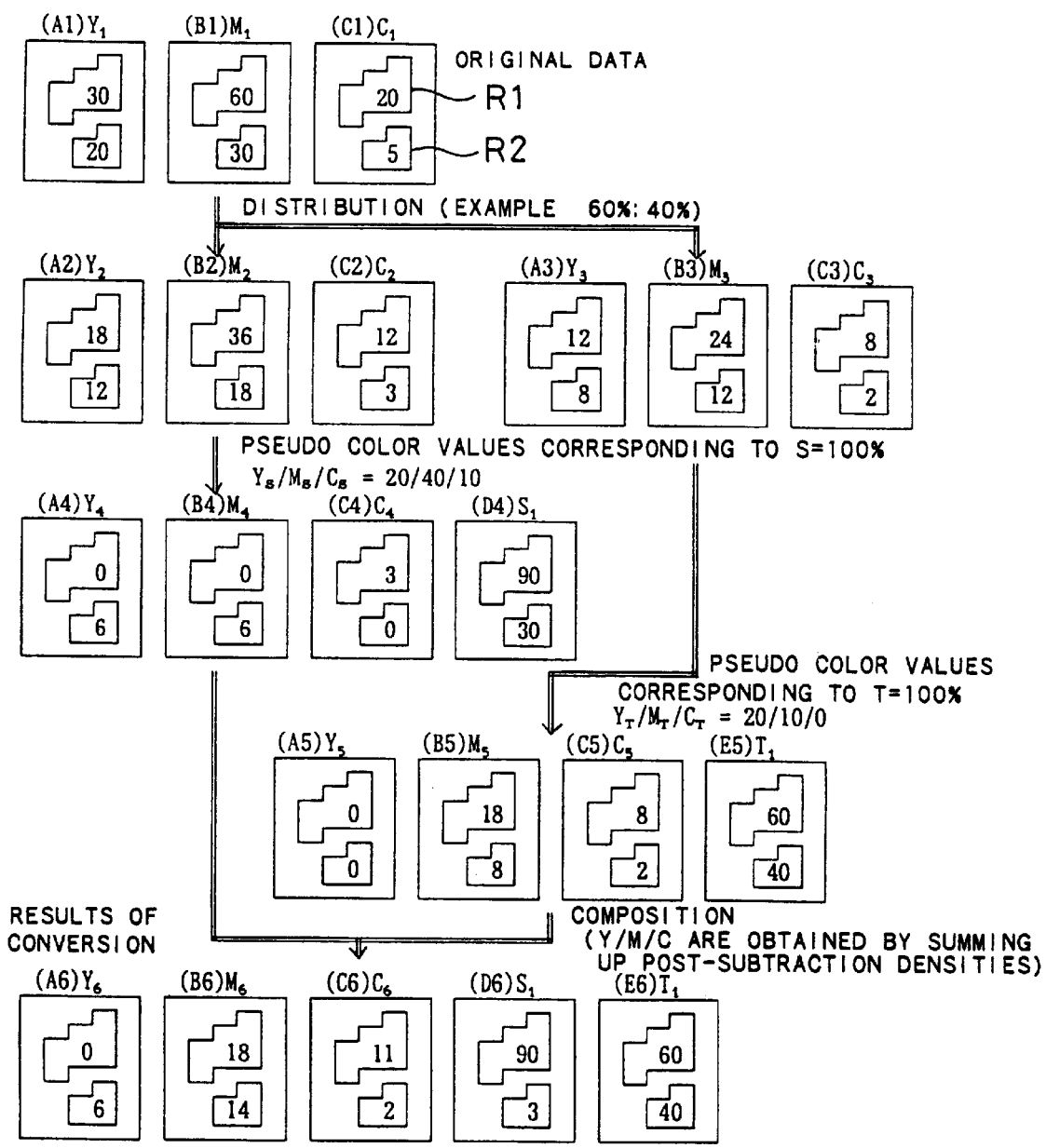
FIG. 29 illustrates a concrete procedure of the processing executed in the tenth embodiment.

FIG. 28 is a flowchart showing a processing routine executed in a tenth embodiment, and FIG. 29 illustrates a concrete procedure of the processing executed in the tenth embodiment. The processing routine of FIG. 28 is similar to that of the ninth embodiment shown in FIG. 25, except that step S207 is replaced by step S207a, at which a post-subtraction density of each color separation Y, M, or C after the special color conversion of the S separation is added to a post-subtraction density of each color separation after the special color conversion of the T separation in the process of combining the resulting color element, so that the color can be reproduced more precisely.

The results of special color conversion for the S separation shown in (A4) through (D4) of FIG. 29 are identical with those of the ninth embodiment shown in (A4) through (D4) of FIG. 27. The results of special color conversion for the T separation shown in (A5) through (C5) and (E5) of FIG. 29 are identical with those of the first embodiment shown in (A5) through (C5) and (E5) of FIG. 27. The final results of conversion of the second embodiment shown in (A6) through (E6) of FIG. 29 are, however, different from those of the first embodiment shown in (A6) through (E6) of FIG. 27. In the tenth embodiment, the final densities of the Y, M, and C separations shown in (A6) through (C6) of FIG. 29 are obtained by summing up the post-subtraction densities of the respective color separations after the special color conversion for the S separation and the special color conversion for the T separation.

The tenth embodiment subtracts the density values used in the special color conversion from the initial densities of the Y, M, and C separations, thereby realizing color reproduction with a higher precision. When the post-subtraction densities are summed up as discussed in the tenth embodiment, it is preferable to set the total of the distribution ratios equal to 100%.

K. Eleventh Embodiment

Figure 30:
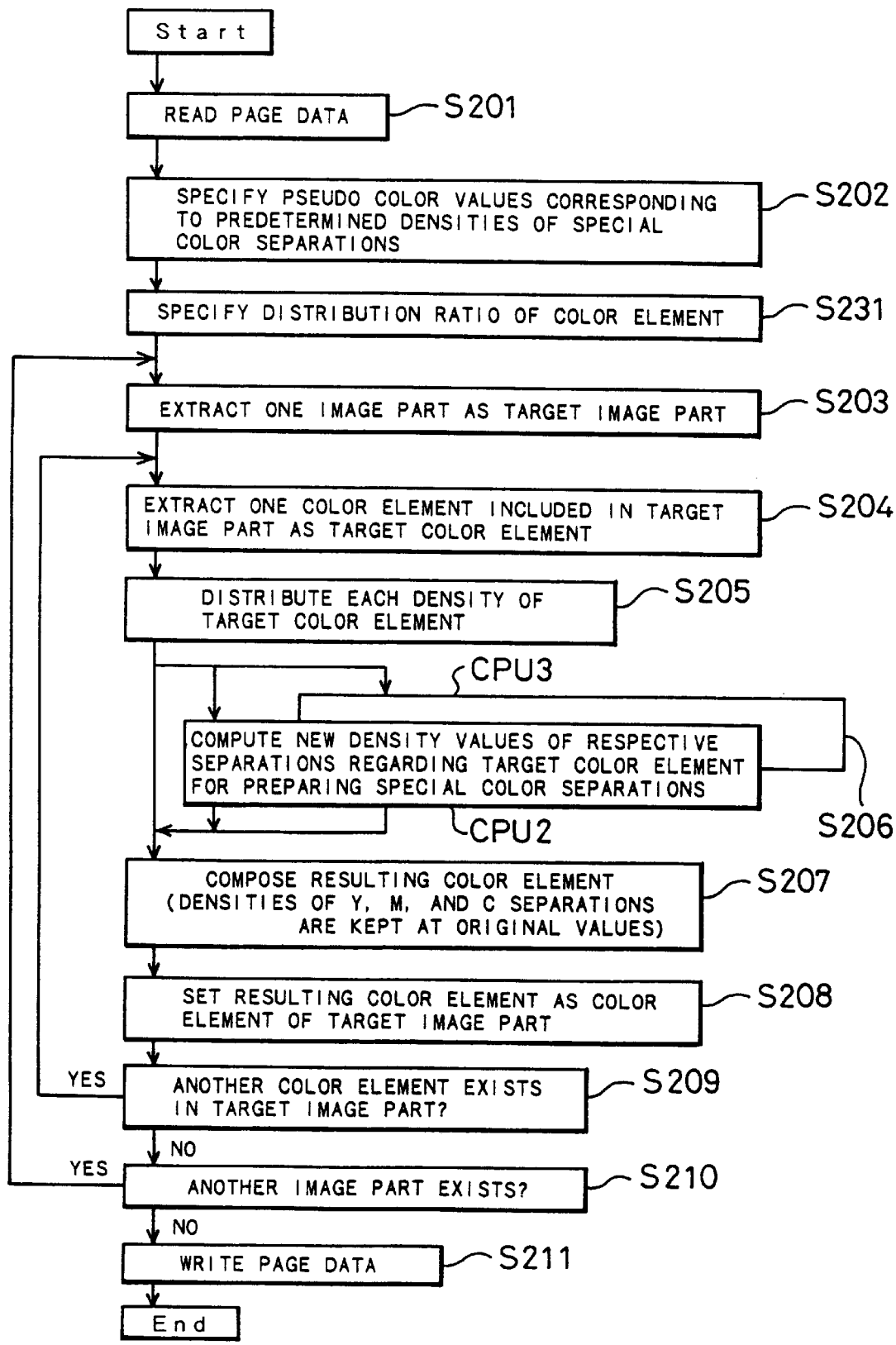
FIG. 30 is a flowchart showing a processing routine executed in the eleventh embodiment.

FIG. 30 is a flowchart showing a processing routine executed in a eleventh embodiment. The processing routine of FIG. 30 is similar to that of the ninth embodiment shown in FIG. 25, except that step S231 is interposed between steps S202 and S203. At step S231, the user specifies a distribution ratios through interactive operation. The eleventh embodiment enables the user to arbitrarily set desired distribution ratios.

L. Twelfth Embodiment

Figure 31:
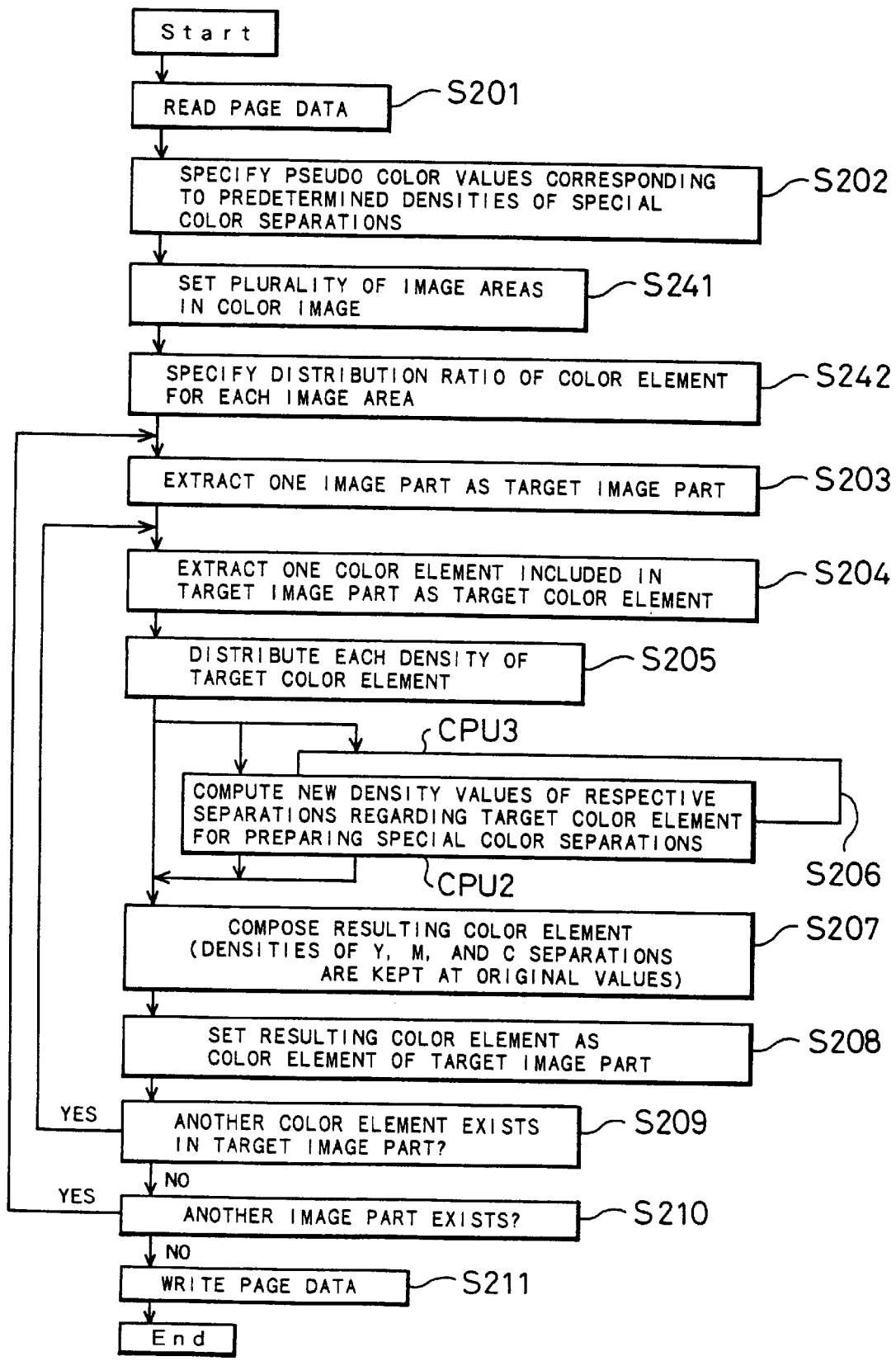
FIG. 31 is a flowchart showing a processing routine executed in the twelfth embodiment.
Figure 32:
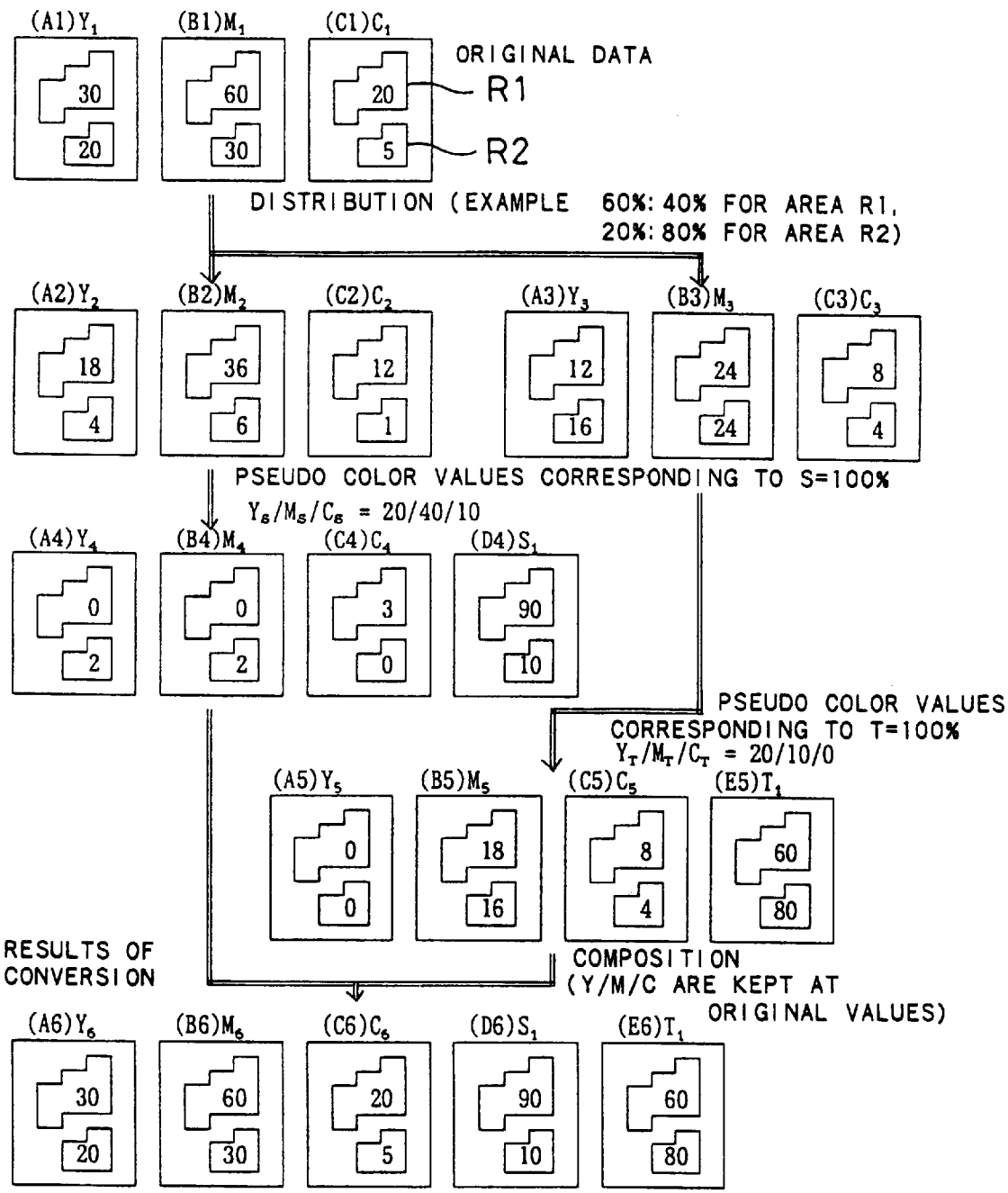
FIG. 32 illustrates a concrete procedure of the processing executed in the twelfth embodiment.

FIG. 31 is a flowchart showing a processing routine executed in a twelfth embodiment, and FIG. 32 illustrates a concrete procedure of the processing executed in the twelfth embodiment. The processing routine of FIG. 31 is similar to that of the ninth embodiment shown in FIG. 25, except that steps S241 and S242 are interposed between steps S202 and S203. After a plurality of image areas are set in the color image at step S241, the user specifies a distribution ratio of each image area through interactive operation. The user can also arbitrarily set a plurality of image areas through interactive operation at step S241. In accordance with another possible procedure, the areas of the respective image parts may be directly used as different image areas.

In the example of FIG. 32, the distribution ratio is specified as 60:40 for a first image area R1 and 20:80 for a second image area R2. The results of the processing in the twelfth embodiment are clearly understood from the above discussion and are not specifically explained here.

The twelfth embodiment enables the user to specify a desired distribution ratio for each image area. Images of the desired special color separations suitable for the respective image areas can be produced by setting different distribution ratios in the respective image areas. By way of example, images of the two special color separations S and T are produced for the first image area R1, while an image of only one special color separation S is produced for the second image area R2.

Like the tenth embodiment discussed above, at step S207 in the twelfth embodiment, the post-subtraction densities after the special color conversion for the S separation and those after the special color conversion for the T separation may be summed up respectively for the Y, M, and C separations.

Although the densities of the basic color separations Y, M, and C are converted to those of two special color separations in the above embodiments, the principle of the invention is also applicable to conversion to three or more special color separations.

M. Thirteenth Embodiment

Figure 33:
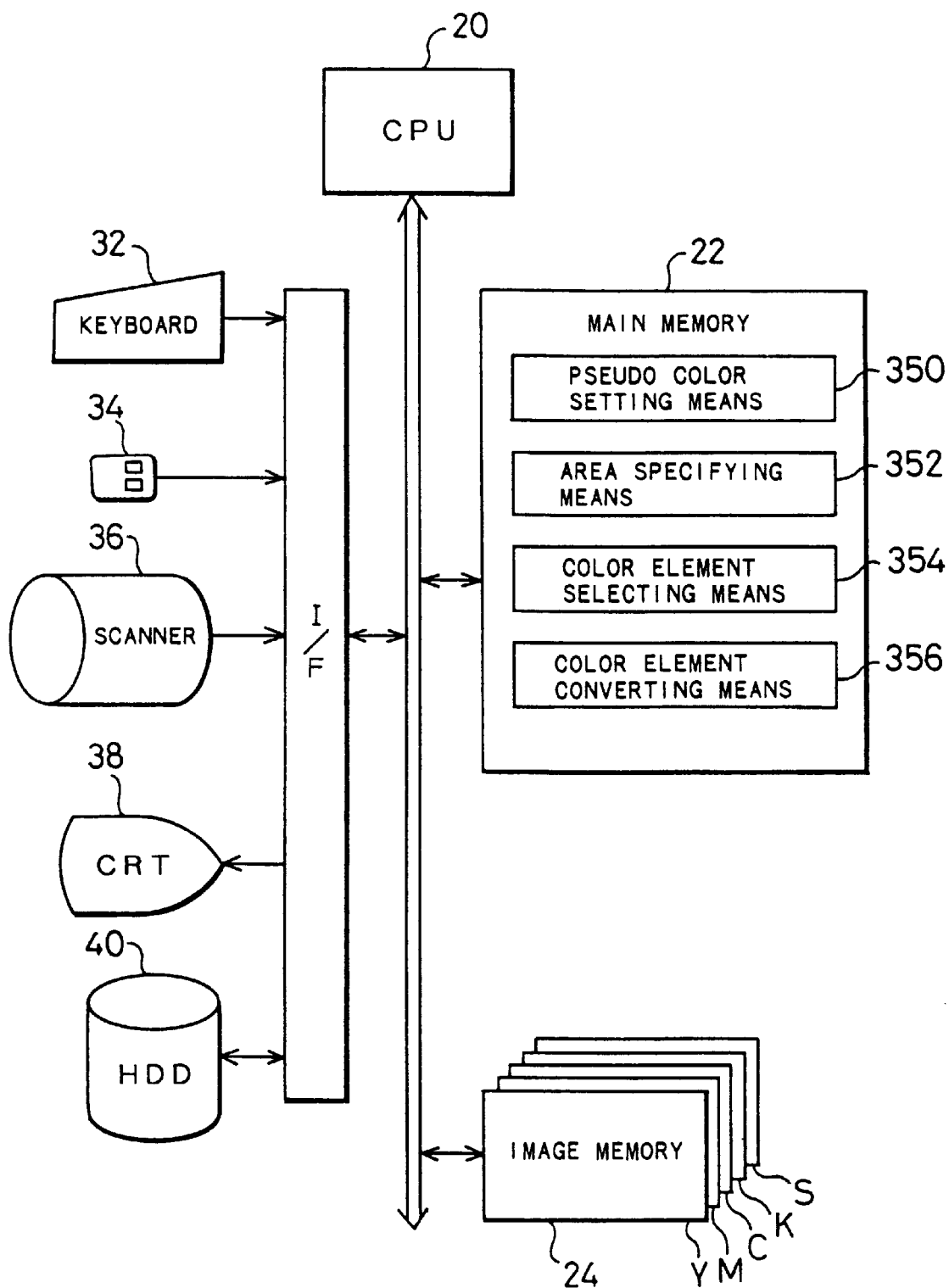
FIG. 33 is a block diagram illustrating structure of an image processing apparatus to which thirteenth through sixteenth embodiments of the present invention are applied.

FIG. 33 is a block diagram illustrating the structure of an image processing apparatus to which the thirteenth through sixteenth embodiments of the present invention are applied.

The main memory 22 stores computer program codes implementing the functions of a pseudo color setting means 350, an area specifying means 352, a color element selecting means 354, and a color element converting means 356. The CPU 20 executes the program codes stored in the main memory 22 to effect the respective means. Details of these functions will be described later. The program codes implementing the functions of such means is stored in a portable storage medium (carriable storage medium), such as floppy disks and CD-ROM, and transferred from the portable storage medium to the main memory 22 or the hard disk drive 40.

The image memory 24 has a memory area of five planes, in which image data of five color separation images, that is, Y, M, C, and K separations and a special color separation ('S separation'), are respectively stored.

Figure 34:
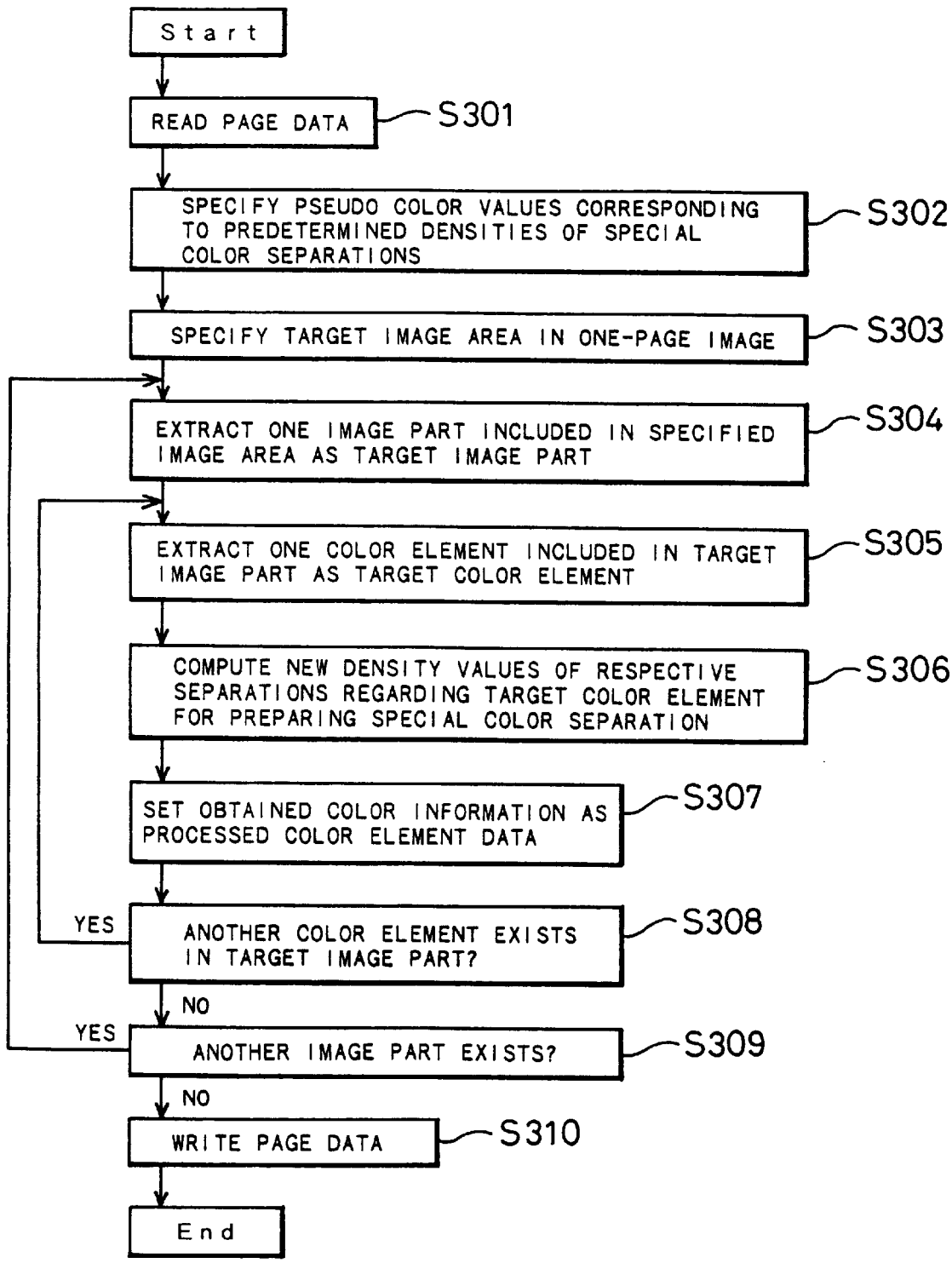
FIG. 34 is a flowchart showing a processing routine executed in the thirteenth embodiment.

FIG. 34 is a flowchart showing a processing routine executed in the thirteenth embodiment. When the program enters the routine, page data representing a one-page image to be processed are read out from the hard disk drive 40 to the image memory 24 at step S301.

Figure 35:
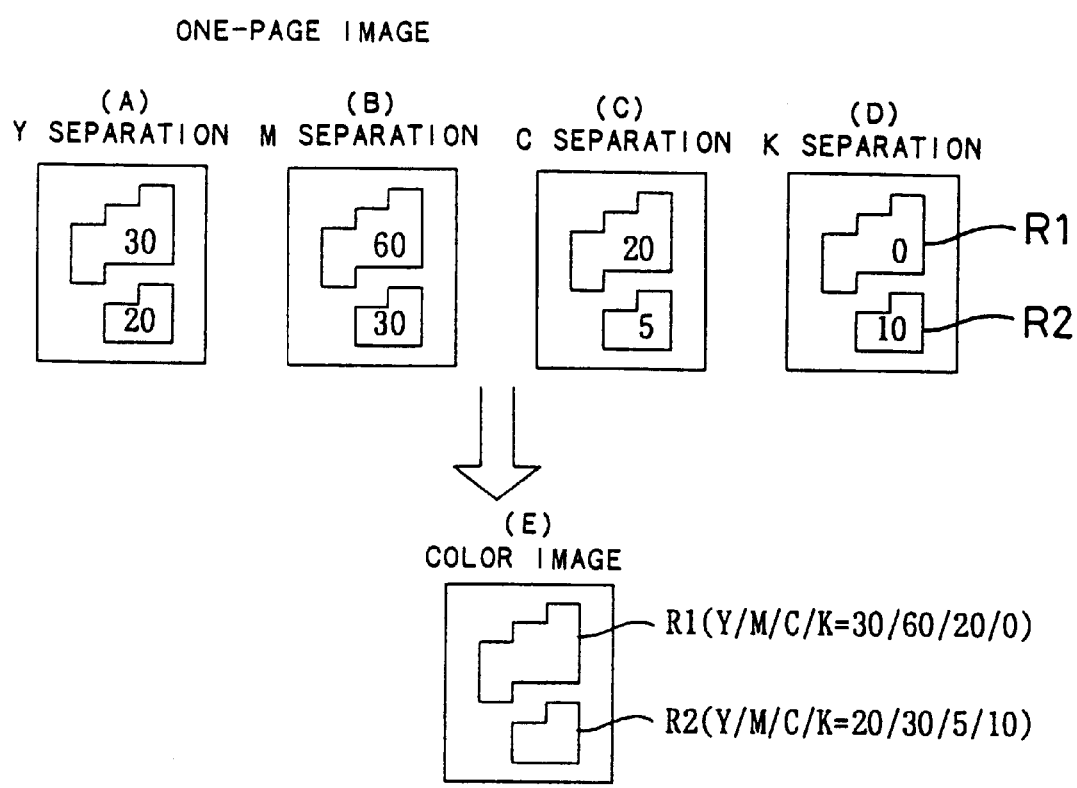
FIG. 35 shows an example of a one-page image to be processed in the thirteenth embodiment.

FIG. 35 shows an example of the one-page image to be processed in the thirteenth embodiment. (A) through (D) of FIG. 35 respectively show images of Y, M, C, and K separations, while (E) of FIG. 35 illustrates a color image reproduced by laying these images one upon another. Referring to (A) of FIG. 35, the one-page image has two tint image areas R1 and R2. The initial densities of Y, M, C, and K separations of the first image area R1 are 30%, 60%, 20%, and 0%, respectively, and those of the second image area R2 are 20%, 30%, 5%, and 10%.

At step S302 in the flowchart of FIG. 34, a user specifies specific densities (or pseudo color values) of the Y, M, C, and K separations corresponding to a predetermined density of the special color separation (S separation). The pseudo color values may be read out from a special color density database stored in the hard disk drive 40. In the thirteenth embodiment, it is assumed that $Y_S=20\%$, $M_S=40\%$, $C_S=10\%$, and $K_S=0\%$ are set as pseudo color values of the Y, M, C, and K separations corresponding to the predetermined density of 100% (solid) for the special color separation.

The program proceeds to step S303, at which the user specifies a target image area for the special color conversion in the one-page image through interactive operation. A variety of methods may be applied for the selection of the target image area. For example, coordinates on the one-page image may be numerically input with the keyboard 32. In accordance with another possible method, the area of a specific image part may be set as the target image area. In some cases, part's numbers are allocated to a plurality of image parts included in the one-page image, and image part data representing the respective image parts are stored in a distinguishable form in the hard disk drive 40. In this case, the area of a specific image part can be selected as the target of special color conversion by simply inputting the part's number. Alternatively, the target image area of the special color conversion may be selected by setting a specific condition and retrieving an image part satisfying the specific condition. A wide image area including a plurality of image parts may also be specified as the target image area. In the example of (E) of FIG. 35, it is assumed that the user selects one image part R1 through interactive operation as the target image area of the special color conversion among the one-page image displayed on the color CRT 38.

At step S304, one image part included in the specified target image area is selected as a target to be processed. The processing of step S304 is effective when a wide image area including a plurality of image parts has been specified as the target image area. A plurality of image parts are registered in the form of a list in the page data representing the one-page image. Image part data representing each image part includes area data (contour data) representing an area occupied by each image part. At step S304, the image parts at least partly included in the target image area are successively extracted one by one, based on the area data. In the first embodiment, the image area R1 corresponding to one image part has been specified as the target image area, and the image part R1 is thus selected at step S304.

The program then proceeds to step S305, at which the color element selecting means 354 extracts a color element included in the target image part thus selected and reads color element data representing the extracted color element as a target of special color conversion. The processing of step S305 selects one color element and reads the density values of the Y, M, C, and K separations regarding the selected color element. In the example of FIG. 35, the initial density values obtained for the first image area R1 are $Y_0=30\%$, $M_0=60\%$, $C_0=20\%$, and $K_0=0\%$.

The program then proceeds to step S306, at which the color element converting means 356 calculates new density values $S_1$, $Y_1$, $M_1$, $C_1$, and $K_1$ of the respective color separations including the special color separation from the pseudo color values $Y_S$, $M_S$, $C_S$, and $K_S$ of the Y, M, C, and K separations and the density values $Y_0$, $M_0$, $C_0$, and $K_0$ of the respective color separations regarding the target color element according to Equations (13a) through (13e) given below:

$$S_1 = \mathrm{Min}(Y_0/Y_S, M_0/M_S, C_0/C_S, K_0/K_S, 1) \quad (13a)$$

$$Y_1 = Y_0 - S_1 \times Y_S \quad (13b)$$

$$M_1 = M_0 - S_1 \times M_S \quad (13c)$$

$$C_1 = C_0 - S_1 \times C_S \quad (13d)$$

$$K_1 = K_0 - S_1 \times K_S \quad (13e)$$

The value '1' in the right hand side of Equation (13a) is used to restrict the upper limit of the density value $S_1$ of the special color separation to 100%.

The second terms in the right hand side of Equations (13b) through (13e) respectively represent the proportional density values in the present invention, whereas the left hand side terms of Equations (13b) through (13e) represent the post-subtraction densities with respect to the plurality of basic color separations.

As a result of the operation, the density values of the first image area R1 are determined to be $Y_1=20\%$, $M_1=40\%$, $C_1=15\%$, $K_1=0\%$, and $S_1=50\%$. These results are shown in (A2) through (E2) of FIG. 36.

Referring back to the flowchart of FIG. 34, at step S307, the color information obtained through the above processing is set as the processed color element data. The program then goes to step S308, at which it is determined whether another color element is included in the target image part. When another color element exists at step S308, the program returns to step S305 and repeats the processing of steps S305 through S307 for another color element. Since the first image area R1 shown in FIG. 36 is a tint image area and includes only one color element, however, the program goes from step S308 to step S309.

It is determined at step S309 whether another image part is included in the target image area previously specified. When another image part exists at step S309, the program returns to step S304 to select another image part as a next target of the special color conversion. In the example of FIG. 36, the second image area R2 is not included in the target image area and thus not selected as the target image part.

In the area not within the target image area of the special color conversion, the value of '0%' written in the initial setting is effective as the density value of the S separation.

The processing of steps S303 through S309 in the flowchart of FIG. 34 is repeated to process the density values of the Y, M, C, and K separations with respect to each color element included in each image part and set the density of the special color separation. At step S310, the converted page data representing the one-page image thus obtained are written into the hard disk drive 40.

As discussed above, the thirteenth embodiment specifies a target image area of the special color conversion and carries out the special color conversion only for the specified image area whereas not executing the special color conversion for the other image areas. This feature of the thirteen embodiment can be combined with any of the first through twelfth embodiments.

N. Fourteenth Embodiment

Figure 37:
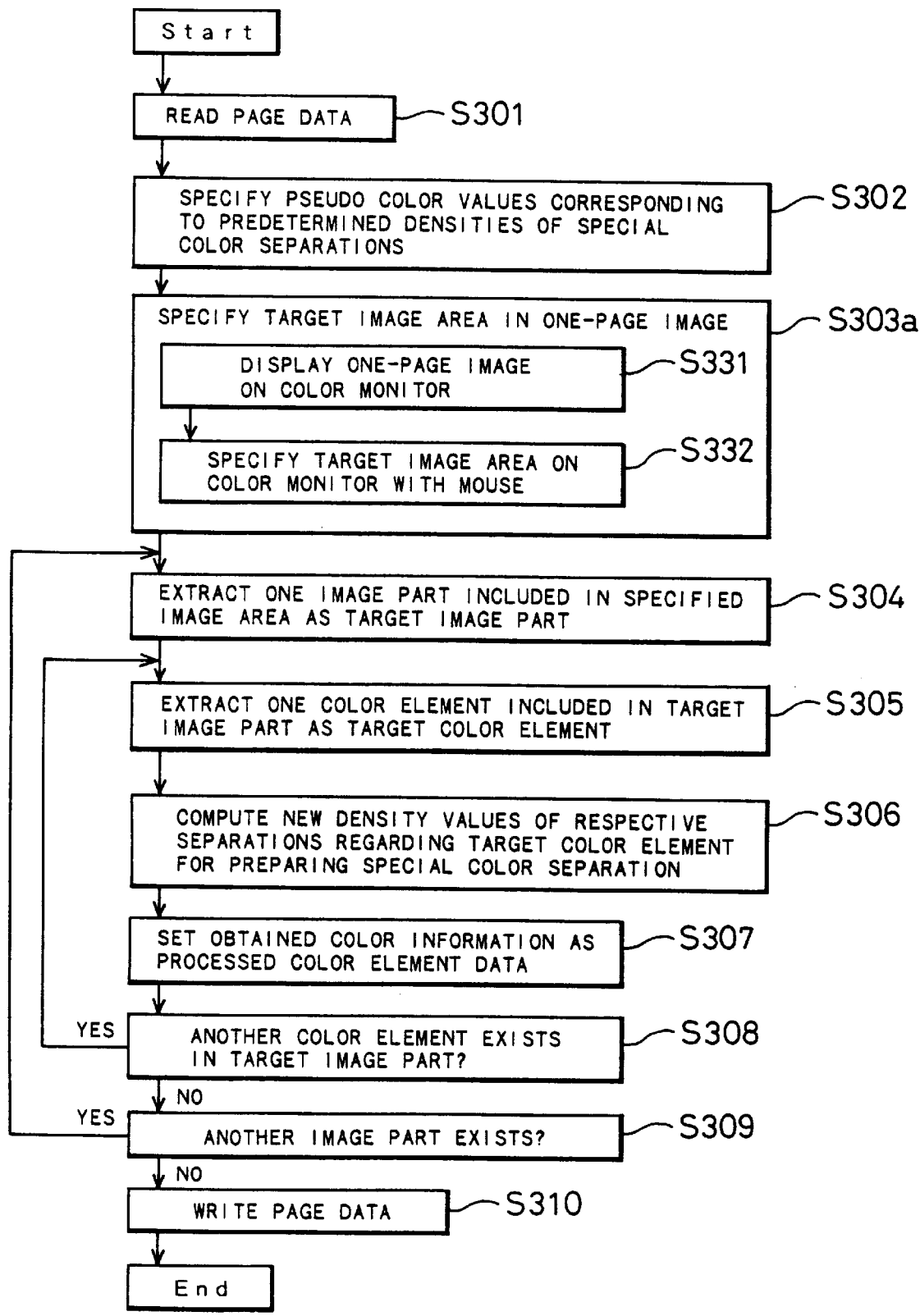
FIG. 37 is a flowchart showing a processing routine executed in the fourteenth embodiment.
Figure 38:
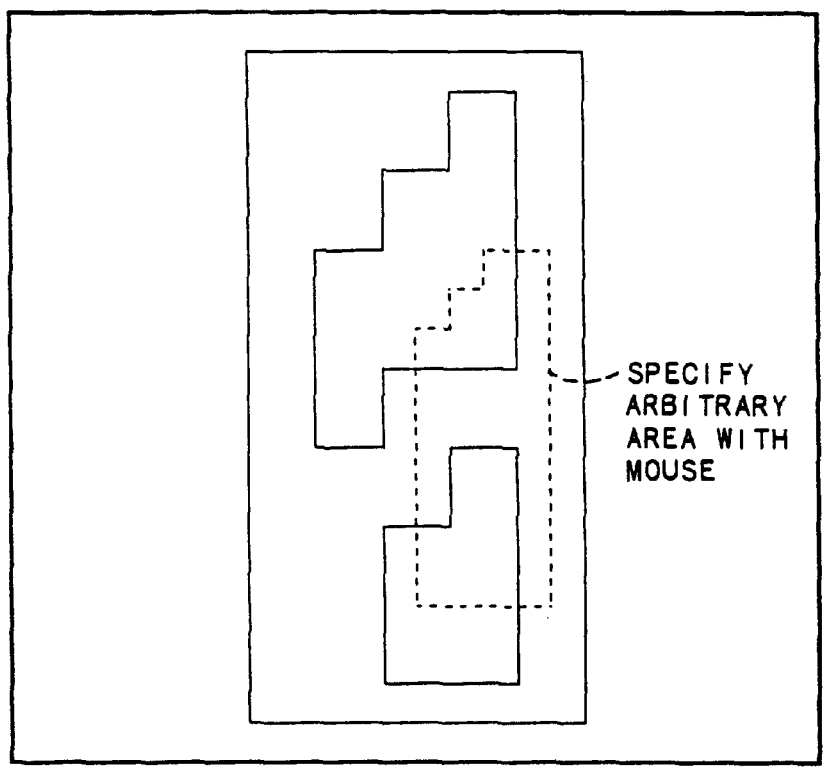
FIG. 38 illustrates a concrete procedure of the processing executed in the fourteenth embodiment.

FIG. 37 is a flowchart showing a processing routine executed in a fourteenth embodiment, and FIG. 38 illustrates a concrete procedure of the processing executed in the fourteenth embodiment. The processing routine of FIG. 37 is similar to that of the thirteenth embodiment shown in FIG. 34, except that step S303 is replaced by steps S331 and S332.

At step S331, one-page image is displayed on the color monitor 38. The user may specify one point on the color monitor 38 in order to numerically check the density value of each color separation at the specified point.

At step S332, the user specifies an area of arbitrary shape as a target image area on the one-page image displayed on the color monitor 38 through interactive operation with the mouse 34. FIG. 38 conceptually illustrates a process of specifying an area with the mouse 34 at step S332 in the flowchart of FIG. 37. The user can specify any arbitrary area with the mouse 34 regardless of the shape of existing image parts. When only a portion of a certain image part is included in the target image area thus specified, the image part is divided by the contour of the target image area and only the image part inside the target image area can be selected as a target of the special color conversion.

The structure of the second embodiment enables the user to specify an area of arbitrary shape as a target image area while checking the density value of each color separation at an arbitrary position in the color image. An image of the special color separation can thus be obtained readily only for the desired image area. This feature of the fourteenth embodiment can be combined with any of the first through twelfth embodiments.

O. Fifteenth Embodiment

Figure 39:
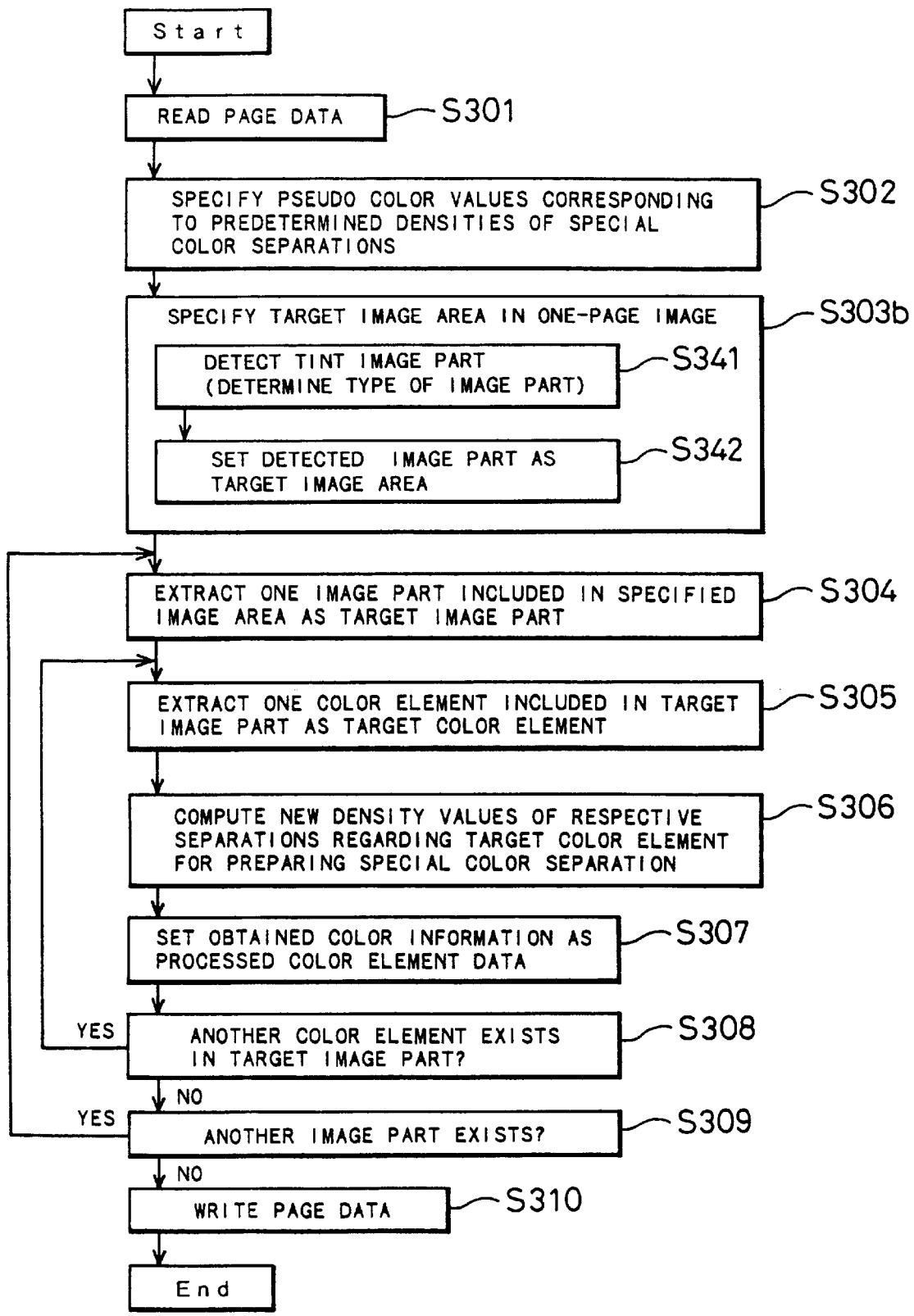
FIG. 39 is a flowchart showing a processing routine executed in the fifteenth embodiment.
Figure 40:
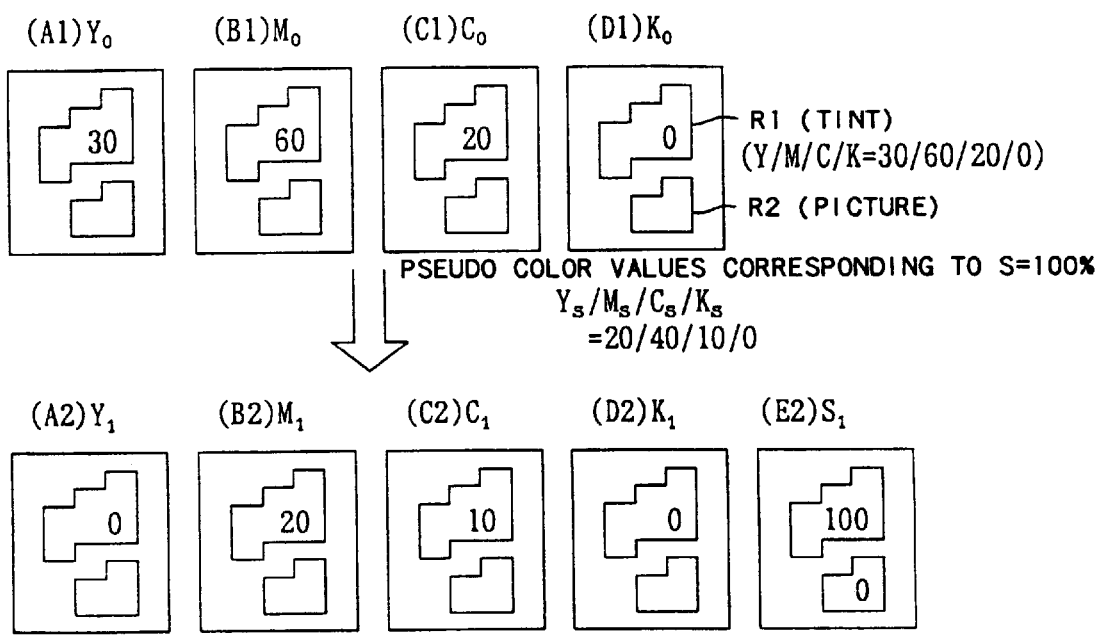
FIG. 40 illustrates a concrete procedure of the processing executed in the fifteenth embodiment.

FIG. 39 is a flowchart showing a processing routine executed in a fifteenth embodiment, and FIG. 40 illustrates a concrete procedure of the processing executed in the fifteenth embodiment. The processing routine of FIG. 39 is similar to that of the thirteenth embodiment shown in FIG. 34, except that step S303 is replaced by steps S341 and S342.

At step S341, a tint image part is automatically selected, based on the part data representing each image part included in the color image. Each part data includes attribute data (image type data) representing the type (attribute) of the image, such as tint, vignette, character, or picture. The selection of the tint image part can be readily executed by referring to the attribute data. At step S342, the tint image part thus selected is set as a target image area of the special color conversion.

In the example of FIG. 40, it is assumed that the first image area R1 is a tint image part and the second image area R2 as a picture. At step S342, the picture image area R2 is excluded from the target of the special color conversion. The results obtained accordingly include the first image area R1 processed by the special color conversion and the non-processed second image area R2.

The fifteenth embodiment automatically detects only tint image area to be processed by the special color conversion. Even when a certain color which incidentally coincides with the pseudo color values of a special color is included in an image part of continuous tone, such as a vignette area or a picture, the certain color is not converted to the special color separation. This effectively prevents a certain color included in an image part of continuous tone from being converted to an unnatural color. This feature of the fifteenth embodiment can be combined with any of the first through twelfth embodiments.

P. Sixteenth Embodiment

Figure 41:
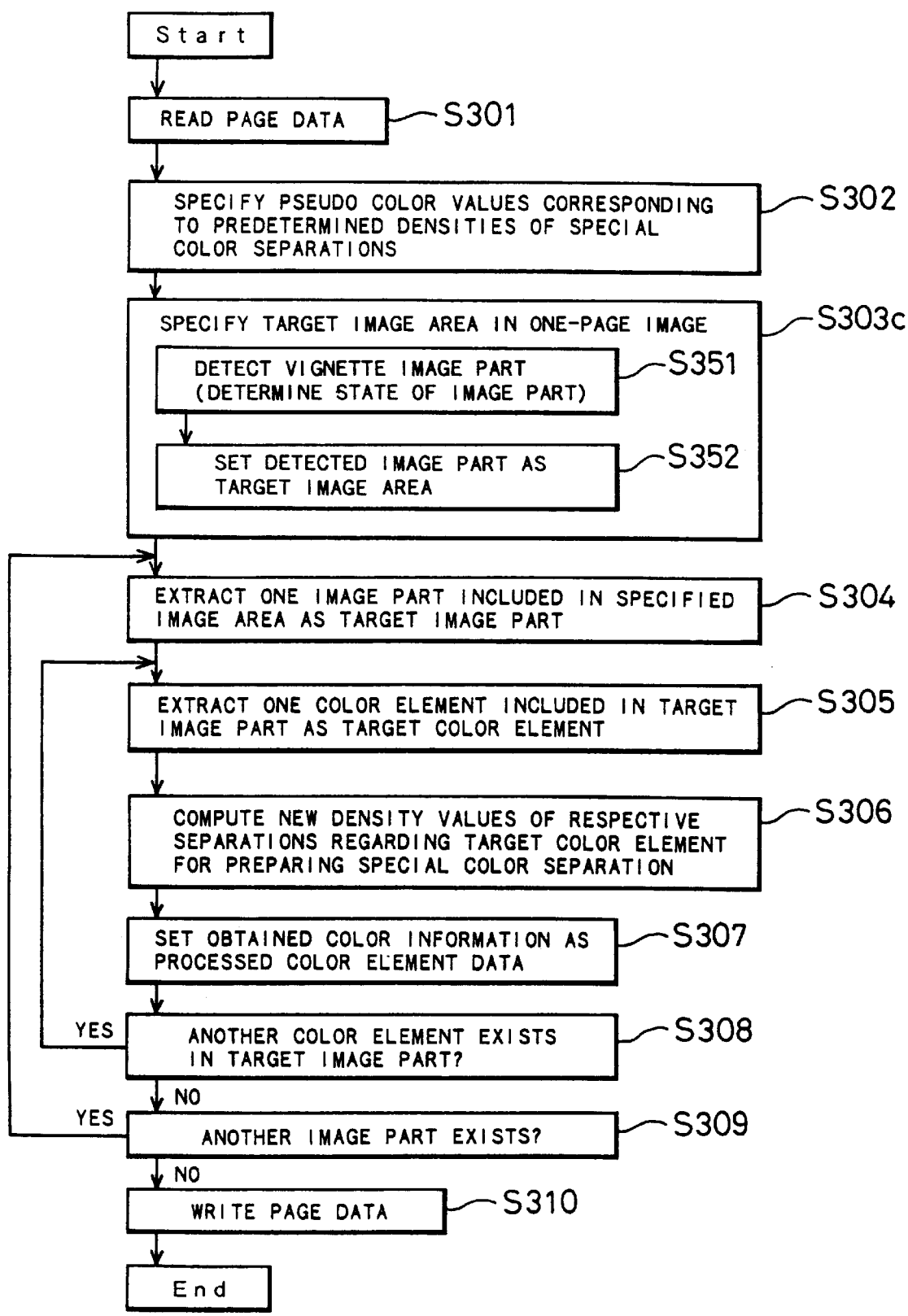
FIG. 41 is a flowchart showing a processing routine executed in the sixteenth embodiment.
Figure 42:
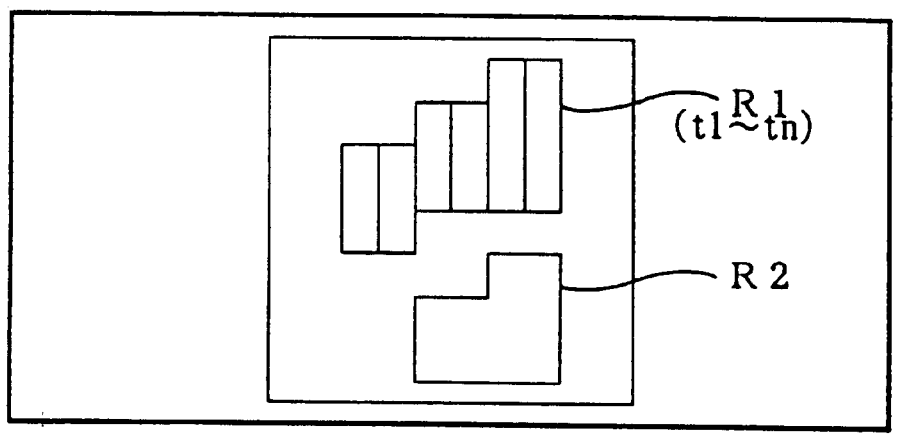
FIG. 42 illustrates a concrete procedure of the processing executed in the sixteenth embodiment.

FIG. 41 is a flowchart showing a processing routine executed in a sixteenth embodiment, and FIG. 42 illustrates a concrete procedure of the processing executed in the sixteenth embodiment. The processing routine of FIG. 41 is similar to that of the thirteenth embodiment shown in FIG. 34, except that step S303 is replaced by steps S351 and S352.

At step S351, a vignette image part is automatically selected, based on the attribute data included in the part data representing each image part. At step S352, the vignette image part thus detected is set as a target image area of special color conversion.

In the example of FIG. 42, it is assumed that the first image area R1 is a vignette image part as conceptually illustrated and the second image area R2 as a tint image area. The vignette first image area R1 includes 'n' pieces of tint elements t1 through tn. The density values of the 'n' pieces of screen tint elements t1 through tn are varied little by little. One vignette image part R1 is formed by gradually changing the density values of the continuous small elements t1 through tn.

Each part data representing the image area R1 or R2 includes attribute data for identifying the image type, such as a vignette image or a tint image. At step S351, it is determined whether each image part is a vignette or not, based on the attribute data of the image part. At step S352, the second image area R2 of a tint image is excluded from the target of the special color conversion. The results obtained accordingly include the first image area R1 processed by the special color conversion and the non-processed second image area R2.

In the sixteenth embodiment, the special color conversion is carried out only for a vignette image area. Even when a certain color which incidentally coincides with the pseudo color values of a special color is included in another type of image part, such as a tint area or a picture, the certain color is not converted to the special color separation. This effectively prevents a certain color included in another type of image part from being converted to an unnatural color. This feature of the sixteenth embodiment can be combined with any of the first through twelfth embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of producing an image of a special color separation other than yellow, magenta, cyan, and black separations with respect to a color image which is to be reproduced by a plurality of basic color separations including at least the yellow, magenta and cyan color separations, said method comprising the steps of:

(a) specifying a relationship between a predetermined density of said special color separation and densities of said plurality of basic color separations;

(b) selecting each color element in said color image as a target color element, said target color element including initial densities of said plurality of basic color separations; and (c) determining a density of said special color separation for said target color element from said initial densities of said plurality of basic color separations for said target color element according to said relationship, wherein said step (a) comprises the steps of:

specifying specific densities of said plurality of basic color separations corresponding to said predetermined density of said special color separation; and wherein said step (c) comprises the step of:

when the initial densities for said target color element respectively coincide with the specific densities, setting the density of said special color separation for said target color element equal to the predetermined density while changing the initial densities of said plurality of basic color separations to zero.

2. A method in accordance with claim 1, wherein said step (a) comprises the step of:

setting an allowable error for judging whether the initial densities for said target color element respectively coincide with the specific densities or not.

3. A method of producing an image of a special color separation other than yellow, magenta, cyan, and black separations with respect to a color image which is to be reproduced by a plurality of basic color separations including at least the yellow, magenta and cyan color separations, said method comprising the steps of:

(a) specifying a relationship between a predetermined density of said special color separation and densities of said plurality of basic color separations;

(b) selecting each color element in said color image as a target color element, said target color element including initial densities of said plurality of basic color separations; and (c) determining a density of said special color separation for said target color element from said initial densities of said plurality of basic color separations for said target color element according to said relationship, wherein said step (a) comprises the step of:

specifying specific densities of said plurality of basic color separations corresponding to said predetermined density of said special color separation; and wherein said step (c) comprises the step of:

when a ratio of the initial density to the specific density is common to said plurality of basic color separations, determining the density of said special color separation for said target color element according to said ratio of the initial density to the specific density while changing the initial densities of said plurality of basic color separations for said target color element equal to zero.

4. A method of producing an image of a special color separation other than yellow, magenta, cyan, and black separations with respect to a color image which is to be reproduced by a plurality of basic color separations including at least the yellow, magenta and cyan color separations, said method comprising the steps of:

(a) specifying a relationship between a predetermined density of said special color separation and densities of said plurality of basic color separations;

(b) selecting each color element in said color image as a target color element, said target color element including initial densities of said plurality of basic color separations; and (c) determining a density of said special color separation for said target color element from said initial densities of said plurality of basic color separations for said target color element according to said relationship, wherein said step (a) comprises the step of:

specifying specific densities of said plurality of basic color separations corresponding to a predetermined density of each of a plurality of special color separations; and wherein said step (c) comprises the steps of:

selecting one of said plurality of special color separations as a target special color separation;

subtracting proportional density values of said plurality of basic color separations, which are proportional to the specific densities with respect to said target special color separation, from the initial densities of said plurality of basic color separations for said target color element to thereby determine post-subtraction densities of said plurality of basic color separations; and determining a density of said target special color separation, corresponding to the proportional density values, for said target color element;

wherein said step (c) further comprises the steps of:

(1) computing ratios of the densities of said plurality of basic color separations for said target color element to the specific densities of said plurality of basic color separations for said target special color separation, and selecting a minimum value among said ratios for said plurality of basic color separations and 1.0;

(2) determining a density of said target special color separation for said target color element by multiplying said minimum value by a predetermined coefficient;

(3) determining the proportional density values of said plurality of basic color separations by multiplying the specific densities of said plurality of basic color separations by the density of said target special color separation determined in said step (2); and (4) subtracting the proportional density value of said plurality of basic color separations from the densities of said plurality of basic color separations for said target color element, to thereby obtain the post-subtraction densities of said plurality of basic color separations; and said method further comprising the step of:

(d) setting the post-subtraction densities of said plurality of basic color separations as new densities of said plurality of basic color separations for said target color element; and (e) successively carrying out said steps (c) and (d) for each of said plurality of special color separations.

5. A method in accordance with claim 4, wherein said predetermined coefficient is 100% with respect to at least one special color separation.

6. A method of producing an image of a special color separation other than yellow, magenta, cyan, and black separations with respect to a color image which is to be reproduced by a plurality of basic color separations including at least the yellow, magenta and cyan color separations, said method comprising the steps of:

(a) specifying a relationship between a predetermined density of said special color separation and densities of said plurality of basic color separations;

(b) selecting each color element in said color image as a target color element, said target color element including initial densities of said plurality of basic color separations; and (c) determining a density of said special color separation for said target color element from said initial densities of said plurality of basic color separations for said target color element according to said relationship, wherein said step (a) comprises the step of:

specifying specific densities of said plurality of basic color separations corresponding to a predetermined density of each of a plurality of special color separations; and wherein said step (c) comprises the steps of:

selecting one of said plurality of special color separations as a target special color separation;

subtracting proportional density values of said plurality of basic color separations, which are proportional to the specific densities with respect to said target special color separation, from the initial densities of said plurality of basic color separations for said target color element to thereby determine post-subtraction densities of said plurality of basic color separations; and determining a density of said target special color separation, corresponding to the proportional density values, for said target color element; said method further comprising the step of:

(d) setting the post-subtraction densities of said plurality of basic color separations as new densities of said plurality of basic color separations for said target color element; and (e) successively carrying out said steps (c) and (d) for each of said plurality of special color separations, further comprising the steps of:

(f) repeating a plurality of cycles of the processing of said step (c) through (e), each said cycle including the execution of said steps (c) through (e) for said plurality of special color separations; and (g) adding up the density of the target special color separation obtained in said step (c) in the repeated cycles with respect to each of said plurality of special color separation, to thereby obtain a final density of each of said plurality of special color separations.

7. A method of producing an image of a special color separation other than yellow, magenta, cyan, and black separations with respect to a color image which is to be reproduced by a plurality of basic color separations including at least the yellow, magenta and cyan color separations, said method comprising the steps of:

(a) specifying a relationship between a predetermined density of said special color separation and densities of said plurality of basic color separations;

(b) selecting each color element in said color image as a target color element, said target color element including initial densities of said plurality of basic color separations; and (c) determining a density of said special color separation for said target color element from said initial densities of said plurality of basic color separations for said target color element according to said relationship, wherein said step (a) comprises the steps of:

specifying specific densities of said plurality of basic color separations corresponding to a predetermined density of each of N special color separations, where N is an integer greater than 1; and said step (c) comprises the steps of:

(i) distributing the initial density of each of said plurality of basic color separations for said target color element into N divisional densities according to a predetermined distribution ratio, and associating the N divisional densities with said N special color separations; and (ii) computing proportional density values of said plurality of basic color separations, which are proportional to the specific densities with respect to said each special color separation, said proportional density values being no more than the divisional densities, and determining a density of said each special color separation for said target color element corresponding to the proportional density values.

8. A method in accordance with claim 7, wherein said step (ii) comprises the step of:

selecting one of said N special color separations as a target special color separation; and executing the steps of:

(1) computing ratios of the divisional densities of said plurality of basic color separations to the specific densities of said plurality of basic color separations with respect to said target special color separation, and selecting a minimum value among said ratios for said plurality of basic color separations and 1.0;

(2) determining the proportional density values of said plurality of basic color separations by multiplying the specific densities of said plurality of basic color separations by the minimum value; and (3) subtracting the proportional density values of said plurality of basic color separations from the divisional densities of said plurality of basic color separations for said target color element, to thereby obtain post-subtraction densities of said plurality of basic color separations.

9. A method in accordance with claim 7, further comprising the step of:

(d) adding up the post-subtraction densities obtained with respect to said N special color separations for each of said plurality of basic color separations, to thereby obtain new densities of said plurality of basic color separations.

10. A method in accordance with claim 7, wherein said color image comprises a plurality of image areas; and said method further comprising the step of:

specifying said distribution ratio for each said image area.

* * * * *